US012793230B2

(12) United States Patent
Phelippeau et al.

(10) Patent No.: US 12,793,230 B2
(45) Date of Patent: Nov. 10, 2026

(54) TILED REGION ADJACENCY GRAPH COMPUTATION VIA PIXEL-REGION ADJACENCY GRAPHS

(71) Applicant: FEI Company, Hillsboro, OR (US)

(72) Inventors: Harold Sylvain Phelippeau, Saint-Jean-de-Linières (FR); Josselin Roland Jean-Claude Lefèvre, Guermantes (FR); Nicolas Constanty, Bordeaux (FR)

(73) Assignee: FEI Company

( * ) Notice: Subject to any disclaimer, the term of this patent is extended or adjusted under 35 U.S.C. 154(b) by 258 days.

(21) Appl. No.: 18/605,200

(22) Filed: Mar. 14, 2024

(65) Prior Publication Data

US 2025/0292413 A1 Sep. 18, 2025

(51) Int. Cl.

| | |
|---|---|
| ***G06T 7/00*** | (2017.01) |
| ***G06T 7/11*** | (2017.01) |
| ***G06T 7/155*** | (2017.01) |
| ***G06T 7/162*** | (2017.01) |
| ***G06T 7/187*** | (2017.01) |
| ***G06T 11/26*** | (2026.01) |

(52) U.S. Cl.

CPC ................ *G06T 7/187* (2017.01); *G06T 7/11* (2017.01); *G06T 7/155* (2017.01); *G06T 7/162* (2017.01); *G06T 11/26* (2026.01); *G06T 2207/10056* (2013.01); *G06T 2207/10072* (2013.01); *G06T 2207/10116* (2013.01); *G06T 2207/20021* (2013.01); *G06T 2207/30204* (2013.01)

(58) Field of Classification Search

CPC . G06T 7/187; G06T 7/11; G06T 7/155; G06T 7/162; G06T 11/26; G06T 2207/10056; G06T 2207/10072; G06T 2207/10116; G06T 2207/20021; G06T 2207/30204; G06T 2207/10081; G06T 2207/20152

See application file for complete search history.

(56) References Cited

U.S. PATENT DOCUMENTS

| | | | | |
|---|---|---|---|---|
| 2007/0092864 | A1 | 4/2007 | Reinhardt et al. | |
| 2008/0247646 | A1 * | 10/2008 | Chefd'hotel ............ | G06T 7/155 382/173 |
| 2018/0075279 | A1 | 3/2018 | Gertych et al. | |

OTHER PUBLICATIONS

Meyer, Stochastic watershed hierarchies, Eighth International Conference on Advances in Pattern Recognition (ICAPR) (Year: 2015).*

Meyer, Chapter 8 Marker-based Segmentation, in Topographical Tools for Filtering and Segmentation 2 Flooding and Marker-based Segmentation on Node- or Edge-weighted Graphs, Wiley-ISTE (Year: 2019).*

(Continued)

*Primary Examiner* — Xiao Liu

(74) *Attorney, Agent, or Firm* — Leron Vandsburger

(57) ABSTRACT

Systems or techniques are provided for facilitating tiled region adjacency graph computation via pixel-region adjacency graphs. In various embodiments, a system can access an image generated by a scientific instrument. In various aspects, the system can perform marker-based watershed segmentation on a region adjacency graph of the image, wherein the region adjacency graph can be constructed from a plurality of pixel-region adjacency graphs respectively corresponding to a plurality of tiles of the image.

20 Claims, 35 Drawing Sheets

(56) References Cited

OTHER PUBLICATIONS

Manoochehri et al, An Efficient Transaction-Based GPU Implementation of Minimum Spanning Forest Algorithm, 2017 International Conference on High Performance Computing & Simulation (HPCS) (2017, pp. 643-650) (Year: 2017).*
Moga et al, A parallel marker based watershed transformation, Proceedings of 3rd IEEE International Conference on Image Processing (vol. 2, pp. 137-140 vol. 2) (Year: 1996).*
Kothe U., et al., "Geometric Analysis of 3D Electron Microscopy Data," Applications of Discrete Geometry and Mathematical Morphology, Aug. 22, 2010, XP047012717, pp. 93-108. (Abstract Only).
Meyer F., "Marker Based Segmentation Revisited," Advances in Databases and Information Systems, SPRINGER International Publishing, May 31, 2019, XP047510898, pp. 337-349. (Abstract Only).
Cousty, et al. "An algebraic framework for out-of-core hierarchical segmentation algorithms" DGMM. pp. 378-390 (2021), 14 pages.
Lefevre, et al. "Join, select, and insert: efficient out-of-core algorithms for hierarchical segmentation trees" arXiv:2210.02218v1 [eess.IV], Oct. 5, 2022, 13 pages.
Meijster, et al. "A Proposal for the Implementation of a Parallel Watershed Algorithm" Computer Analysis of Images and Patterns: 6th InternationalConference, CAIP'95 Prague, Czech Republic, Sep. 6-8, 1995 Proceedings 6. pp. 790-795. Springer (1995), 7 pages.
Moga, et al. "Parallel Image Component Labeling With Watershed Transformation" IEEE transactions on pattern analysis and machine intelligence 19(5), 441-450 (1997), 11 pages.
Moga, et al. "Parallel Marker-Based Image Segmentation with Watershed Transformation" journal of parallel and distributed computing 51, 27-45 (1998), 19 pages.
Roerdink, et al. "The Watershed Transform: Definitions, Algorithms and Parallelization Strategies" Fundamenta informaticae 41(1-2), 187-228 (2001), 41 pages.
Vincent, et al. "Watersheds in Digital Spaces: An Efficient Algorithm Based on Immersion Simulations" IEEE Transactions on Pattern Analysis and Machine Intelligence, vol. 13, No. 6, Jun. 1991, 16 pages.
Soille, Pierre "Morphological Image Analysis: Principles and Applications" Springer (1999) ,401 pages.
Stawiaski, et al. "Mathematical morphology and graphs: Application to interactive medical image segmentation. Ph.D. thesis" Ecole Nationale Superieure des Mines de Paris (2008), 176 pages.

* cited by examiner

602

602

1800

1900

2000

2100

2200

2300

2400

2300

2100

2500

2600

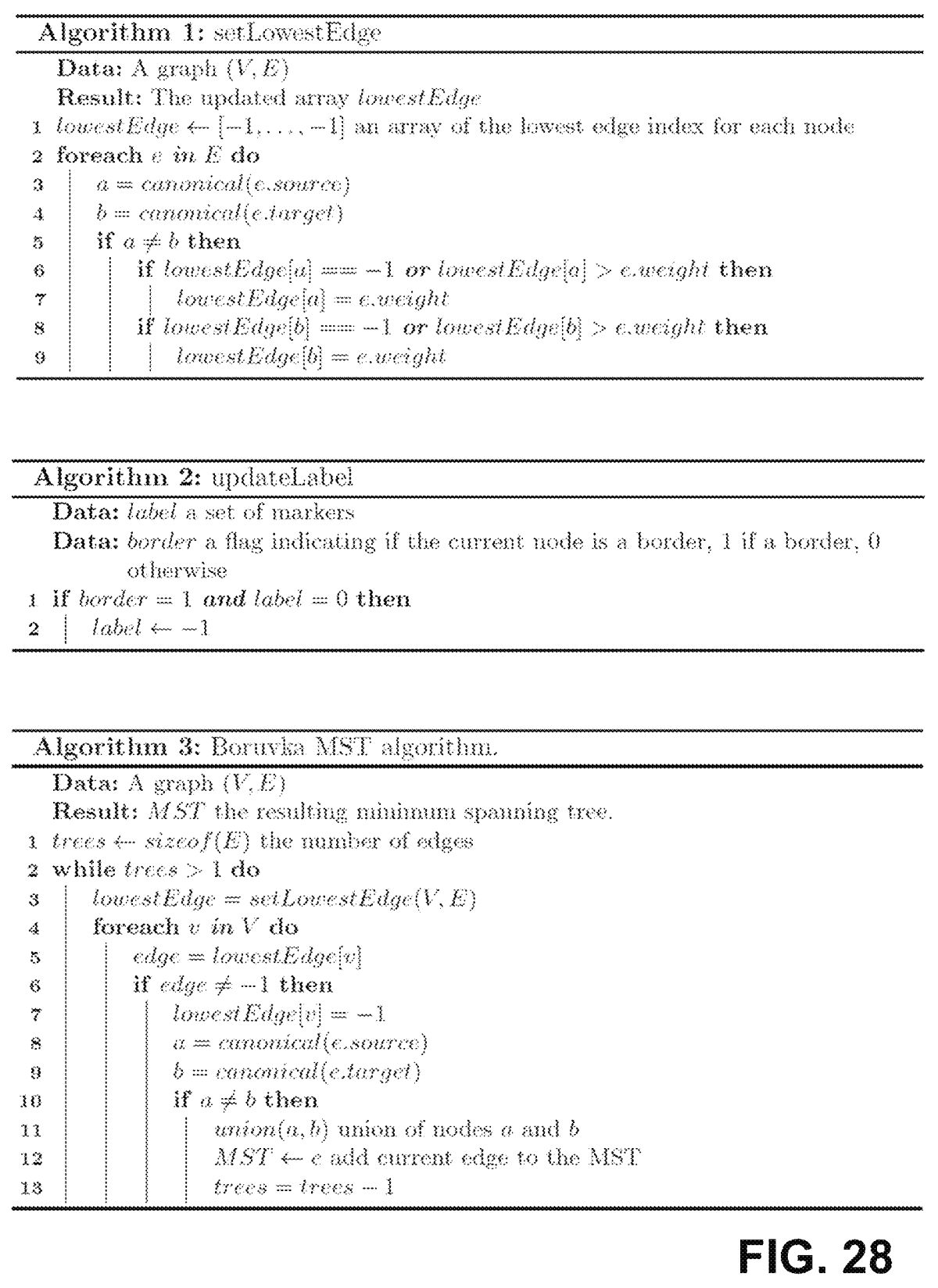

Algorithm 1: setLowestEdge

```
Data: A graph (V, E)
Result: The updated array lowestEdge
lowestEdge ← [−1, . . . , −1] an array of the lowest edge index for each node
foreach e in E do
    a = canonical(e.source)
    b = canonical(e.target)
    if a ≠ b then
        if lowestEdge[a] === −1 or lowestEdge[a] > e.weight then
            lowestEdge[a] = e.weight
        if lowestEdge[b] === −1 or lowestEdge[b] > e.weight then
            lowestEdge[b] = e.weight
```

Algorithm 2: updateLabel

```
Data: label a set of markers
Data: border a flag indicating if the current node is a border, 1 if a border, 0
      otherwise
if border = 1 and label = 0 then
    label ← −1
```

Algorithm 3: Boruvka MST algorithm.

```
Data: A graph (V, E)
Result: MST the resulting minimum spanning tree.
trees ← sizeof(E) the number of edges
while trees > 1 do
    lowestEdge = setLowestEdge(V, E)
    foreach v in V do
        edge = lowestEdge[v]
        if edge ≠ −1 then
            lowestEdge[v] = −1
            a = canonical(e.source)
            b = canonical(e.target)
            if a ≠ b then
                union(a, b) union of nodes a and b
                MST ← e add current edge to the MST
                trees = trees − 1
```

FIG. 28

Algorithm 4: Boruvka tiled labeled MST algorithm.

```
Data: A graph (V, E), an array of markers label and a border flag border
Result: The resulting tiled labeled MST
trees ← sizeof(E) the number of edges
labelTree ← initLabel(label, BorderFlag) update labels based on border
trees ← |V|
// Compute MSF
while trees! = iterTrees do
    iterTrees = trees
    lowestEdge = setLowestEdge(V, E)
    foreach v in V do
        edge = lowestEdge[v]
        if edge ≠ −1 then
            a = canonical(e.source)
            b = canonical(e.target)
            if a ≠ b and (label[a] = label[b] or label[v] = 0) then
                unionLabel(a, b) union of node a and b
                MST ← e add current edge to the MST
                trees = trees − 1
// Propagate labels
foreach v in V do
    a = canonical(v)
    label[v] = label[a]
// Add remaining edges to build the MST
while trees > 1 do
    lowestEdge = setLowestEdge(V, E)
    foreach v in V do
        edge = lowestEdge[v]
        if edge ≠ −1 then
            lowestEdge[v] = −1
            a = canonical(e.source)
            b = canonical(e.target)
            if a ≠ b then
                union(a, b) union of node a and b
                MST ← e add current edge to the MST
                trees = trees − 1
```

FIG. 29

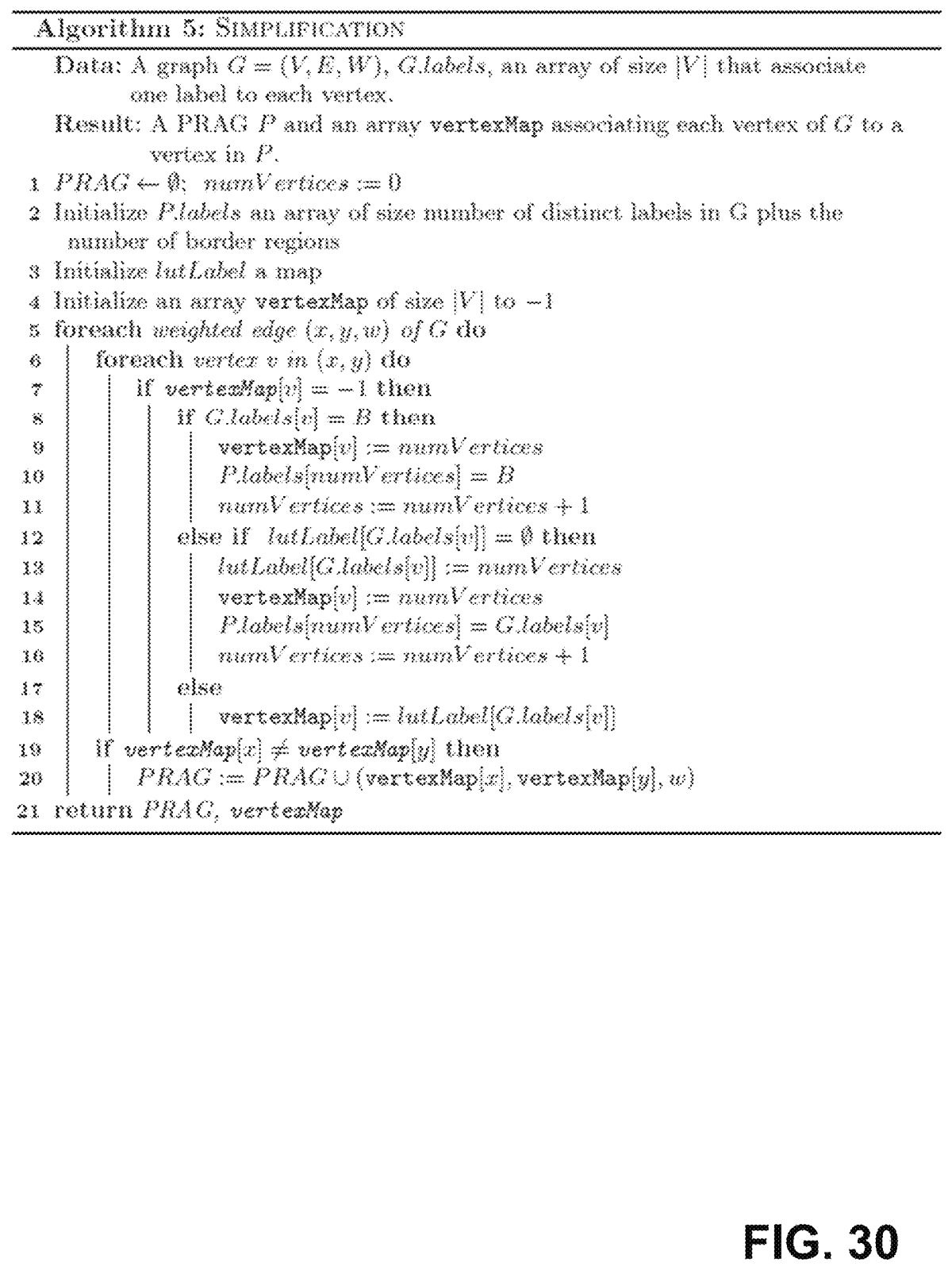

Algorithm 5: SIMPLIFICATION

```
Data: A graph G = (V, E, W), G.labels, an array of size |V| that associate
      one label to each vertex.
Result: A PRAG P and an array vertexMap associating each vertex of G to a
        vertex in P.
PRAG ← ∅;  numVertices := 0
Initialize P.labels an array of size number of distinct labels in G plus the
  number of border regions
Initialize lutLabel a map
Initialize an array vertexMap of size |V| to −1
foreach weighted edge (x, y, w) of G do
    foreach vertex v in (x, y) do
        if vertexMap[v] = −1 then
            if G.labels[v] = B then
                vertexMap[v] := numVertices
                P.labels[numVertices] = B
                numVertices := numVertices + 1
            else if lutLabel[G.labels[v]] = ∅ then
                lutLabel[G.labels[v]] := numVertices
                vertexMap[v] := numVertices
                P.labels[numVertices] = G.labels[v]
                numVertices := numVertices + 1
            else
                vertexMap[v] := lutLabel[G.labels[v]]
    if vertexMap[x] ≠ vertexMap[y] then
        PRAG := PRAG ∪ (vertexMap[x], vertexMap[y], w)
return PRAG, vertexMap
```

FIG. 30

TILED REGION ADJACENCY GRAPH COMPUTATION VIA PIXEL-REGION ADJACENCY GRAPHS

BACKGROUND

Various scientific instruments can capture images of specimens. It can be desired to segment such images. Segmentation can become increasingly difficult as such images grow in size.

SUMMARY

The following presents a summary to provide a basic understanding of one or more embodiments. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate tiled region adjacency graph computation via pixel-region adjacency graphs are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access an image generated by a scientific instrument. In various aspects, the computer-executable components can comprise an execution component that can perform marker-based watershed segmentation on a region adjacency graph of the image, wherein the region adjacency graph can be constructed from a plurality of pixel-region adjacency graphs respectively corresponding to a plurality of tiles of the image.

According to one or more embodiments, a computer-implemented method is provided. In various embodiments, the computer-implemented method can comprise accessing, by a device operatively coupled to a processor, an image generated by a scientific instrument; and performing, by the device, marker-based watershed segmentation on a region adjacency graph of the image, wherein the region adjacency graph can be constructed from a plurality of pixel-region adjacency graphs respectively corresponding to a plurality of tiles of the image.

According to one or more embodiments, a computer program product for facilitating tiled region adjacency graph computation via pixel-region adjacency graphs is provided. In various embodiments, the computer program product can comprise a non-transitory computer-readable memory having program instructions embodied therewith. In various aspects, the program instructions can be executable by a processor to cause the processor to access an image captured by a charged-particle microscope; and construct, in tile-wise fashion, a region adjacency graph for the image, based on a plurality of pixel-region adjacency graphs.

DESCRIPTION OF THE DRAWINGS

Various embodiments will be readily understood by the following detailed description in conjunction with the accompanying figures. To facilitate this description, like reference numerals designate like structural elements. Embodiments are illustrated by way of example, not by way of limitation, in the figures. The figures are not necessarily drawn to scale.

FIGS. 28-30 illustrate example, non-limiting algorithms that facilitate tiled region adjacency graph computation via pixel-region adjacency graphs in accordance with one or more embodiments described herein.

DETAILED DESCRIPTION

Figure 1:
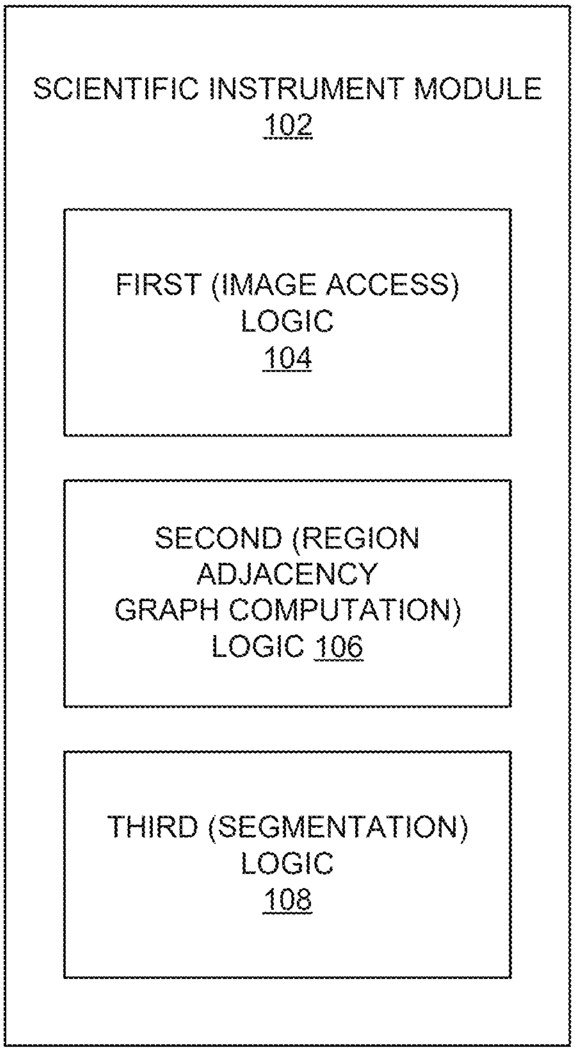
FIG. 1 illustrates an example, non-limiting block diagram of a scientific instrument module in accordance with various embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Various operations can be described as multiple discrete actions or operations in turn, in a manner that is most helpful in understanding the subject matter disclosed herein. However, the order of description should not be construed as to imply that these operations are necessarily order dependent. In particular, these operations can be performed in an order different from the order of presentation. Operations described can be performed in a different order from the described embodiments. Various additional operations can be performed, or described operations can be omitted in additional embodiments.

Although some elements may be referred to in the singular (e.g., "a processing device"), any appropriate elements may be represented by multiple instances of that element, and vice versa. For example, a set of operations described as performed by a processing device may be implemented with different ones of the operations performed by different processing devices. As used herein, the phrase "based on" should be understood to mean "based at least in part on," unless otherwise specified.

A scientific instrument (e.g., mass spectrometer, charged-particle microscope) can be any suitable computerized device that can capture or generate electronic measurements in a scientific, laboratory, research, or clinical operational context (e.g., that can capture or generate spectroscopic images or composition spectra). To facilitate the capture or generation of such electronic measurements, scientific instruments can leverage complex arrangements of actuatable parts (e.g., ion sources, ion lenses, heaters, coolers, fluid valves, fluid pumps, circuit switches, specimen stages, apertures), sensors (e.g., ion detectors, voltmeters, thermistors, potentiometers, pressure gauges), or consumables (e.g., carrier fluids, calibrants, filters).

Various scientific instruments (e.g., scanning or transmission electron microscopes, electron energy-loss microscopes) can utilize their constituent actuatable parts to capture images (e.g., electron tomography images, X-ray tomography images, confocal microscopy images) of specimens. In some cases, those images can be two-dimensional arrays of pixels. In other cases, those images can instead be three-dimensional arrays of voxels. In any case, those images can be quite large, depending upon which specific imaging modality is used to capture them. For example, scientific instruments often generate images that range from several tens to several hundreds of gigabytes in size.

It can often be desired to perform segmentation on such images, so as to extract or identify desired structural information about whatever specimens are illustrated in such images. Although convolutional neural networks have demonstrated remarkable success with respect to various image segmentation tasks, there are nevertheless various situations in which a non-machine-learning segmentation algorithm is preferable or desired. Indeed, such non-machine-learning segmentation algorithms are more transparent and interpretable (e.g., activation maps generated by hidden layers of convolutional neural networks often carry no readily-understandable or explainable meaning) and do not require collection or annotation of training data (e.g., very large amounts of training data can be required to cause a convolutional neural network to achieve a satisfactory level of segmentation accuracy). One of such non-machine-learning segmentation algorithms is the marker-based watershed algorithm.

Unfortunately, the marker-based watershed algorithm has been found to consume excessive computational resources (e.g., processing capacity, memory storage, computation time) when performed on gargantuan images produced by scientific instruments. For various other non-machine-learning segmentation algorithms, such excessive consumption of computational resources could be alleviated via tiling: that is, by breaking up a large image into tiles, applying whatever algorithm is at issue locally on each tile, and then merging the local algorithmic results from each tile into a global algorithmic result for the large image. However, at present, tilling cannot reliably be used with the marker-based watershed algorithm. Specifically, it has been verified that there is often a discrepancy between: local choices of marker-based watershed separation lines when the marker-based watershed algorithm is performed on individual tiles; and global choices of marker-based watershed separation lines when the marker-based watershed algorithm is performed on a given image in the absence of tiles. In other words, the marker-based watershed algorithm has been found to produce inconsistent segmentation basins when used in conjunction with tiling (e.g., local marker-based watershed separation lines or boundaries that are supposed to be contiguous can become noncontiguous after merging tiles). These discrepancies or inconsistencies can be referred to as "marker-based watershed leaks."

Rather than applying the marker-based watershed algorithm on a large image in its entirety (e.g., which consumes too many resources) or on individual tiles of the large image (e.g., which causes leaks), the marker-based watershed algorithm can instead be performed on a simplified version of the large image. In particular, it has been found that performing the marker-based watershed algorithm on the superpixels of a region adjacency graph (RAG) that corresponds to the large image can facilitate accurate segmentation without excessive consumption of computing resources. However, because scientific instruments often generate images of gargantuan sizes, whatever computerized workstations that support or are otherwise associated with those scientific instruments are often able to analyze or manipulate images only in tiled fashion (e.g., such workstations do not have enough processing capacity to perform any type of computationally intensive operation on an image that takes up tens or hundreds of gigabytes of storage). Unfortunately, existing techniques are unable to generate a RAG for a large image in a tiled context.

Accordingly, systems or techniques that can ameliorate one or more of these technical problems can be desirable.

Various embodiments described herein can address one or more of these technical problems. One or more embodiments described herein can include systems, computer-implemented methods, apparatus, or computer program products that can facilitate tiled region adjacency graph computation via pixel-region adjacency graphs. In other words, the inventors of various embodiments described herein devised various techniques for computing or otherwise generating a RAG for a large image in a tiled context. In particular, the present inventors devised a new type of graph structure which they refer to as a pixel-region adjacency graph (PRAG), and various embodiments described herein can leverage such new type of graph structure to create a RAG of a tiled image. More specifically, various embodiments described herein can involve converting each tile of a given image into a pixel adjacency graph (PAG) and converting each PAG into a minimum spanning forest whose trees are flagged or designated either as border trees or interior trees. A border tree (which can also be referred to as a border region) can be any tree that has at least one node that is located on a border of a tile, whereas an interior tree (which can also be referred to as an interior region) can be any tree that has no nodes that are located on a border of a tile. In various aspects, various embodiments described herein can further involve converting each minimum spanning forest into a PRAG, by maintaining or preserving the border regions of the minimum spanning forest and by replacing each interior region of the minimum spanning forest with a single respective node. In various instances, for any two tiles that are adjacent to each other, at least some of the border regions of the PRAGs of those two tiles can be merged together so as to create new interior regions, and those new interior regions can be replaced by respective single nodes as above. When all of the PRAGs are merged together, the resulting graph structure can have no remaining border regions and can thus be considered as the RAG of the given image. Accordingly, marker-based watershed segmentation can be performed on the RAG. In this way, various embodiments described herein can be considered as facilitating the computation or calculation of RAGs in a tiled context or in a tile-wise fashion, which is something that existing techniques do not know how to accomplish.

Various embodiments described herein can be considered as a computerized tool (e.g., any suitable combination of computer-executable hardware or computer-executable software) that can facilitate tiled region adjacency graph computation via pixel-region adjacency graphs. In various aspects, such computerized tool can comprise an access component, a tile component, a graph component, or an execution component.

In various embodiments, there can be a scientific instrument. In various aspects, the scientific instrument can be any suitable computerized device that can electronically capture or generate an image of any suitable specimen (e.g., a lamella). As some non-limiting examples, the scientific instrument can be a scanning electron microscope, a transmission electron microscope, or an electron energy-loss microscope.

In various aspects, the image can illustrate or otherwise visually depict any suitable physical structure or physical characteristics of the specimen or any suitable portion there. In some instances, the image can be a two-dimensional array of pixels, with each pixel having a respective intensity value. In other instances, the image can instead be a three-dimensional array of voxels, with each voxel having a respective intensity value.

In any case, it can be desired to perform marker-based watershed segmentation on the image. However, the image can be large or can otherwise consume a significant amount of computerized memory or storage space (e.g., the image can be tens to hundreds of gigabytes in size). Accordingly, it can be desired to perform such marker-based watershed segmentation on the image in a tile-wise fashion. The computerized tool described herein can facilitate such tile-wise marker-based watershed segmentation.

In various embodiments, the access component of the computerized tool can electronically access the image. For instance, the access component can receive, retrieve, or otherwise obtain the image from any suitable centralized or decentralized data structure (e.g., graph data structure, relational data structure, hybrid data structure). As a non-limiting example, the access component can receive, retrieve, or obtain the image from the scientific instrument itself. In any case, the access component can be considered as a conduit through which other components of the computerized tool can electronically interact with (e.g., read, write, edit, copy, manipulate) the image.

In various embodiments, the tile component of the computerized tool can electronically decompose the image into a plurality of tiles. In various aspects, a tile of the image can be any suitable contiguous collection of pixels (or voxels, as appropriate) of the image. In other words, any two pixels (or voxels) of the tile can either be: adjacent to each other; or coupled together by a chain of one or more other adjacent pixels (or voxels) that are also in the tile. In still other words, a tile can be considered as a cohesive multi-pixel (or multi-voxel) fragment, section, or piece of the image. In various instances, a tile can exhibit any suitable shape (e.g., its pixels or voxels can be arranged such that the tile has a rectilinear shape or a triangular shape) and any suitable size (e.g., the tile can be made up of any suitable number of pixels or voxels). In various cases, any of the plurality of tiles can have the same or different shapes or sizes as each other. In various aspects, the plurality of tiles can be disjoint. That is, it can be the case that none of the plurality of tiles overlap with each other. In such cases, the plurality of tiles can be considered as fitting together like the pieces of a jigsaw puzzle to form the image. In other aspects, the plurality of tiles can instead be not disjoint but nevertheless individually unique. That is, it can be the case that at least some of the plurality of tiles partially overlap with each other. In such cases, the plurality of tiles can be considered as fitting together like the pieces of a jigsaw puzzle to form the image, provided that overlapping portions of the plurality of tiles are not double-counted. In any case, each of the plurality of tiles can be smaller (e.g., in some cases, one or more orders of magnitude smaller) than the image itself. Accordingly, analysis or manipulation of individual ones of the plurality of tiles can be considered as less computationally intensive than analysis or manipulation of the image in its entirety.

In various embodiments, the graph component of the computerized tool can electronically generate a RAG for the image. In various aspects, the graph component can accomplish such generation, by leveraging a plurality of PRAGs that respectively correspond to the plurality of tiles of the image. In other words, the graph component can construct a respective PRAG for each of the plurality of tiles, and the component can construct the RAG by combining all of those PRAGs.

More specifically, for each given tile of the plurality of tiles, the graph component can convert that given tile into a pixel adjacency graph (PAG). In particular, the PAG can be a graph data structure comprising nodes and edges. In various aspects, each pixel (or voxel) of the given tile can be represented by a respective node of the PAG, and so the value of each node can be equal to the intensity value of its respective pixel (or voxel). In various instances, the PAG can contain a unique edge between any two nodes that represent adjacent pixels (or adjacent voxels) of the tile. In various cases, nearest-neighbor adjacency can be implemented for pixels. That is, a particular pixel can be considered as being adjacent to at most four other pixels: whatever pixel (if any) is immediately above the particular pixel; whatever pixel (if any) is immediately below the particular pixel; whatever pixel (if any) is immediately rightward of the particular pixel; and whatever pixel (if any) is immediately leftward of the particular pixel. However, in other cases, next-nearest-neighbor adjacency can be implemented for pixels. That is, a particular pixel can be considered as being adjacent to at most eight other pixels: whatever pixel (if any) is immediately above the particular pixel; whatever pixel (if any) is immediately below the particular pixel; whatever pixel (if any) is immediately rightward of the particular pixel; whatever pixel (if any) is immediately leftward of the particular pixel; whatever pixel (if any) is immediately to the upper-right of the particular pixel; whatever pixel (if any) is immediately to the upper-left of the particular pixel; whatever pixel (if any) is immediately to the lower-right of the particular pixel; and whatever pixel (if any) is immediately to the lower-left of the particular pixel. Similarly, nearest-neighbor adjacency can be implemented for voxels, such that any particular voxel can be adjacent to at most six other voxels (e.g., above, below, forward backward, left, right). In other instances, next-nearest-neighbor adjacency can be implemented for voxels, such that any particular voxel can be adjacent to at most twenty-six other voxels (e.g., a particular voxel can be considered as the center of a 3-by-3-by-3 cube of voxels, and each of the twenty-six other voxels in that 3-by-3-by-3 cube can be considered as being adjacent to that particular voxel). It is to be appreciated that any other intermediate definition of adjacency can be used, such that any given pixel (or voxel) can be considered as being adjacent to more than just its nearest neighbors but fewer than all of its next-nearest neighbors. In any case, every pair of nodes of the PAG that represent adjacent pixels (or adjacent voxels) can be coupled by a respective edge, and a weight of that edge can be equal to any suitable function of the values of that pair of nodes (e.g., can be equal to a reciprocal of an absolute value difference in the intensity values of the adjacent pixels or adjacent voxels represented by that pair of nodes).

In various aspects, for any given PAG, the graph component can convert that given PAG into a minimum spanning tree (MST). In various instances, the graph component can accomplish this by applying or otherwise performing Boruvka's algorithm (or any other suitable MST-finding algorithm) on the given PAG. In various cases, the MST of the given PAG can contain all of the nodes of the given PAG, but the MST can contain only a strict subset of the edges of the given PAG. In particular, the MST can include only whichever edges of the given PAG cause the following to occur: for every pair of nodes in the MST, there exists a path in the MST that couples that pair of nodes; there are no cycles (e.g., cyclic paths) in the MST; and a total sum of weights of the edges in the MST is minimized.

In various aspects, for any given MST, the graph component can convert that given MST into a minimum spanning forest (MSF). In various instances, the graph component can accomplish this conversion for any desired set of roots. In various cases, a root can be any node of the given MST that is designated as a root node. It should be appreciated that roots can also be referred to as markers. In some aspects, root or marker designation can be facilitated in any suitable fashion, such as via an extended minima operation, via random selection, or via any other suitable paradigm. In any case, when given the set of roots, the graph component can convert the given MST into an MSF. Specifically, for each pair of roots in the given MST, the graph component can identify a path in the MST that couples that pair of roots, and the graph component can delete whatever edge of that path that has a highest or maximum weight. When this deletion is performed for each pair of roots, what remains of the given MST can be considered as the MSF. In various aspects, the MSF can contain all of the nodes of the given MST, but the MSF can contain only a strict subset of the edges of the given MST. In particular, the MSF can contain a plurality of trees, such that: each of that plurality of trees contains exactly one of the set of roots; for any two nodes that belong to the same tree as each other, there exists a path in the MSF that couples those two nodes; and for any two nodes that do not belong to the same tree as each other, there exists no path in the MSF that couples those two nodes.

It should be appreciated that any suitable technique can be implemented to keep track of which nodes belong to which trees of the MSF. As a non-limiting example, each unique or distinct tree of the MSF can be considered as having a respective identifier or name (e.g., tree A, tree B, tree C), and each given node of the MSF can be assigned a respective label that indicates or specifies the identifier or name of the tree to which that given node belongs (e.g., a label indicating that node X belongs to tree A, a label indicating that node Y belongs to tree B, a label indicating that node Z belongs to tree C). It should be appreciated that such labels can be stored in any suitable electronic fashion (e.g., can be stored in an ancillary table that is separate from the MSF).

In various instances, for any given MSF, the graph component can generate a flagged MSF. In various cases, the graph component can accomplish this as follows. For any tree in the given MSF, the graph component can designate or flag that tree as a border tree, if that tree contains at least one node that is located on a border of whatever tile to which the given MSF corresponds. On the other hand, for any tree in the given MSF, the graph component can designate or flag that tree as an interior tree, if that tree contains no nodes that are located on a border of whatever tile to which the given MSF corresponds. In any case, the flagged MSF can be considered as having the same trees as the given MSF, with some of such trees being flagged or otherwise designated as border trees and with others of such trees being flagged or otherwise designated as interior trees. In other words, each tree of the flagged MSF can be considered as being labeled with its own respective identifier or name (e.g., tree A, tree B, tree C), and each tree of the flagged MSF can also be considered as being flagged as either a border tree or an interior tree (e.g., tree A can be flagged as a border tree, tree B can be flagged as a border tree, tree C can be flagged as an interior tree). Again, it should be appreciated that such labels and flags can be stored in any suitable electronic fashion (e.g., can be stored in one or more ancillary tables that are separate from the flagged MSF).

In various aspects, for any given flagged MSF, the graph component can generate a flagged MST. In various instances, the graph component can accomplish this as follows. As explained above, the given flagged MSF can be considered as having been generated from a given MSF, which can itself have been generated from a given MST based on a given set of roots. In particular, maximum-weight edges can have been deleted from the given MST to form the given MSF, based on paths coupling each pair of root nodes. In various cases, the graph component can reinsert those deleted edges into the given flagged MSF. Such reinsertion can be considered as converting the given flagged MSF into the flagged MST. Note that the flagged MST can be considered as containing the same nodes and edges that make up the border trees and the interior trees of the given flagged MSF. However, edge reinsertion can cause those trees to no longer be disconnected from one another. Accordingly, rather than being referred to as "trees", they can now be referred to as "regions" (e.g., tree A can now be called region A, tree B can now be called region B, tree C can now be called region C). That is, the border trees of the flagged MSF can now be called border regions of the flagged MST, and the interior trees of the flagged MSF can now be called interior regions of the flagged MST. So, the above-mentioned labels that indicate which nodes belong to which trees can now be considered as instead indicating which nodes belong to which regions (e.g., node X belongs to region A, node Y belongs to region B, node Z belongs to region C), and the above-mentioned flags that designate each tree as being either a border tree or an interior tree can now be considered as instead designating each region as being either a border region or an interior region.

In various aspects, for any given flagged MST, the graph component can convert the given flagged MST into a PRAG. In various instances, the graph component can accomplish such conversion, by preserving the border regions of the given flagged MST, and by condensing the interior regions of the given flagged MST into respective region nodes (also referred to as region-wise nodes). More specifically, for each interior region of the given flagged MST, the graph component can replace that interior region with a single node. In various cases, that single node can be any one of the nodes of that interior region. For purposes of illustration or visualization, that single node can be positioned or located at a geometric centroid of that interior region. In any case, that single node can be considered as representing or otherwise standing-in for whatever spatial area is covered by that interior region. Accordingly, that single node can be referred to as a region node (or region-wise node). Whatever remains of the given flagged MST after such condensation of all the interior regions into respective region nodes can be considered as the PRAG. In particular, the PRAG can contain all of the border regions of the given flagged MST, and the PRAG can contain respective region nodes instead of the interior regions of the given flagged MST. Thus, some nodes of the PRAG can represent individual pixels (e.g., the nodes of the border regions), while other nodes of the PRAG can instead represent entire spatial areas (e.g., the region nodes that replace the interior regions). Accordingly, the PRAG can be considered as a type of hybrid graph structure.

In this way, the graph component can generate a respective PRAG for each of the plurality of tiles of the image. In various aspects, the graph component can merge all of such PRAGs together, and the result of such merging can be considered as the RAG of the image. More specifically, for any two tiles that are adjacent to each other (e.g., that share a border), the graph component can combine the PRAGS of those two tiles. In various instances, such combining can involve: identifying which border is shared between those two tiles; identifying one or more border regions from each of those two PRAGs that correspond to that shared border; and inserting edges (e.g., null-weight edges or minimum-weight edges) between adjacent, duplicated, or otherwise matching nodes of those identified border regions. After such edge insertion, those identified border regions can be considered as now being one or more newly-formed interior regions of the join or union of the PRAGs of those two tiles. In various cases, the graph component can then condense those newly-formed interior regions into respective region nodes as described above (e.g., in some aspects, such condensation can involve reperforming various of the above-described acts on the merged or combined version of the two PRAGs, such as re-applying Boruvka's algorithm, deleting maximum-weight edges based on root designations, and flagging border regions and interior regions). In any case, each time the graph component merges two or more adjacent PRAGs, the total cardinality of border regions across all of the PRAGs can be incrementally reduced. Once all of the PRAGs are merged together, the final result can be a graph data structure that contains no border regions; instead, such finalized graph data structure can contain only region nodes and their associated edges. In various aspects, such finalized graph data structure can be considered as the RAG of the image.

In this way, the graph component can compute the RAG of the image in a tile-wise fashion.

In various embodiments, the execution component of the computerized tool can electronically perform any suitable downstream analysis on the RAG of the image. As a non-limiting example, the execution component can perform marker-based watershed segmentation on the RAG of the image, thereby yielding one or more marker-based watershed segmentation basins that correspond to the image. In various aspects, note that such marker-based watershed segmentation can be performed notwithstanding the potentially massive size of the image. After all, the RAG of the image can be considered as a smaller, simplified, less-computationally-intensive version of the image that can be analyzed or otherwise operated on without excessive consumption of computing resources. In various instances, the execution component can visually render the one or more marker-based watershed segmentation basins on any suitable computer screen or monitor. In various instances, the execution component can electronically transmit the one or more marker-based watershed segmentation basins to any other suitable computing device.

Accordingly, the computerized tool described herein can be considered as facilitating marker-based watershed image segmentation in a tiled context. In various aspects, the computerized tool described herein can facilitate such marker-based watershed image segmentation by constructing a RAG based on PRAGs that respectively correspond to image tiles.

Various embodiments described herein can be employed to use hardware or software to solve problems that are highly technical in nature (e.g., to facilitate tiled region adjacency graph computation via pixel-region adjacency graphs), that are not abstract and that cannot be performed as a set of mental acts by a human. Further, some of the processes performed can be performed by a specialized computer (e.g., scanning or transmission electron microscopes) for carrying out defined acts related to marker-based watershed segmentation.

For example, such defined acts can include: accessing, by a device operatively coupled to a processor, an image generated by a scientific instrument; and performing, by the device, marker-based watershed segmentation on a region adjacency graph of the image, wherein the region adjacency graph is constructed from a plurality of pixel-region adjacency graphs respectively corresponding to a plurality of tiles of the image. In various aspects, such defined acts can further include: decomposing, by the device, the image into the plurality of tiles; generating, by the device, a plurality of pixel adjacency graphs based on the plurality of tiles, wherein, for a first pixel adjacency graph that corresponds to a first tile, nodes of the first pixel adjacency graph represent respective pixels or voxels of the first tile; generating, by the device (e.g., via Boruvka's algorithm), a plurality of minimum spanning forests based on the plurality of pixel adjacency graphs, wherein, for a first minimum spanning forest that corresponds to the first pixel adjacency graph, the first minimum spanning forest comprises one or more border trees and one or more interior trees; generating, by the device, the plurality of pixel-region adjacency graphs based on the plurality of minimum spanning forests, wherein, for a first pixel-region adjacency graph that corresponds to the first minimum spanning forest, the first pixel-region adjacency graph comprises one or more border regions that respectively correspond to the one or more border trees and a set of region-wise nodes into which the one or more interior trees are condensed; and merging, by the device, the plurality of pixel-region adjacency graphs into the region adjacency graph, by coupling border regions of adjacent tiles, reflagging such coupled border regions as new interior regions, and condensing such new interior regions into new region-wise nodes.

Such defined acts are inherently computerized. Indeed, a scientific instrument, such as a charged-particle microscope or an electron energy-loss microscope, is a highly-technical computerized device comprising specific computerized hardware (e.g., temperature sensors, pressure sensors, voltage sensors, ion beam emitters, ion focusing lenses, mass analyzers, ion detectors, beam apertures, fluid valves). A scientific instrument and the operations that it performs cannot be implemented by the human mind, or by a human with pen and paper, in any reasonable or practicable way without computers. Furthermore, an image (e.g., electron tomography image, X-ray tomography image, confocal microscopy image) captured by a scientific instrument is an array of pixels or voxels that collectively depict or illustrate an analytical specimen. Such an image cannot be generated or captured by the human mind, or by a human with pen and paper, in any reasonable or practicable way without computers. Further still, marker-based watershed segmentation is a specific type of computing task that is performable on images produced by scientific instruments. In particular, marker-based watershed segmentation is an inherently computerized task in which separation lines or boundaries between different visual objects depicted in the image are determined based on the intensity values of the pixels or voxels of the image (e.g., in some cases, a separation line or boundary can possibly be located in between pixels or voxels). It makes no sense whatsoever to discuss the computerized task of marker-based watershed image segmentation outside of a computing context. Yet further, PAGs, RAGs, and the novel, herein-described PRAGs are specific types of data structures that serve as alternative computerized representations of pixel arrays or voxel arrays. It makes no sense at all to discuss the creation or manipulation of PAGs, RAGs, or PRAGs outside of a computing context.

Moreover, various embodiments described herein can integrate into a practical application various teachings relating to tiled region adjacency graph computation via pixel-region adjacency graphs. As explained above, images captured by scientific instruments can often be massive in size (e.g., consuming hundreds of gigabytes of memory space). Such massive sizes often far exceed the processing capacities of computerized workstations that support scientific instruments. Accordingly, to facilitate analysis or manipulation of such massive images, those computerized workstations can consider or otherwise operate on such massive images in tiled fashion (e.g., by considering individual tiles of an image, rather than considering an entirety of the image at once). Marker-based watershed segmentation is a popular and useful analysis that is often desired to be performed on images captured by scientific instruments. However, marker-based watershed segmentation cannot be facilitated in a tiled fashion, due to marker-based watershed leaks (e.g., due to discrepancies between local and global choices of marker-based watershed separation lines or boundaries). Marker-based watershed segmentation can be facilitated on a simplified version of a large image, such as a RAG of that large image. But existing techniques do not know how to generate a RAG in a tiled context. Thus, existing techniques can be considered as disadvantageous.

Various embodiments described herein can help to ameliorate one or more of such technical problems. In particular, various embodiments described herein can, as mentioned above, facilitate the computation of RAGs in a tiled context. In various aspects, various embodiments described herein can facilitate this by leveraging a new type of graph structure that the present inventors devised: a PRAG. More specifically, when given an image, various embodiments described herein can involve: breaking the image up into tiles; computing a PAG for each tile; computing an MST for each PAG (e.g., via Boruvka's algorithm); computing an MSF for each MST (e.g., by deleting max-weight edges based on given root pairs); flagging or designating border trees and interior trees of each MSF; generating a flagged MST for each flagged MSF (e.g., by reinserting deleted edges); converting each flagged MST into a PRAG (e.g., by preserving border regions but condensing interior regions into respective region nodes); and merging all of the PRAGs together into a single RAG (e.g., by coupling respective border regions of adjacent PRAGs to form new interior regions, and condensing such new interior regions into new region nodes). Once all of the PRAGs are merged together, the resultant graph structure can have only region nodes and their associated edges remaining; all of the border regions that were previously in the individual PRAGs can have been converted into new interior regions via merging and then condensed into new region nodes. In this way, various embodiments described herein can be considered as computing a RAG in a tiled fashion (e.g., based on tiles of a large image, rather than based on the entirety of the large image itself). After the RAG is computed, various embodiments described herein can involve performing marker-based watershed segmentation on the RAG. So, marker-based watershed segmentation can be facilitated, notwithstanding the image having been broken up into tiles. In other words, various embodiments described herein can allow or enable computers to perform activities or functionalities that they were previously unable to perform: RAG construction, and thus marker-based watershed segmentation, in a tiled fashion or tiled context. After all, existing techniques cannot accurately perform marker-based watershed segmentation on image tiles. Although existing techniques can accurately perform marker-based watershed segmentation on a RAG of an image, existing techniques know only how to generate a RAG from an entirety of an image; existing techniques do not know how to generate a RAG from image tiles. Thus, various embodiments described herein can be considered as addressing or ameliorating various technical problems or disadvantages that plague existing techniques. For at least these reasons, various embodiments described herein can be considered as a concrete and tangible technical improvement in the field of marker-based watershed segmentation. Accordingly, various embodiments described herein certainly qualify as useful and practical applications of computers.

Furthermore, various embodiments described herein can control real-world tangible devices based on the disclosed teachings. For example, various embodiments described herein can electronically activate, deactivate, or otherwise actuate real-world hardware (e.g., ion beam emitters, ion focusing lenses, carrier fluid valves/pumps) of real-world scientific instruments (e.g., electron energy-loss microscopes), perform real-world analyses on real-world data captured by those real-world scientific instruments (e.g., compute marker-based watershed segmentation basins for images captured by scientific instruments), and can electronically render the results of such real-world analyses on real-world computer screens (e.g., can visually render computed segmentation basins to be viewable by users or technicians).

FIG. 1 illustrates an example, non-limiting block diagram of a scientific instrument module 102 in accordance with various embodiments described herein.

In various embodiments, the scientific instrument module 102 can be implemented by circuitry (e.g., including electrical or optical components), such as a programmed computing device. Logic of the scientific instrument module 102 can be included in a single computing device or can be distributed across multiple computing devices that are in communication with each other as appropriate. Examples of computing devices that may, singly or in combination, implement the scientific instrument module 102 are discussed herein with reference to FIGS. 32 and 34, and examples of systems or networks of interconnected computing devices, in which the scientific instrument module 102 may be implemented across one or more of the computing devices, are discussed herein with reference to FIGS. 33 and 35.

The scientific instrument module 102 can include first logic 104, second logic 106, and third logic 108. As used herein, the term "logic" can include an apparatus that is to perform a set of operations associated with the logic. For example, any of the logic elements included in the scientific instrument module 102 can be implemented by one or more computing devices programmed with instructions to cause one or more processing devices of the computing devices to perform the associated set of operations. In a particular embodiment, a logic element may include one or more non-transitory computer-readable media having instructions thereon that, when executed by one or more processing devices of one or more computing devices, cause the one or more computing devices to perform the associated set of operations. As used herein, the term "module" can refer to a collection of one or more logic elements that, together, perform a function associated with the module. Different ones of the logic elements in a module may take the same form or may take different forms. For example, some logic in a module may be implemented by a programmed general-purpose processing device, while other logic in a module may be implemented by an application-specific integrated circuit (ASIC). In another example, different ones of the logic elements in a module may be associated with different sets of instructions executed by one or more processing devices. A module can omit one or more of the logic elements depicted in the associated drawings; for example, a module may include a subset of the logic elements depicted in the associated drawings when that module is to perform a subset of the operations discussed herein with reference to that module.

In various embodiments, there can be a scientific instrument corresponding to the scientific instrument module 102. In various aspects, the scientific instrument can be any suitable computerized device that can electronically measure some scientifically-relevant, clinically-relevant, or research-relevant characteristic, property, or attribute of an analytical specimen (e.g., of a known or unknown mixture, compound, or collection of matter). As a non-limiting example, a scientific instrument can be a mass spectrometer that is operatively coupled to a gas chromatograph or a liquid chromatograph. In such case, the scientific instrument can measure or determine ion spectra (e.g., relative ion abundance as a function of mass-to-charge ratio) of the analytical specimen. As another non-limiting example, a scientific instrument can be a scanning electron microscope. In such case, the scientific instrument can measure or determine a surface topography of the analytical specimen. As yet another non-limiting example, a scientific instrument can be a transmission electron microscope. In such case, the scientific instrument can measure or determine internal structural details of the analytical specimen. As a more general non-limiting example, a scientific instrument can be any suitable type of charged-particle microscope (e.g., some types of microscopes can use beams of non-electron ions to capture images).

In various embodiments, the first logic 104 can access an image that is captured or otherwise generated by the scientific instrument. In various aspects, the image can be any suitable pixel array or voxel array that can depict or illustrate any suitable analytical specimen.

In various embodiments, the second logic 106 can construct, in tile-wise fashion, a region adjacency graph for the image. In various aspects, such construction can be based on a plurality of pixel-region adjacency graphs that respectively correspond to a plurality of tiles of the image. More specifically, the second logic 106 can involve decomposing the image into the plurality of tiles and generating, for each tile, a respective pixel adjacency graph, thereby yielding a plurality of pixel adjacency graphs. In various instances, the second logic 106 can involve converting each of the plurality of pixel adjacency graphs into a respective minimum spanning tree, via application of Boruvka's algorithm. This can yield a plurality of minimum spanning trees. In various cases, the second logic 106 can involve converting each of the plurality of minimum spanning trees into a respective minimum spanning forest, by deleting maximum-weight edges that sit along paths coupling respective root nodes. This can yield a plurality of minimum spanning forests. In various aspects, the second logic 106 can involve flagging or otherwise designating border trees and interior trees of each of the plurality of minimum spanning forests, thereby yielding a plurality of flagged minimum spanning forests. In various aspects, the second logic 106 can involve converting each of the plurality of flagged minimum spanning forests into a respective flagged minimum spanning tree, via reinsertion of whatever edges were previously deleted based on root paths. This can yield a plurality of flagged minimum spanning trees. In various instances, the second logic 106 can involve converting each of the plurality of flagged minimum spanning trees into a respective one of the plurality of pixel-region adjacency graphs, by replacing interior regions with individual region nodes. In various cases, the second logic 106 can involve merging the plurality of pixel-region adjacency graphs together, by coupling border regions of adjacent pixel-region adjacency graphs that share borders. Such coupling can yield new interior regions, which can subsequently be replaced with new region nodes. After all of such merging is complete, the resultant graph structure can be considered as the region adjacency graph of the image.

In various embodiments, the third logic 108 can apply marker-based watershed segmentation to the region adjacency graph of the image, thereby yielding one or more marker-based watershed segmentation basins. In some aspects, the third logic 108 can involve transmitting or sharing the one or more marker-based watershed segmentation basins with any other computing device. In other aspects, the third logic 108 can involve visually displaying the one or more marker-based watershed segmentation basins on any suitable computer screen or computer monitor. In any case, the one or more marker-based watershed segmentation basins can be considered as having been generated in a tiled context, which existing techniques do not know how to accurately accomplish.

Accordingly, the scientific instrument module 102 can facilitate marker-based watershed segmentation, via tiled region adjacency graph computation that is accomplished by leveraging pixel-region adjacency graphs.

Figure 2:
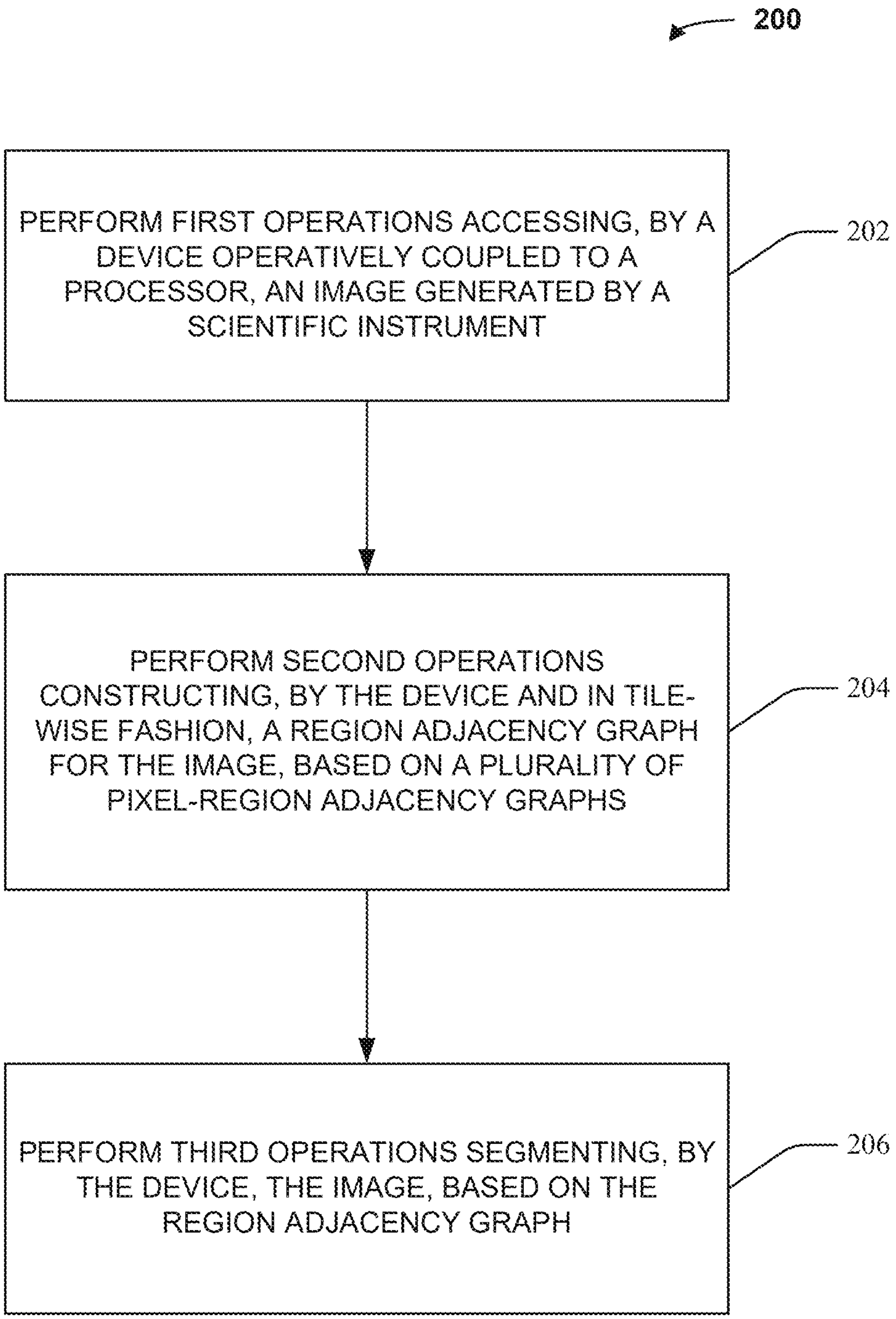
FIG. 2 illustrates an example, non-limiting flow diagram of a computer-implemented method in accordance with various embodiments described herein.

FIG. 2 is an example, non-limiting flow diagram of a computer-implemented method 200 in accordance with various embodiments described herein. The operations of the computer-implemented method 200 may be used in any suitable context to perform any suitable operations (e.g., can be performed by or used in conjunction with any of the various modules, computing devices, or graphical user interfaces described with respect to of FIGS. 1, 31, 32, 33, 34, and 35). Operations are illustrated once each and in a particular order in FIG. 2, but the operations may be reordered or repeated as desired and appropriate (e.g., different operations performed may be performed in parallel, as suitable).

In various aspects, act 202 can include performing first operations accessing, by a device operatively coupled to a processor, an image generated by a scientific instrument. In various cases, the first logic 104 can perform or otherwise facilitate act 202.

In various instances, act 204 can include performing second operations constructing, by the device and in tile-wise fashion, a region adjacency graph for the image, based on a plurality of pixel-region adjacency graphs. In various cases, the second logic 106 can perform or otherwise facilitate act 204.

In various aspects, act 206 can include segmenting, by the device, the image, based on the region adjacency graph. In some instances, such segmentation can be accomplished via the marker-based watershed segmentation algorithm. In various cases, the third logic 108 can perform or otherwise facilitate act 206.

Accordingly, the computer-implemented method 200 can facilitate marker-based watershed segmentation, via tiled region adjacency graph computation that is accomplished by leveraging pixel-region adjacency graphs.

Figure 3:
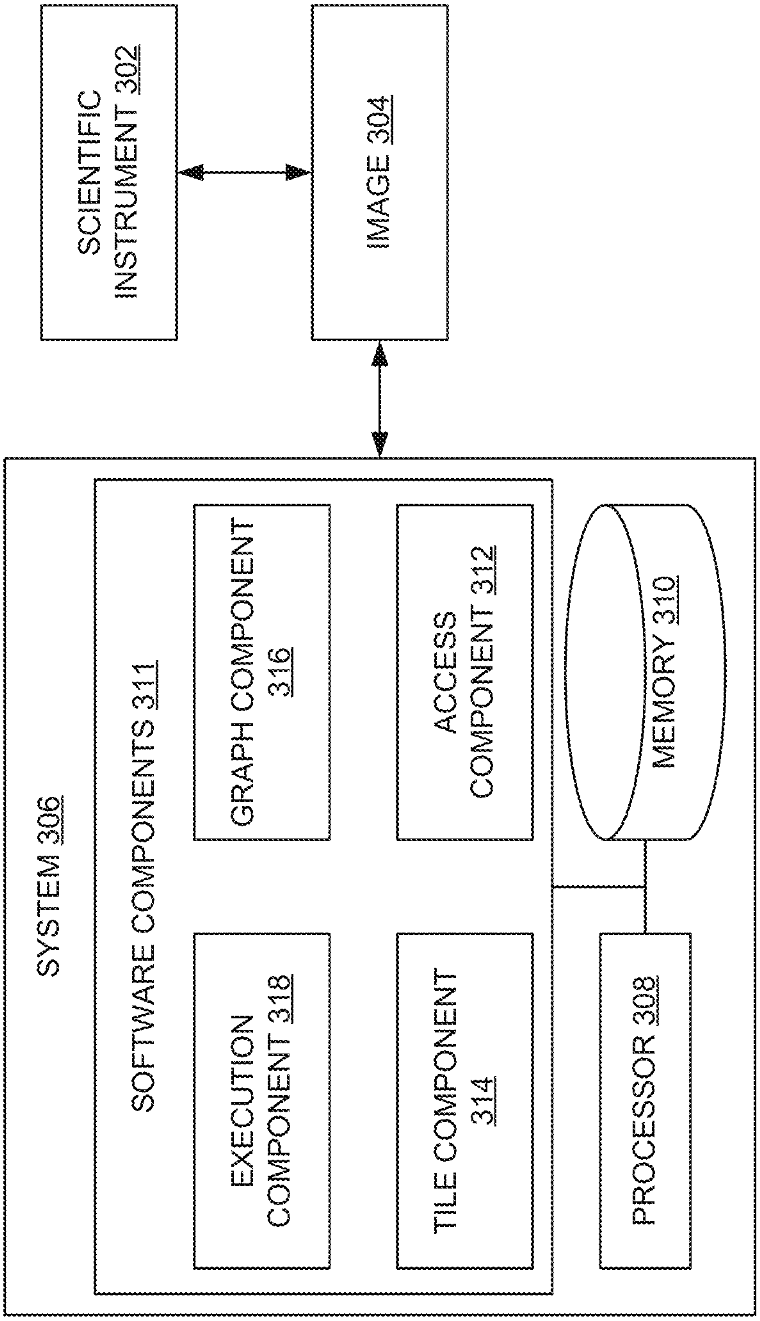
FIG. 3 illustrates a block diagram of an example, non-limiting system that facilitates tiled region adjacency graph computation via pixel-region adjacency graphs in accordance with one or more embodiments described herein.

FIG. 3 illustrates a block diagram of an example, non-limiting system that can facilitate tiled region adjacency graph computation via pixel-region adjacency graphs in accordance with one or more embodiments described herein.

In various embodiments, there can be a scientific instrument 302. In various aspects, the scientific instrument 302 can be as described above. That is, the scientific instrument 302 can be any suitable computerized device that can electronically measure any suitable scientifically-relevant, clinically-relevant, or research-relevant characteristic, attribute, or property of any suitable analytical specimen. In particular, the scientific instrument 302 can be a charged-particle microscope. In such case, the scientific instrument 302 can leverage its constituent hardware (e.g., electron sources, anodes, condenser lenses, condenser apertures, scan coils, objective lenses, objective apertures, deflectors, condensers, stigmators, electron detectors, X-ray detectors, actuatable specimen stages) to electronically generate or capture an image 304 of any given analytical specimen.

In various aspects, the image 304 can exhibit any suitable format, size, or dimensionality. As a non-limiting example, the image 304 can be an x-by-y pixel array, for any suitable positive integers x and y. In such case, the image 304 can be considered as having a total of xy pixels, with each pixel having a corresponding intensity value. As another non-limiting example, the image 304 can be an x-by-y-by-z voxel array, for any suitable positive integers x, y, and z. In such case, the image 304 can be considered as having a total of xyz voxels, with each voxel having a corresponding intensity value.

In any case, a system 306 can be electronically integrated (e.g., via any suitable wired or wireless electronic connections) with the image 304 or with the scientific instrument 302. In various aspects, since the image 304 can visually illustrate or depict the analytical specimen, it can be desired to perform marker-based watershed segmentation on the image 304, so as to derive, glean, or otherwise uncover structural information regarding the analytical specimen. However, in some instances, the image 304 can be very large in size. As a non-limiting example, the image 304 can take up tens, hundreds, or even thousands of gigabytes of computer memory. Accordingly, it can be desired to perform marker-based watershed segmentation on the image 304 in a tiled fashion. As described herein, the system 306 can facilitate such marker-based watershed segmentation.

In various aspects, the system 306 can comprise a processor 308 (e.g., computer processing unit, microprocessor) and a non-transitory computer-readable memory 310 that is operably or operatively or communicatively connected or coupled to the processor 308. The non-transitory computer-readable memory 310 can store computer-executable instructions which, upon execution by the processor 308, can cause the processor 308 or other components of the system 306 (e.g., access component 312, tile component 314, graph component 316, execution component 318) to perform one or more acts. In various embodiments, the non-transitory computer-readable memory 310 can store computer-executable components (e.g., access component 312, tile component 314, graph component 316, execution component 318), and the processor 308 can execute the computer-executable components.

In various embodiments, the system 306 can comprise an access component 312. In various aspects, the access component 312 can electronically access the scientific instrument 302. That is, the access component 312 can electronically communicate or otherwise electronically interact with (e.g., transmit electronic instructions or commands to, receive electronic data from) the scientific instrument 302. Accordingly, the access component 312 can be considered as a proxy or conduit through which other components of the system 306 can interact with, communicate with, or otherwise manipulate the scientific instrument 302. In various instances, the access component 312 can electronically access the image 304. That is, the access component 312 can electronically receive, electronically retrieve, or otherwise electronically obtain the image 304, from any suitable electronic source or database (not shown). As a non-limiting example, the access component 312 can electronically receive, retrieve, or otherwise obtain the image 304 from the scientific instrument 302. In any case, the access component 312 can be considered as a proxy or conduit through which other components of the system 306 can interact with or otherwise manipulate the image 304. However, these are mere non-limiting examples. In other cases, the access component 312 can be omitted, and any other components of the system 306 can communicate or interact directly with the scientific instrument 302 or with the image 304.

In various embodiments, the system 306 can comprise a tile component 314. In various aspects, the tile component 314 can, as described herein, decompose the image 304 into a plurality of tiles.

In various embodiments, the system 306 can comprise a graph component 316. In various instances, the graph component 316 can, as described herein, generate a region adjacency graph for the image 304, based on the plurality of tiles. In various cases, the graph component 316 can facilitate such generation by leveraging a plurality of pixel-region adjacency graphs that respectively correspond to the plurality of tiles.

In various embodiments, the system 306 can comprise an execution component 318. In various aspects, the execution component 318 can, as described herein, perform marker-based watershed segmentation on the region adjacency graph, thereby yielding one or more marker-based watershed segmentation basins for the image 304.

Note that, in various instances, the access component 312, the tile component 314, the graph component 316, and the execution component 318 can collectively be considered as being one or more software components 311 of the system 306. In various aspects, it should be appreciated that the one or more software components 311 are described primarily herein as comprising four components (e.g., the access component 312, the tile component 314, the graph component 316, and the execution component 318) for ease of explanation and illustration. However, the one or more software components 311 are not limited to being implemented as exactly such four components in every embodiment. Indeed, in some embodiments, the functionalities described herein of such four components can be combined in any suitable fashions, so as to be implemented in or by fewer than four components (e.g., in some cases, a single component can perform all of the functionalities that are described herein with respect to the access component 312, the tile component 314, the graph component 316, and the execution component 318). In other embodiments, the functionalities described herein of such four components can instead be distributed, separated, split, or fragmented in any suitable fashions, so as to be implemented in or by more than four components (e.g., two or more components can facilitate the functionalities that are performable by the access component 312; two or more components can facilitate the functionalities that are performable by the tile component 314; two or more components can facilitate the functionalities that are performable by the graph component 316; two or more components can facilitate the functionalities that are performable by the execution component 318).

Figure 4:
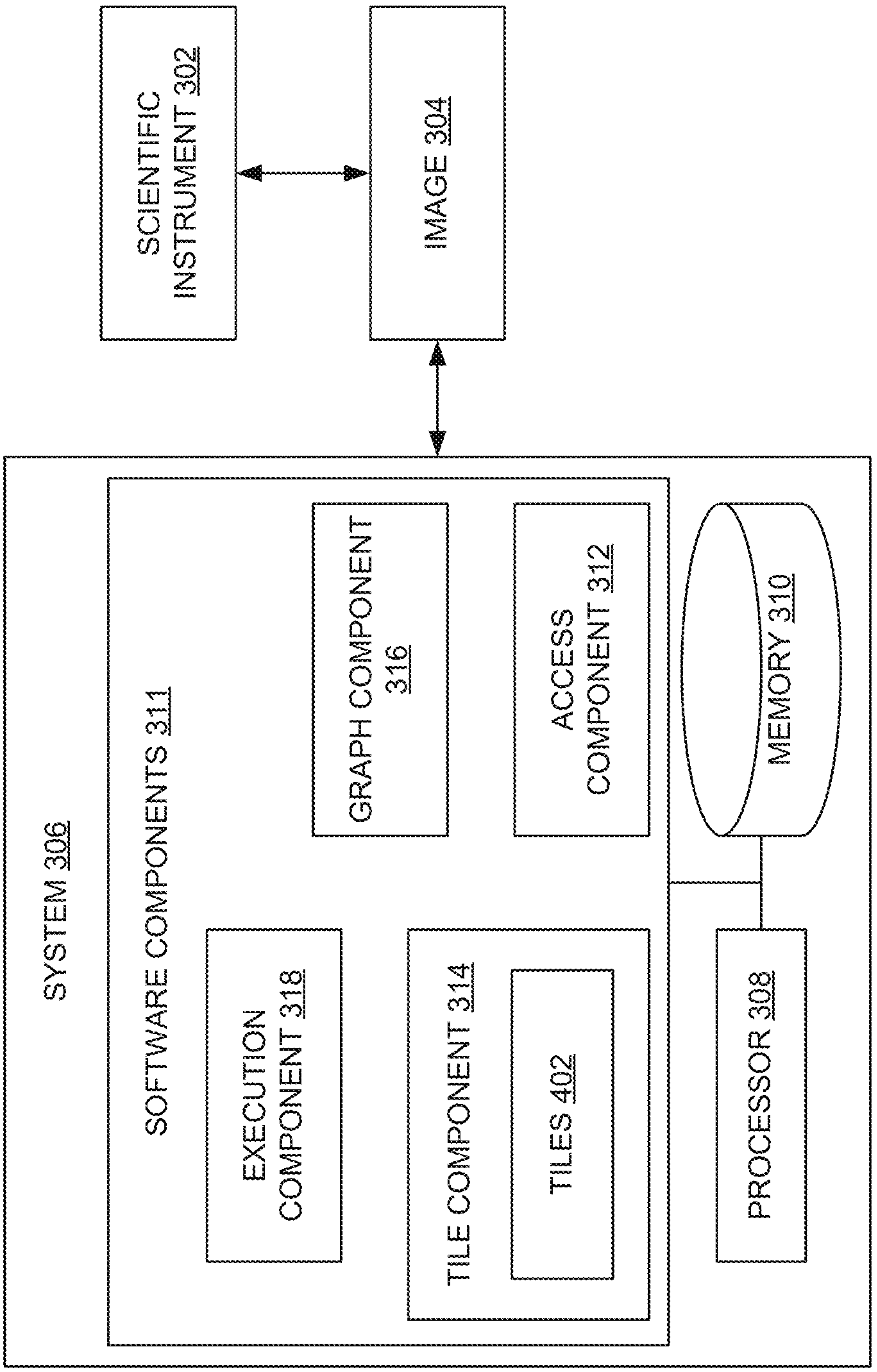
FIG. 4 illustrates a block diagram of an example, non-limiting system including a plurality of tiles that facilitates tiled region adjacency graph computation via pixel-region adjacency graphs in accordance with one or more embodiments described herein.

FIG. 4 illustrates a block diagram of an example, non-limiting system including a plurality of tiles that can facilitate tiled region adjacency graph computation via pixel-region adjacency graphs in accordance with one or more embodiments described herein.

In various embodiments, the tile component 314 can electronically decompose or otherwise break-up the image 304 into a plurality of tiles 402, where the plurality of tiles 402 can comprise any suitable number of tiles. Non-limiting aspects are described with respect to FIGS. 5-7.

Figure 5:
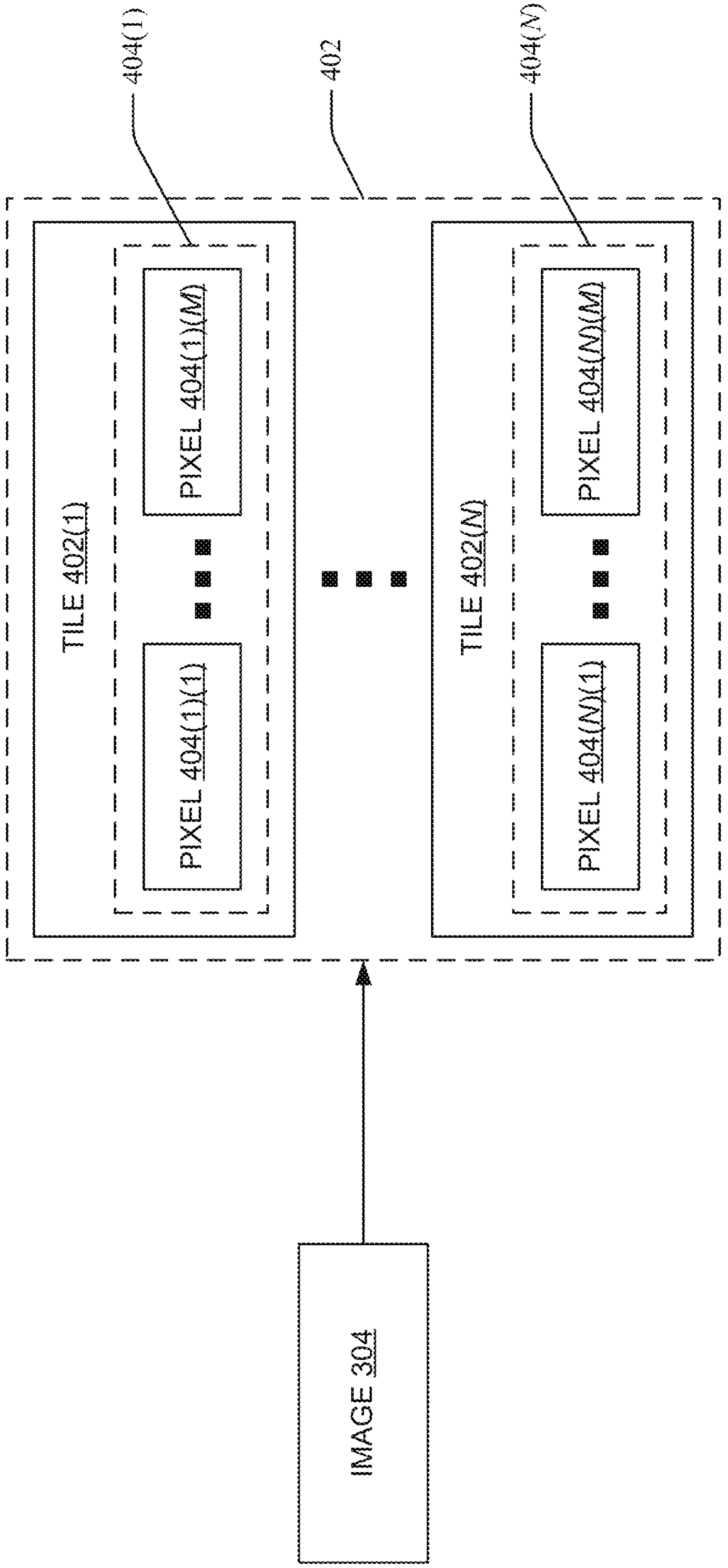
FIGS. 5-7 illustrate example, non-limiting block diagrams regarding a plurality of tiles in accordance with one or more embodiments described herein.
Figure 6:
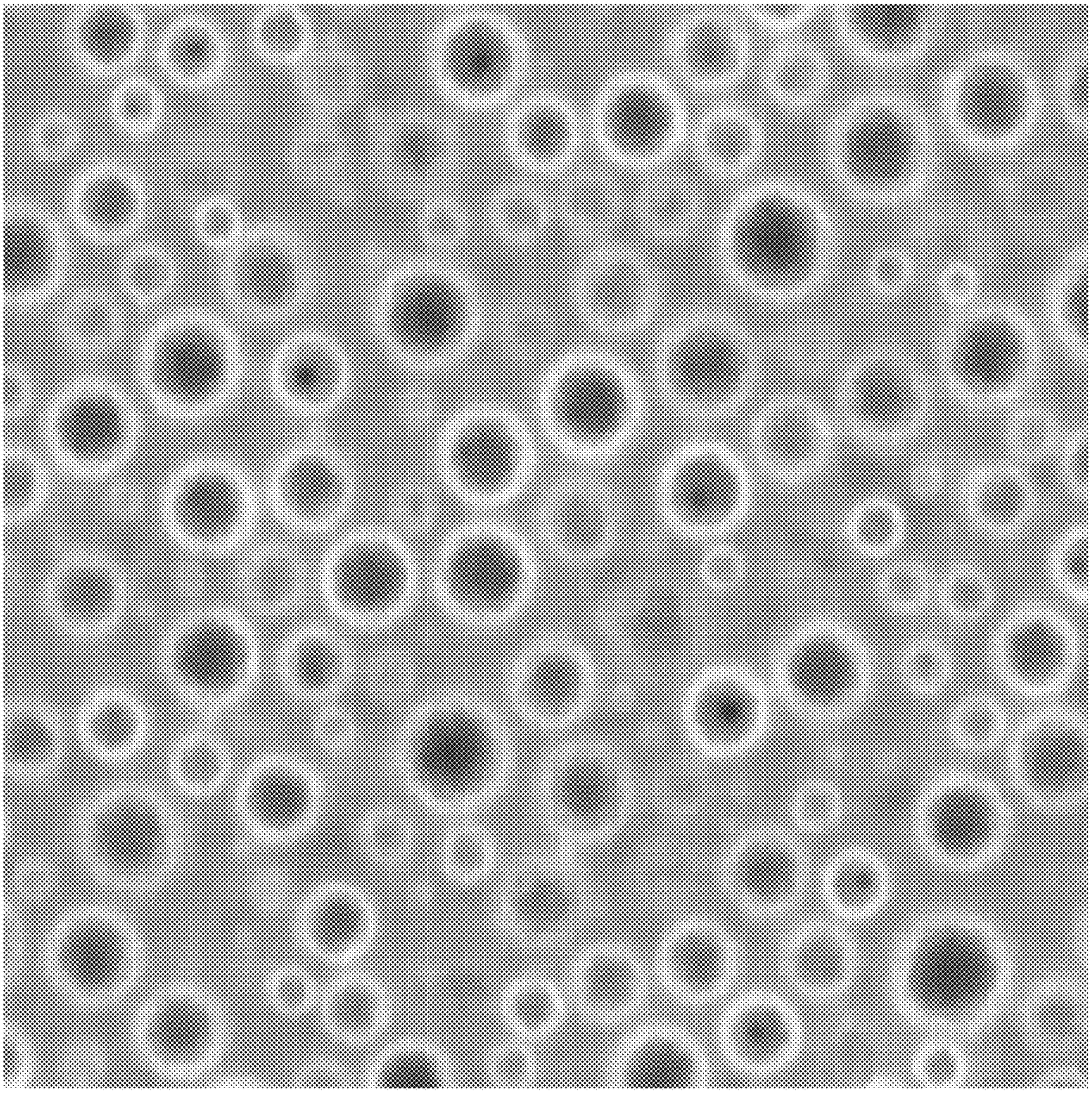
Figure 7:
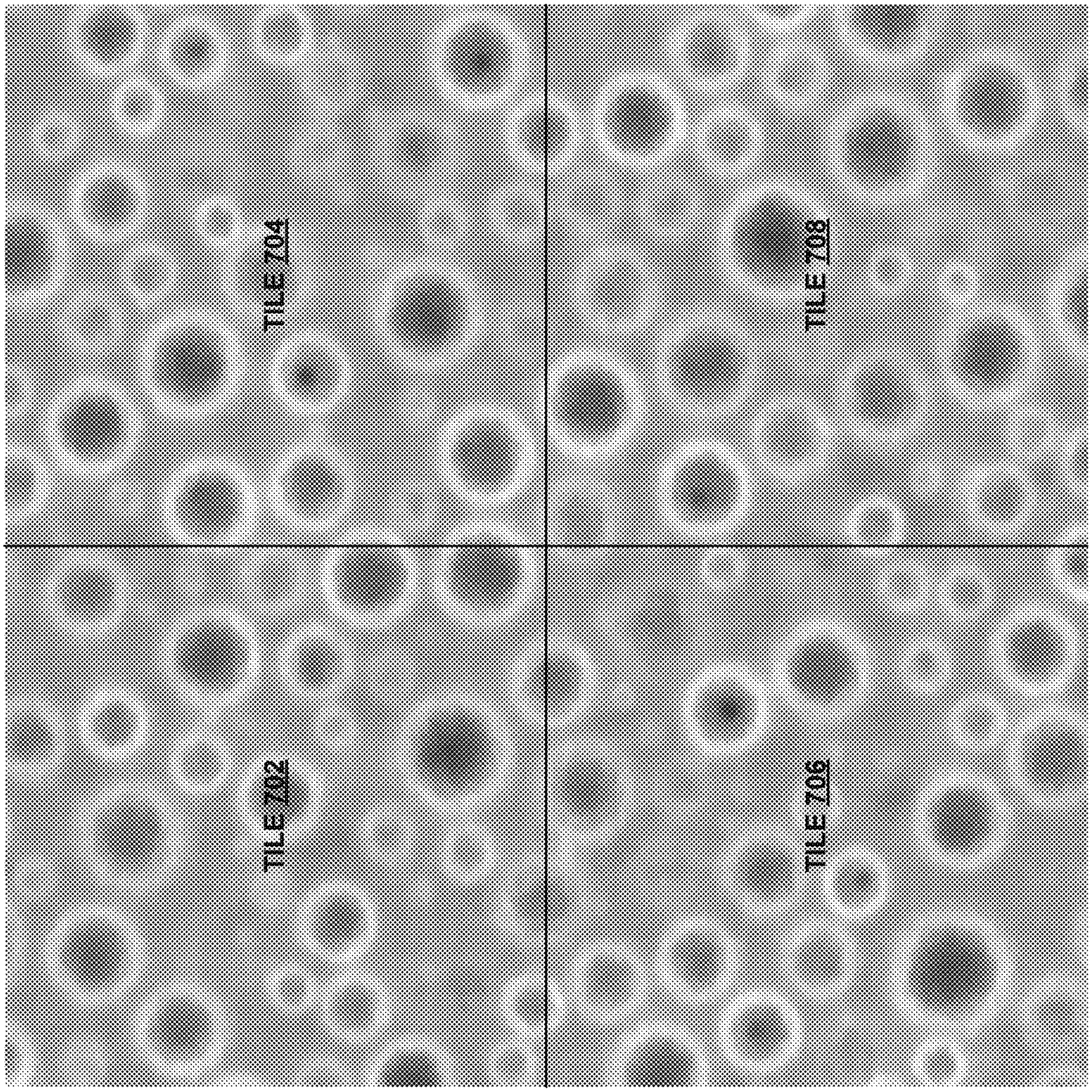

FIGS. 5-7 illustrate example, non-limiting block diagrams regarding the plurality of tiles 402 in accordance with one or more embodiments described herein.

First, consider FIG. 5. In various embodiments, as shown, the plurality of tiles 402 can comprise n tiles, for any suitable positive integer n>1: a tile 402(1) to a tile **402(*n*). In various aspects, each of the plurality of tiles 402 can be a contiguous collection, group, or subset of pixels (or voxels) of the image 304. Accordingly, each of the plurality of tiles 402 can be considered as a discrete, multi-pixel (or multi-voxel) fragment or section of the image 304**.

As a non-limiting example, the tile 402(1) can comprise a plurality of pixels 404(1). Note that, although pixels are being described herein for ease of explanation and illustration, analogous or equivalent embodiments can be applied to voxels. In various instances, the plurality of pixels 404(1) can comprise m pixels, for any suitable positive integer m>1: a pixel 404(1)(1) to a pixel **404(1)(*m*). In various cases, each of the plurality of pixels 404(1) can be a unique or distinct pixel from the image 304. In various aspects, the plurality of pixels 404(1) can be contiguous. In other words, all of the plurality of pixels 404(1) can, as positioned within the image 304, be either directly or indirectly touching each other. In still other words, for any two pixels in the plurality of pixels 404(1), those two pixels can either be: touching or adjacent to each other; or coupled together by a chain, string, or line of other pixels that are within the tile 402(1) and each consecutive pair of which are touching or adjacent to each other. In various instances, the tile 402(1) can exhibit any suitable shape. That is, the plurality of pixels 404(1) can be positioned within the image 304 so as to form any suitably-shaped arrangement or layout. Indeed, in some cases, the plurality of pixels 404(1) can be positioned in the image 304 so as to form any suitable rectilinear arrangement or layout (e.g., such that the tile 402(1) is a square or rectangle). In such situations, the tile 402(1) can be considered as an a-by-b pixel array, for any suitable positive integers a and b, where ab=m. In other cases, however, the plurality of pixels 404(1) can be positioned in the image 304 so as to form any suitable non-rectilinear arrangement or layout (e.g., such that the tile 402(1)** is a triangle, any other suitable polygon, or any other suitable non-regular shape).

As another non-limiting example, the tile **402(*n*) can comprise a plurality of pixels 404(*n*). In various instances, the plurality of pixels 404(*n*) can comprise m pixels: a pixel 404(*n*)(1) to a pixel 404(*n*)(*m*). As above, each of the plurality of pixels 404(*n*) can be a unique or distinct pixel from the image 304, and the plurality of pixels 404(*n*) can be contiguous. That is, all of the plurality of pixels 404(*n*) can, as positioned within the image 304, be either directly or indirectly touching each other (e.g., for any two pixels in the plurality of pixels 404(*n*), those two pixels can either be: touching or adjacent to each other; or coupled together by a chain, string, or line of other pixels that are within the tile 402(*n*) and each consecutive pair of which are touching or adjacent to each other). Also as above, the tile 402(*n*) can exhibit any suitable shape (e.g., the plurality of pixels 404(*n*) can be positioned in the image 304 so as to form any suitable rectilinear arrangement or layout; or the plurality of pixels 404(*n*) can be positioned in the image 304** so as to form any suitable non-rectilinear arrangement or layout).

Note that, although FIG. 5 illustrates the plurality of tiles 402 as all having the same number of pixels (e.g., m) as each other, this is a mere non-limiting example for ease of illustration and explanation. In various embodiments, any of the plurality of tiles 402 can be made up of the same or different numbers of pixels as each other. Relatedly, any of the plurality of tiles 402 can have or exhibit the same or different shapes as each other.

In a non-limiting example, each of the plurality of tiles 402 can be a unique or distinct a-by-b rectilinear pixel array of the image 304, for any suitable positive integers a and b where ab=m. In some situations, such a-by-b rectilinear pixel arrays can be disjoint with each other. In such cases, none of the plurality of tiles 402 can overlap with each other (e.g., each pixel of the image 304 can belong to exactly one of the plurality of tiles 402), and the union of the plurality of tiles 402 can be equivalent to the image 304 (e.g., the total number of pixels in the image 304 can be equal to nm). In other situations, however, such a-by-b rectilinear pixel arrays can be not disjoint with each other. Indeed, in some cases, any two tiles that are vertically adjacent to each other in the image 304 can share a row of pixels (e.g., the bottom-most row of pixels of the top tile can be the same as the upper-most row of pixels of the bottom tile), and any two tiles that are horizontally adjacent to each other in the image 304 can share a column of pixels (e.g., the right-most column of pixels of the left tile can be the same as the left-most column of pixels of the right tile). In such cases, various of the plurality of tiles 402 can overlap with each other (e.g., at least some pixels of the image 304 can belong to more than one of the plurality of tiles 402), and the symmetric difference (e.g., a type of union operator that avoids double-counting) of the plurality of tiles 402 can be equivalent to the image 304 (e.g., if each pair of adjacent tiles share one or more rows or columns of pixels, then the total number of pixels in the image 304 can be less than nm).

In any case, each of the plurality of tiles 402 can be smaller than the image 304. Indeed, in some instances, each of the plurality of tiles 402 can contain one or more orders of magnitude fewer pixels than the image 304. Accordingly, the plurality of tiles 402 can be individually or independently analyzed, manipulated, or otherwise considered via the consumption of far fewer computational resources than would be needed to analyze, manipulate, or otherwise consider the image 304 in its entirety.

Now, consider FIGS. 6-7. FIG. 6 illustrates a captured image 602. In various aspects, the captured image 602 can be considered as a non-limiting example of the image 304. FIG. 7 shows a non-limiting example of how the captured image 602 can be decomposed or otherwise fragmented into four tiles (e.g., n can be equal to 4): a tile 702, a tile 704, a tile 706, and a tile 708. In the non-limiting example of FIG. 7, each of the tiles 702-708 is a square, contiguous pixel array that can be considered as a respective puzzle-piece of the captured image 602. Indeed, the tile 702 can be considered as an upper-left puzzle-piece of the captured image 602; the tile 704 can be considered as an upper-right puzzle-piece of the captured image 602; the tile 706 can be considered as a lower-left puzzle-piece of the captured image 602; and the tile 708 can be considered as a lower-right puzzle-piece of the captured image 602. In such case, the tile 702 can be considered as being adjacent to the tile 704 and to the tile 706; the tile 704 can be considered as being adjacent to the tile 702 and to the tile 708; the tile 706 can be considered as being adjacent to the tile 702 and to the tile 708; and the tile 708 can be considered as being adjacent to the tile 704 and to the tile 706. As mentioned above, the tiles 702-708 can, in some aspects, be disjoint or non-overlapping with each other. That is, none of the tiles 702-708 can share pixels. In other aspects, however, the tiles 702-708 can instead be non-disjoint or overlapping with each other. That is, the tiles 702-708 can share pixels. For instance, the tiles 702 and 704 can share a column of pixels (e.g., the right-most column of the tile 702 can contain the same pixels as the left-most column of the tile 704). As another instance, the tiles 702 and 706 can share a row of pixels (e.g., the bottom-most row of the tile 702 can contain the same pixels as the upper-most row of the tile 706). As yet another instance, the tiles 704 and 708 can share a row of pixels (e.g., the bottom-most row of the tile 704 can contain the same pixels as the upper-most row of the tile 708). As even another instance, the tiles 706 and 708 can share a column of pixels (e.g., the right-most column of the tile 706 can contain the same pixels as the left-most column of the tile 708).

Although FIG. 7 depicts the captured image 602 as being decomposed or fragmented into four tiles, this is a mere non-limiting example for ease of explanation and illustration. In various embodiments, the captured image 602 can instead be decomposed into any suitable number of tiles (e.g., the greater the number of tiles, the smaller and more granular each tile can be).

In any case, the tile component 314 can electronically fracture, electronically slice, or otherwise electronically divide the image 304 into the plurality of tiles 402, each of which can be smaller in size (e.g., can consume less memory space) than the image 304.

Figure 8:
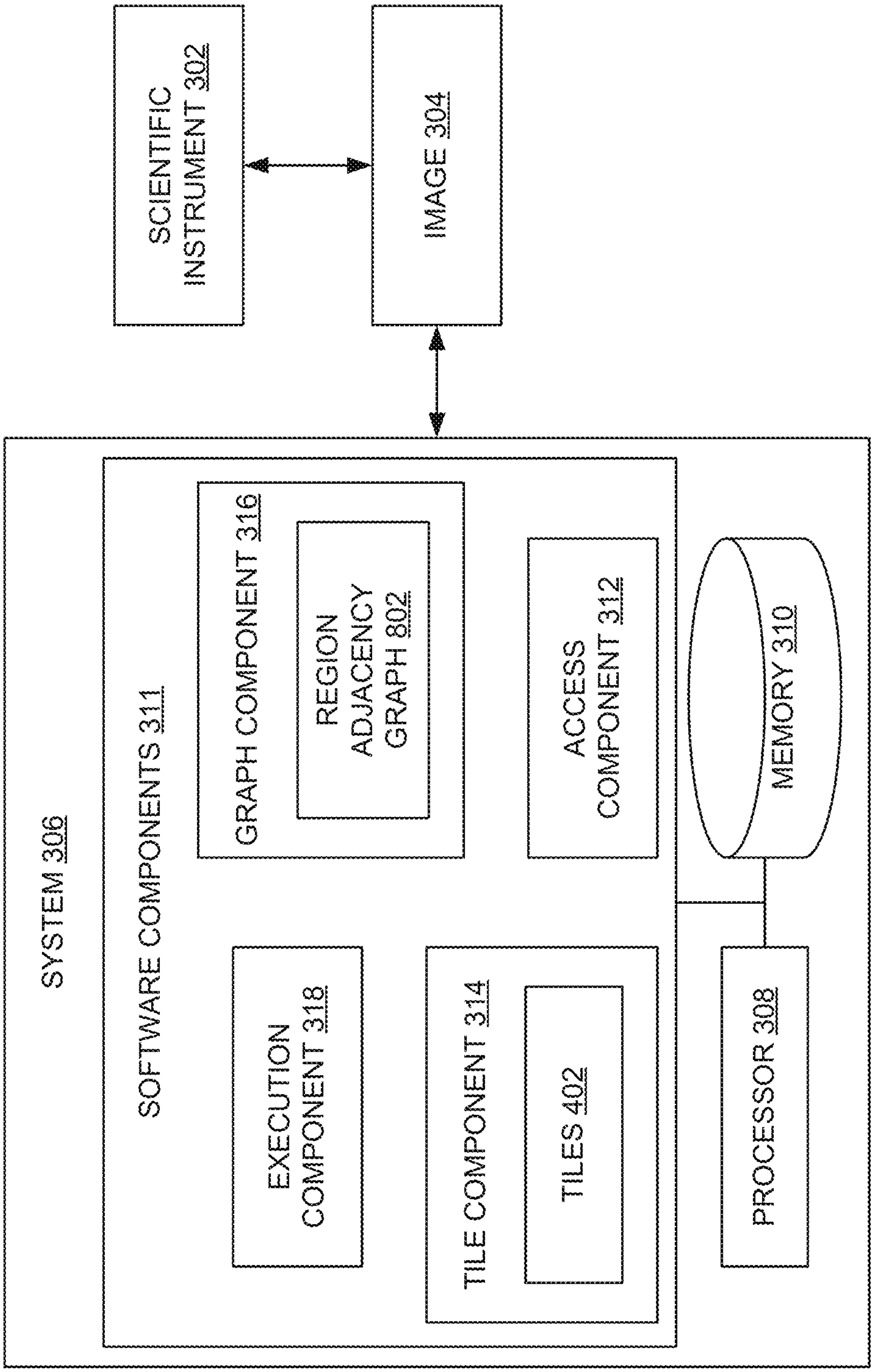
FIG. 8 illustrates a block diagram of an example, non-limiting system including a region adjacency graph that facilitates tiled region adjacency graph computation via pixel-region adjacency graphs in accordance with one or more embodiments described herein.

FIG. 8 illustrates a block diagram of an example, non-limiting system including a region adjacency graph that can facilitate tiled region adjacency graph computation via pixel-region adjacency graphs in accordance with one or more embodiments described herein.

In various embodiments, the graph component 316 can electronically generate a region adjacency graph 802 (hereafter "RAG 802"), based on the plurality of tiles 402. In various aspects, the RAG 802 can be considered as a type of simplified, less-memory-intensive representation of the image 304. Accordingly, marker-based watershed segmentation can be accurately or reliably performed on the region adjacency graph 802, notwithstanding that marker-based watershed segmentation can be accurately or reliably performed on neither the image 304 (e.g., due to excessive sizing of the image 304) nor the plurality of tiles 402 (e.g., due to marker-based watershed leaks). In various instances, the graph component 316 can generate the RAG 802, by leveraging a plurality of pixel-region adjacency graphs that respectively correspond to the plurality of tiles 402. Various non-limiting details are described with respect to FIGS. 9-26.

FIGS. 9-26 illustrate example, non-limiting block diagrams regarding construction or generation of the RAG 802 in accordance with one or more embodiments described herein.

Figure 9:
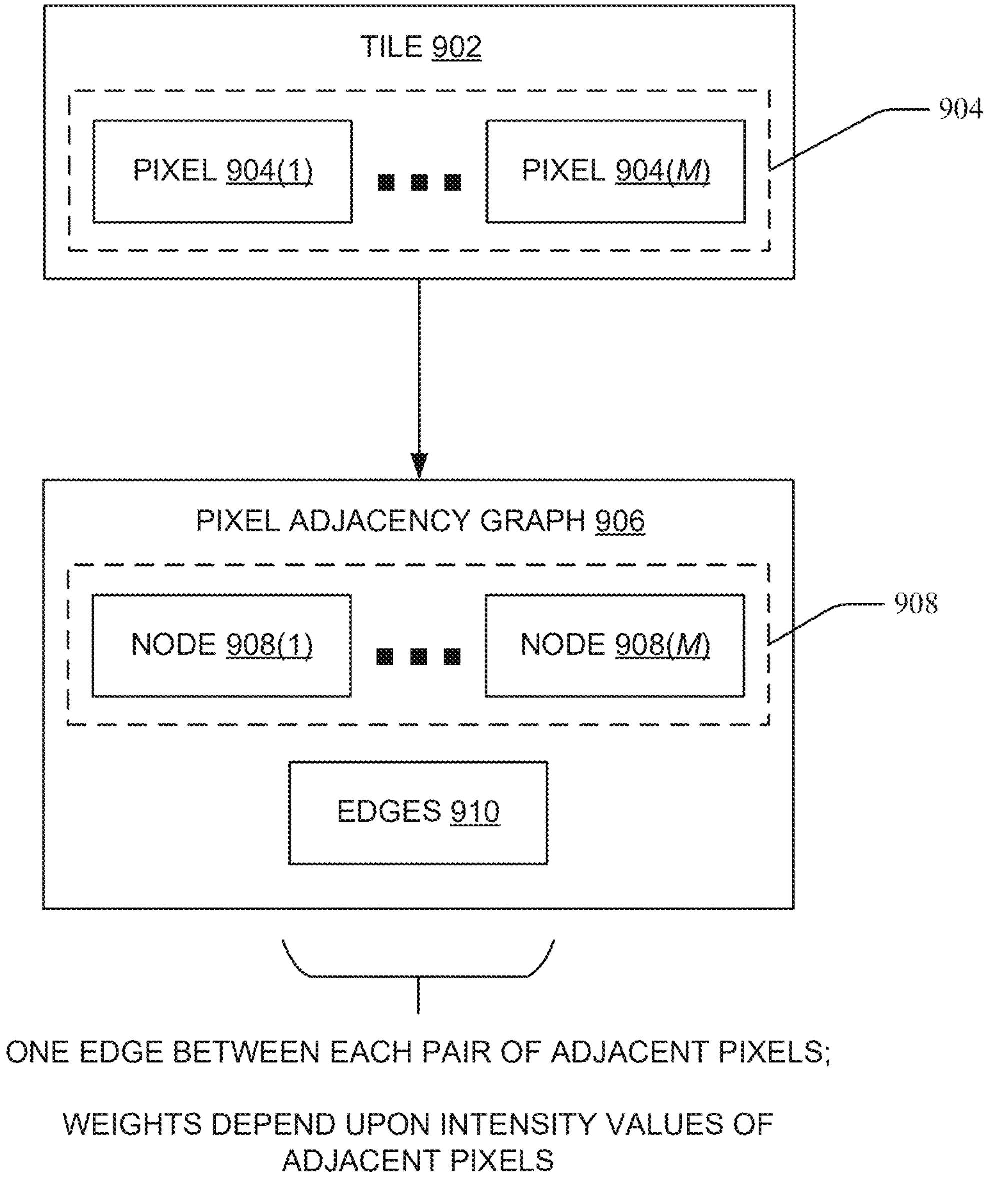
FIGS. 9-26 illustrate example, non-limiting block diagrams regarding construction of a region adjacency graph in accordance with one or more embodiments described herein.

First, consider FIG. 9. In various embodiments, there can be a tile 902. In various aspects, the tile 902 can be any one of the plurality of tiles 402. Accordingly, the tile 902 can comprise a plurality of pixels 904, where the plurality of pixels 904 can comprise m pixels: a pixel 904(1) to a pixel 904(*m*).

In various instances, the graph component 316 can electronically generate a pixel adjacency graph 906 (hereafter "PAG 906") based on the tile 902. In various cases, the PAG 906 can comprise a plurality of nodes 908 and a plurality of edges 910.

In various aspects, the plurality of nodes 908 can respectively correspond (e.g., in one-to-one fashion) with the plurality of pixels 904. Accordingly, since the plurality of pixels 904 can comprise m pixels, the plurality of nodes 908 can comprise m nodes: a node 908(1) to a node 908(*m*). In various instances, each of the plurality of nodes 908 can be considered as representing a respective one of the plurality of pixels 904. As a non-limiting example, the node 908(1) can be considered as representing the pixel 904(1). In some cases, the node 908(1) can thus have whatever intensity value is exhibited by the pixel 904(1). As another non-limiting example, the node 908(*m*) can be considered as representing the pixel 904(*m*). As above, the node 908(*m*) can thus have whatever intensity value is exhibited by the pixel 904(*m*).

In various aspects, the plurality of edges 910 can comprise any suitable number of edges, such that any two of the plurality of nodes 908 that represent adjacent pixels can have an edge between them. As a non-limiting example, suppose that a pixel 904(*i*) and a pixel 904(*j*) are adjacent to each other, for any suitable positive integers 1≤i<j≤m. In such case, the plurality of edges 910 can comprise an edge between a node 908(*i*) and a node 908(*j*). Note that any suitable type of adjacency law or adjacency definition can be implemented to determine or create the plurality of edges 910. Indeed, in some cases, a nearest-neighbor adjacency law or definition can be implemented. In such situations, the pixel 904(*i*) and the pixel 904(*j*) can be considered as adjacent if they are nearest-neighbors of each other. That is, the pixel 904(*i*) and the pixel 904(*j*) can be considered as adjacent if: the pixel 904(*i*) is positioned or located in the tile 902 (and thus in the image 304) immediately above the pixel 904(*j*); the pixel 904(*i*) is positioned or located in the tile 902 (and thus in the image 304) immediately below the pixel 904(*j*); the pixel 904(*i*) is positioned or located in the tile 902 (and thus in the image 304) immediately rightward of the pixel 904(*j*); or the pixel 904(*i*) is positioned or located in the tile 902 (and thus in the image 304) immediately leftward of the pixel 904(*j*). However, in other cases, a next-nearest-neighbor adjacency law or definition can be implemented. In such situations, the pixel 904(*i*) and the pixel 904(*j*) can be considered as adjacent if they are nearest-neighbors of each other or next-nearest-neighbors of each other. That is, the pixel 904(*i*) and the pixel 904(*j*) can be considered as adjacent if: the pixel 904(*i*) is positioned or located in the tile 902 (and thus in the image 304) immediately above the pixel 904(*j*); the pixel 904(*i*) is positioned or located in the tile 902 (and thus in the image 304) immediately below the pixel 904(*j*); the pixel 904(*i*) is positioned or located in the tile 902 (and thus in the image 304) immediately rightward of the pixel 904(*j*); the pixel 904(*i*) is positioned or located in the tile 902 (and thus in the image 304) immediately leftward of the pixel 904(*j*); the pixel 904(*i*) is positioned or located in the tile 902 (and thus in the image 304) immediately to the upper-right of the pixel 904(*j*); the pixel 904(*i*) is positioned or located in the tile 902 (and thus in the image 304) immediately to the upper-left of the pixel 904(*j*); the pixel 904(*i*) is positioned or located in the tile 902 (and thus in the image 304) immediately to the lower-right of the pixel 904(*j*); or the pixel 904(*i*) is positioned or located in the tile 902 (and thus in the image 304) immediately to the lower-left of the pixel 904(*j*). It is to be appreciated that any intermediary type of adjacency law or definition can be implemented, such that any given pixel of the tile 902 is adjacent to any suitable combination of its nearest-neighbors or next-nearest-neighbors.

In various aspects, the plurality of edges 910 can be weighted. In other words, each of the plurality of edges 910 can be assigned or otherwise have a scalar weight. In various instances, the scalar weight assigned to any given edge of the plurality of edges 910 can be based on the intensity values of whatever two nodes that the given edge couples. As a non-limiting example, suppose again that the pixel 904(*i*) and the pixel 904(*j*) are adjacent and are respectively represented by the node 908(*i*) and the node 908(*j*). In such case, there can be a specific edge that couples the node 908(*i*) to the node 908(*j*), and the scalar weight that is assigned to that specific edge can be equal to or otherwise based on any suitable mathematical function of the intensity value of the pixel 904(*i*) and of the intensity value of the pixel 904(*j*). For instance, the scalar weight can be equal to a reciprocal of an absolute value difference between the intensity value of the pixel 904(*i*) and the intensity value of the pixel 904(*j*) (e.g., such that the magnitude of the scalar weight increases as the intensity values of the pixel 904(*i*) and the pixel 904(*j*) become more similar). Alternatively, the scalar weight can be equal to a powerlaw function whose negative exponent is the absolute value difference between the intensity value of the pixel 904(*i*) and the intensity value of the pixel 904(*j*) (e.g., again, such that the magnitude of the scalar weight increases as the intensity values of the pixel 904(*i*) and the pixel 904(*j*) become more similar).

Figure 10:
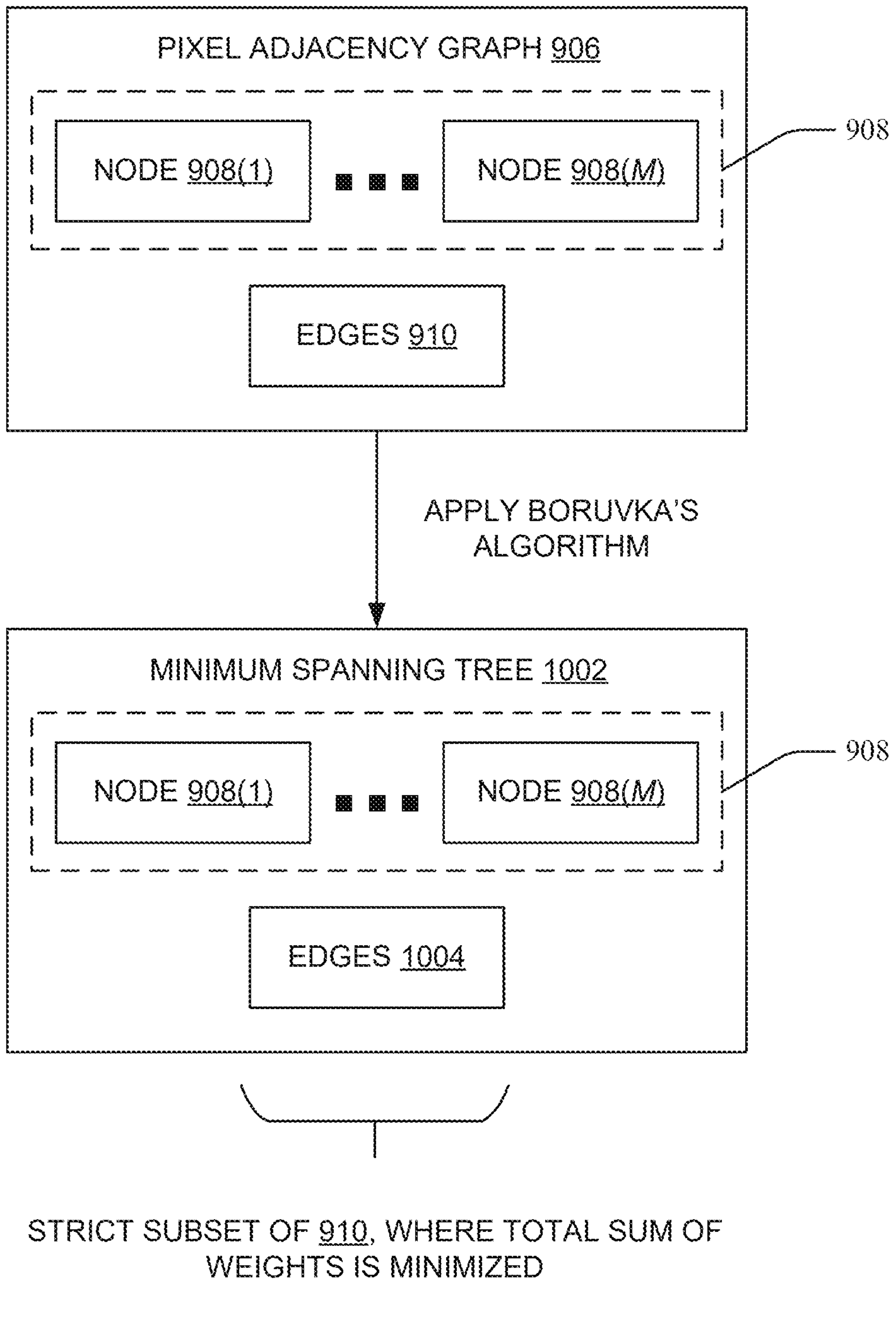

Now, consider FIG. 10. In various embodiments, the graph component 316 can generate a minimum spanning tree 1002 (hereafter "MST 1002"), based on the PAG 906. In various aspects, the graph component 316 can accomplish this, by performing any suitable MST-finding or MST-computation algorithm on the PAG 906. As a non-limiting example, the graph component 316 can perform Boruvka's algorithm on the PAG 906, where Boruvka's algorithm can be considered as a sequence of greedy edge selections that iteratively convert the PAG 906 into the MST 1002. However, any other suitable MST-finding or MST-computation algorithm can be used instead of (or in combination with) Boruvka's algorithm, such as Prim's algorithm or Kruskal's algorithm. In any case, the MST 1002 can comprise the same nodes as the PAG 906, but the MST 1002 can comprise fewer edges than the PAG 906. In particular, the MST 1002 can comprise the plurality of nodes 908, and the MST 1002 can comprise a plurality of edges 1004 instead of the plurality of edges 910. In various instances, the plurality of edges 1004 can be a strict subset of the plurality of edges 910, such that all three of the following occur: (1) for every pair of nodes within the MST 1002, there exists a path in the MST 1002 that couples that pair of nodes; (2) there are no cycles or cyclic paths in the MST 1002; and (3) a total sum of the weights of the plurality of edges 1004 is minimized (hence the term "minimum"). In other words, there can be multiple distinct subsets of the plurality of edges 910 that satisfy (1) and (2) above, and the plurality of edges 1004 can be whichever one of those multiple subsets has a lowest (e.g., minimum) total sum of weights.

Figure 11:
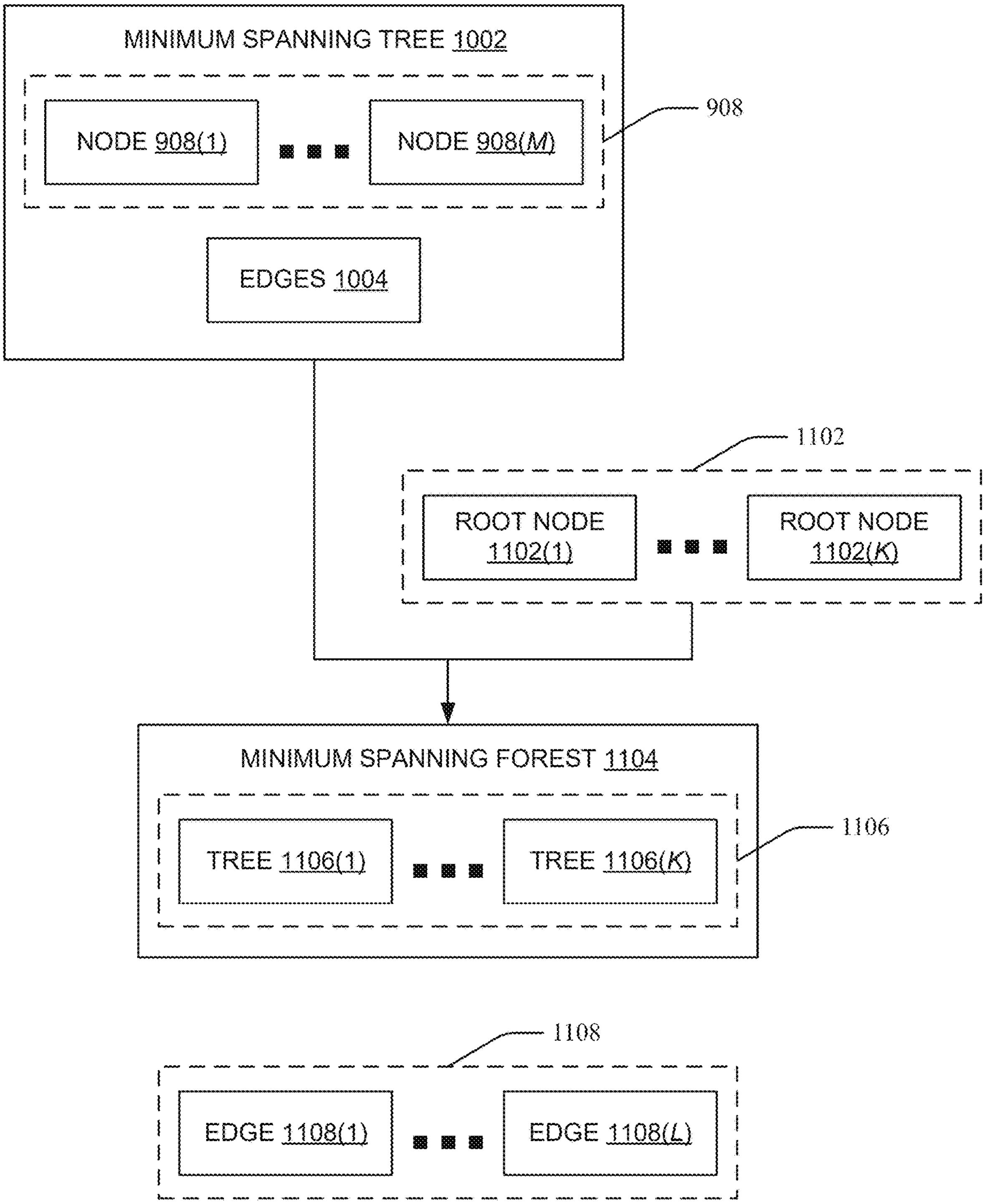

Next, consider FIG. 11. In various aspects, the graph component 316 can identify a plurality of root nodes 1102 for the MST 1002. In various instances, the plurality of root nodes 1102 can comprise k nodes, for any suitable positive integer 1<k<m: a root node 1102(1) to a root node 1102(*k*). In various cases, the root node 1102(1) can be a first one of the plurality of nodes 908 that the graph component 316 has designated as a root. Likewise, the root node 1102(*k*) can be a k-th one of the plurality of nodes 908 that the graph component 316 has designated as a root. In various aspects, the graph component 316 can identify the plurality of root nodes 1102 is any suitable fashion. As a non-limiting example, the graph component 316 can identify the plurality of root nodes 1102 by performing an extended minima operation on the MST 1002. As another non-limiting example, the graph component 316 can identify the plurality of root nodes 1102 in any other suitable random or non-random way (e.g., the graph component 316 can iterate through the plurality of nodes 908; for whichever node is currently under consideration, the graph component 316 can randomly designate or deem that node either as a root or as not-a-root; or there can be k defined or desired locations in the tile 902, and the nodes representing whichever pixels that are positioned at those k defined or desired locations can be designated or deemed as root nodes).

In any case, the graph component 316 can generate a minimum spanning forest 1104 (hereafter "MSF 1104"), based on both the MST 1002 and the plurality of root nodes 1102. Indeed, for each distinct pair of root nodes from the plurality of root nodes 1102, the graph component 316 can: identify a path (if any) that couples that pair of root nodes together; and delete whatever edge from the plurality of edges 910 that is of highest weight on that path. By performing such deletion for every unique pair of the plurality of root nodes 1102, the graph component 316 can be considered as deleting a plurality of edges 1108 from the plurality of edges 910, where the plurality of edges 1108 can comprise l edges for $$l \le \binom{k}{2} = \frac{k!}{(k-2)!\,2!}:$$

an edge 1108(1) to an edge 1108(*l*).

In any case, the MSF 1104 can comprise a plurality of trees 1106. In various instances, the plurality of trees 1106 can respectively correspond to the plurality of root nodes 1102. Thus, since the plurality of root nodes 1102 can comprise k roots, the plurality of trees 1106 can comprise k trees: a tree 1106(1) to a tree 1106(*k*). In various cases, each of the plurality of trees 1106 can be collection of connected nodes from the MST 1002 that comprises a respective one of the plurality of root nodes 1102 and that is not coupled to any others of the plurality of trees 1106. As a non-limiting example, the tree 1106(1) can be a first subset of the plurality of nodes 908 and of the plurality of edges 1004 (less the plurality of edges 1108), such that: the root node 1102(1), but no others of the plurality of root nodes 1102, is in the tree 1106(1); for every pair of nodes within the tree 1106(1), there exists a path in the tree 1106(1) that couples that pair of nodes; there are no cycles or cyclic paths in the tree 1106(1); and there are no paths that couple any node in the tree 1106(1) to any node that is not in the tree 1106(1). As another non-limiting example, the tree 1106(*k*) can be a k-th subset of the plurality of nodes 908 and of the plurality of edges 1004 (less the plurality of edges 1108), such that: the root node 1102(*k*), but no others of the plurality of root nodes 1102, is in the tree 1106(*k*); for every pair of nodes within the tree 1106(*k*), there exists a path in the tree 1106(*k*) that couples that pair of nodes; there are no cycles or cyclic paths in the tree 1106(*k*); and there are no paths that couple any node in the tree 1106(*k*) to any node that is not in the tree 1106(*k*).

Note that the plurality of trees 1106 can be disjoint with each other, such that: the union of all the nodes across the plurality of trees 1106 is equivalent to the plurality of nodes 908; and the union of all the edges across the plurality of trees 1106 is equivalent to the plurality of edges 1004 less the plurality of edges 1108. Additionally, note that different ones of the plurality of trees 1106 can have the same or different numbers of nodes or edges as each other.

It should be appreciated that any suitable electronic techniques can be implemented so as to keep track of which of the plurality of nodes 908 belong to which of the plurality of trees 1106. As a non-limiting example, each of the plurality of trees 1106 can be considered as having its own respective name or identifier, and each of the plurality of nodes 908 can be considered as having a respective label that specifies or indicates to which of the plurality of trees 1106 that node belongs. For instance, an ancillary or separate data table associated with the MSF 1104 can store a belongs-to-which-tree label for each of the plurality of nodes 908, and thus for each of the plurality of pixels 904.

Figure 12:
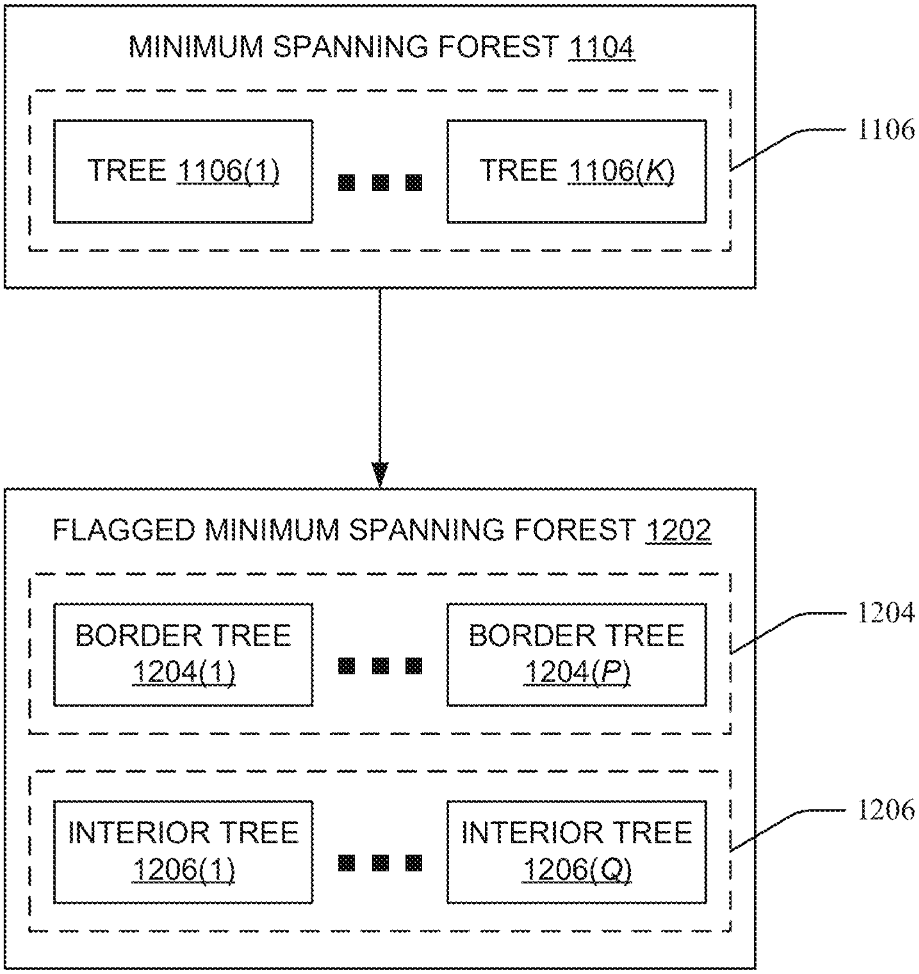

Now, consider FIG. 12. In various aspects, the graph component 316 can generate a flagged minimum spanning forest 1202 (hereafter "flagged MSF 1202"), based on the MSF 1104. As mentioned above, the MSF 1104 can comprise the plurality of trees 1106. In various instances, the graph component 316 can assign or give a respective flag to each of the plurality of trees 1106. In various cases, the flag assigned to any given tree can indicate either that such given tree is a border tree or that such given tree is instead an interior tree. In various aspects, the graph component 316 can flag any given tree as a border tree, in response to determining that the given tree comprises at least one node that is located on a border of the tile 902. In contrast, the graph component 316 can flag any given tree as an interior tree, in response to determining that the given tree comprises no nodes that are located on a border of the tile 902. In various instances, a border of the tile 902 can be discrete portion of an outermost or perimetral boundary of the tile 902 that is adjacent to or otherwise abutting another tile of the plurality of tiles 402. As a non-limiting example, suppose that the tile 902 is rectilinearly shaped (e.g., the plurality of pixels 904 can be arranged in a square or rectangular layout in the image 304). In such case, the tile 902 can be considered as having a maximum of four borders: an upper border; a lower border; a right border; and a left border. In particular, the top-most row of pixels of the tile 902 can be considered as an upper border of the tile 902, if another of the plurality of tiles 402 is located or positioned immediately above the tile 902 in the image 304. However, if no other one of the plurality of tiles 402 is located or positioned immediately above the tile 902, then the tile 902 can be considered as not having an upper border. Likewise, the bottom-most row of pixels of the tile 902 can be considered as a lower border of the tile 902, if another of the plurality of tiles 402 is located or positioned immediately below the tile 902 in the image 304. However, if no other one of the plurality of tiles 402 is located or positioned immediately below the tile 902, then the tile 902 can be considered as not having a lower border. Similarly, the right-most row of pixels of the tile 902 can be considered as a right border of the tile 902, if another of the plurality of tiles 402 is located or positioned immediately rightward of the tile 902 in the image 304. However, if no other one of the plurality of tiles 402 is located or positioned immediately rightward of the tile 902, then the tile 902 can be considered as not having a right border. Moreover, the left-most row of pixels of the tile 902 can be considered as a left border of the tile 902, if another of the plurality of tiles 402 is located or positioned immediately leftward of the tile 902 in the image 304. However, if no other one of the plurality of tiles 402 is located or positioned immediately leftward of the tile 902, then the tile 902 can be considered as not having a left border.

In any case, such flagging or designating can cause the flagged MSF 1202 to comprise a plurality of border trees 1204 and a plurality of interior trees 1206. In various aspects, the plurality of border trees 1204 can comprise p trees: a border tree 1204(1) to a border tree 1204(*p*). In various instances, the plurality of interior trees 1206 can comprise q trees: an interior tree 1206(1) to an interior tree 1206(*q*). Note that p and q can be any suitable positive integers such that p+q=k. In other words, the border tree 1204(1) can be a first one of the plurality of trees 1106 that the graph component 316 flags or designates as a border tree; the border tree 1204(*p*) can be a p-th one of the plurality of trees 1106 that the graph component 316 flags or designates as a border tree; the interior tree 1206(1) can be a first one of the plurality of trees 1106 that the graph component 316 flags or designates as an interior tree; and the interior tree 1206(*q*) can be a q-th one of the plurality of trees 1106 that the graph component 316 flags or designates as an interior tree. Note that such flags or designations can be electronically stored, recorded, or otherwise kept track of in any suitable fashion. As a non-limiting example, an ancillary or separate data table associated with the MSF 1104 can store the border flag or interior flag for each of the plurality of nodes 908 (and thus for each of the plurality of pixels 904), and that ancillary or separate data table together with the MSF 1104 can collectively be considered as forming the flagged MSF 1202. In other words, each of the plurality of nodes 908 can be considered as having a respective label indicating to which of the plurality of trees 1106 that node belongs, and each of the plurality of trees 1106 can be considered as having a respective flag that indicates whether that tree is a border tree or instead an interior tree.

Figure 13:
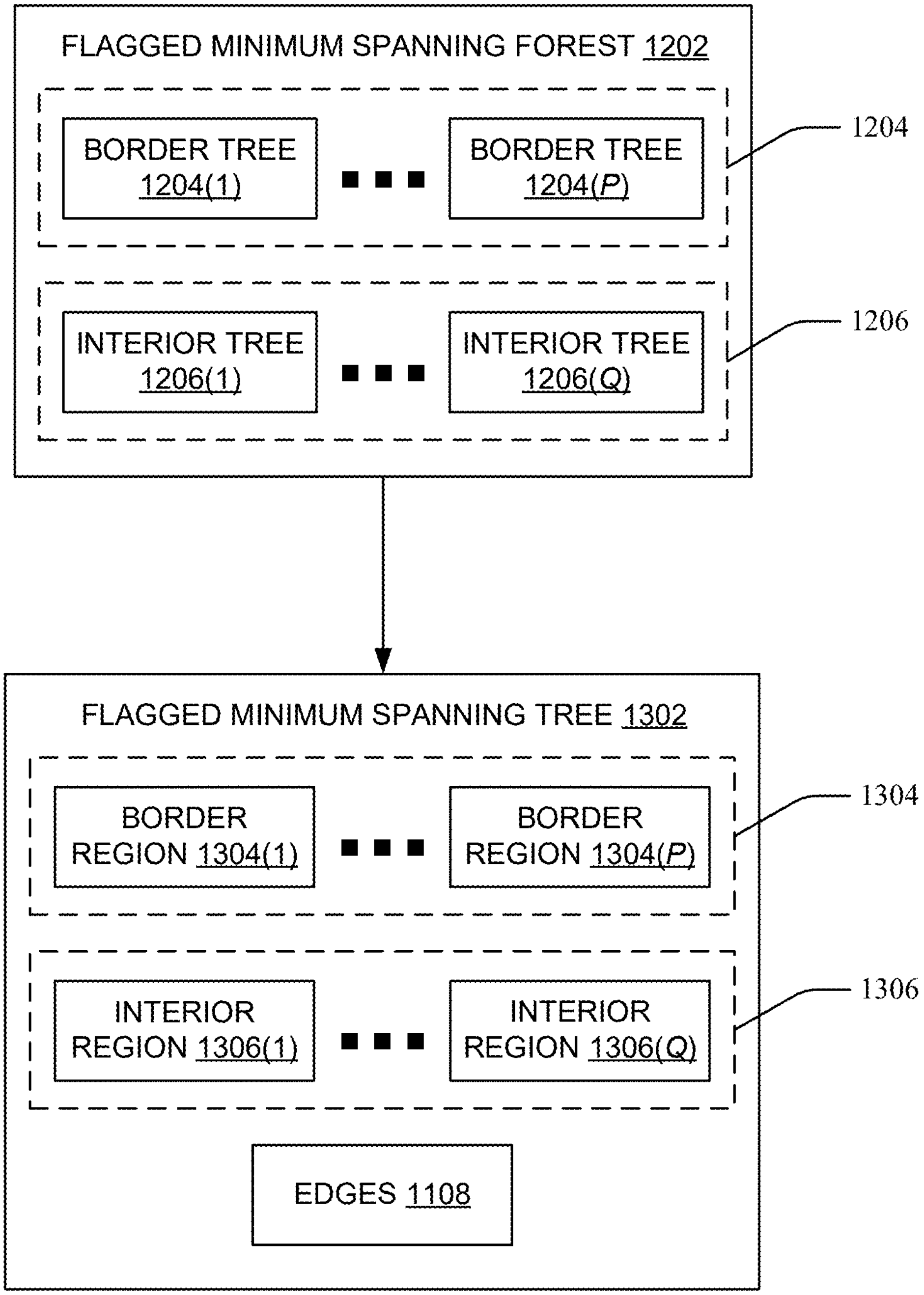

Next, consider FIG. 13. In various aspects, the graph component 316 can generate a flagged minimum spanning tree 1302 (hereafter "flagged MST 1302"), based on the flagged MSF 1202. In various instances, the graph component 316 can accomplish this by reinserting the edges 1108 into the flagged MSF 1202. As a non-limiting example, the graph component 316 can reinsert the edge 1108(1) into the flagged MSF 1202, such that the edge 1108(1) can be located (in the flagged MST 1302) between whichever two nodes of the plurality of nodes 908 it coupled together before its deletion. As another non-limiting example, the graph component 316 can reinsert the edge 1108(*l*) into the flagged MSF 1202, such that the edge 1108(*l*) can be located (in the flagged MST 1302) between whichever two nodes of the plurality of nodes 908 it coupled together before its deletion. After such reinsertion, the flagged MST 1302 can be considered as being made up of the same nodes and edges as the MST 1002, with the only difference being that the nodes and edges in the flagged MST 1302 now have respective border flags or interior flags (e.g., again, these may flags may be stored in an ancillary or separate data table or array). Note that, after reinsertion, various pairs of trees from the plurality of border trees 1204 or from the plurality of interior trees 1206 can be considered as being coupled or connected together by respective ones of the plurality of edges 1108. Thus, they can no longer strictly be considered or referred to as "trees". Instead, they can now be considered or referred to as "regions". That is, the plurality of border trees 1204 can, after edge reinsertion, be referred to as a plurality of border regions 1304 (e.g., a border region 1304(1) can comprise the same nodes and edges as the border tree 1204(1); a border region 1304(*p*) can comprise the same nodes and edges as the border tree 1204(*p*)). Likewise, the plurality of interior trees 1206 can, after edge reinsertion, be referred to as a plurality of interior regions 1306 (e.g., an interior region 1306(1) can comprise the same nodes and edges as the interior tree 1206(1); an interior region 1306(*q*) can comprise the same nodes and edges as the interior tree 1206(*q*)). In other words, each of the plurality of nodes 908 can be considered as having a respective label indicating to which of a plurality of regions (not trees) that node belongs, and each of that plurality of regions can be considered as having a respective flag that indicates whether that region is a border region (e.g., one of 1304) or instead an interior region (e.g., one of 1306).

Figure 14:
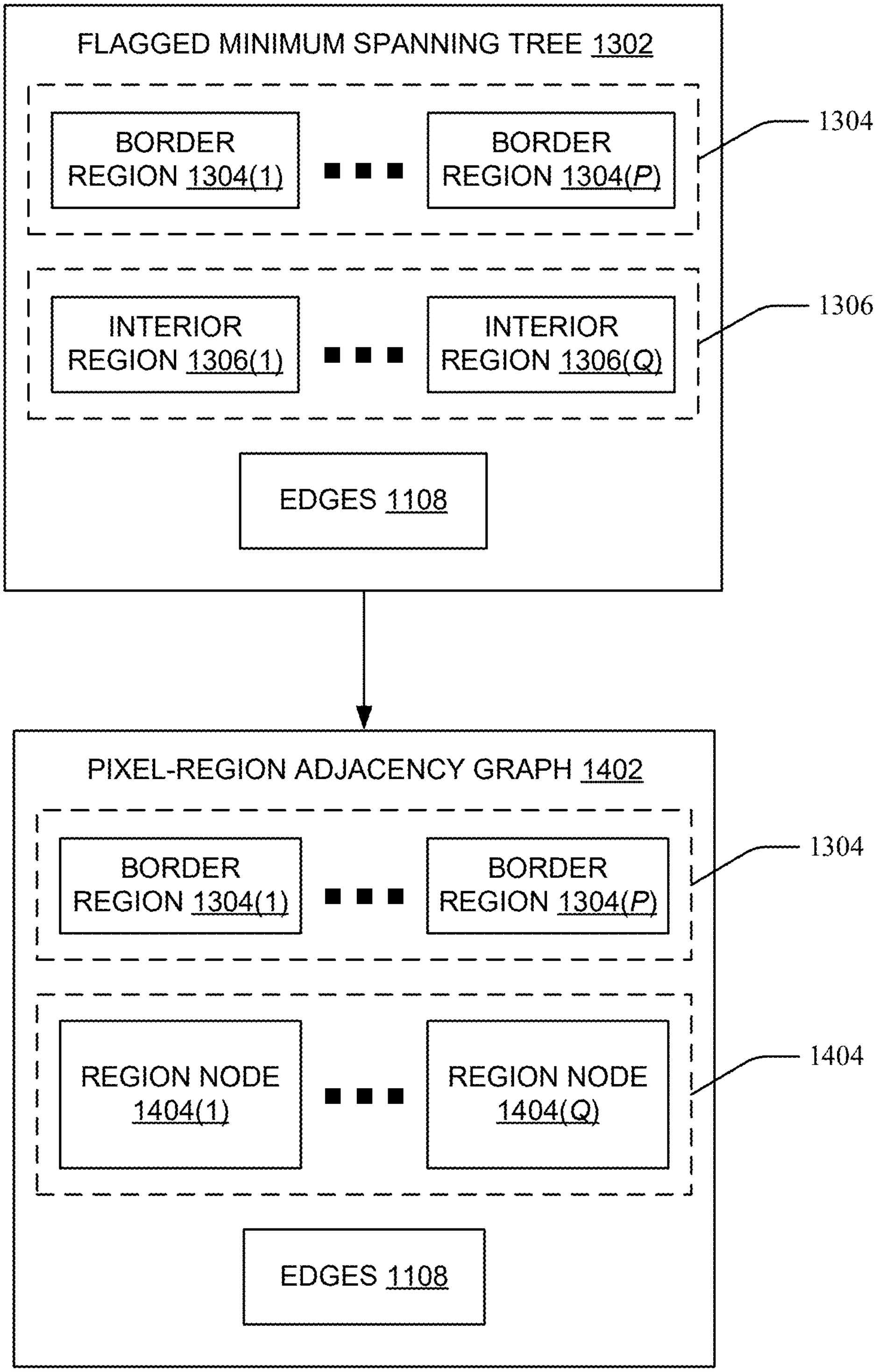

Now, consider FIG. 14. In various embodiments, the graph component 316 can generate a pixel-region adjacency graph 1402 (hereafter "PRAG 1402"), based on the flagged MST 1302. In various aspects, the graph component 316 can accomplish this, by respectively replacing the plurality of interior regions 1306 with a plurality of region nodes 1404.

As a non-limiting example, the graph component 316 can remove the interior region 1306(1) and can replace it with a region node 1404(1). In some cases, the region node 1404(1) can be any node (e.g., randomly selected) that is in the interior region 1306(1). If the region node 1404(1) were to be visualized in or on the tile 902, the region node 1404(1) could be (but need not be) located or positioned at a geometric centroid of the interior region 1306(1). In any case, the region node 1404(1) can be considered as being a replacement or substitute for the interior region 1306(1), such that whatever spatial area or spatial portion of the tile 902 that was previously granularly represented by the interior region 1306(1) can now be considered as being coarsely represented by the region node 1404(1) (hence the term "region"). Note that, prior to such replacement or substitution, the interior region 1306(1) can have been coupled to one or more others of the plurality of interior regions 1306 or one or more others of the plurality of border regions 1304, by one or more of the plurality of edges 1108. Accordingly, after such replacement or substitution, the region node 1404(1) can be coupled to those one or more others of the plurality of interior regions 1306 (or the regions nodes that replace them) or to those one or more others of the plurality of border regions 1304, by those one or more of the plurality of edges 1108.

As another non-limiting example, the graph component 316 can remove the interior region 1306(*q*) and can replace it with a region node 1404(*q*). In some cases, the region node 1404(*q*) can be any node (e.g., randomly selected) that is in the interior region 1306(*q*). As above, if the region node 1404(*q*) were to be visualized in or on the tile 902, the region node 1404(*q*) could be (but need not be) located or positioned at a geometric centroid of the interior region 1306(*q*). In any case, the region node 1404(*q*) can be considered as being a replacement or substitute for the interior region 1306(*q*), such that whatever spatial area or spatial portion of the tile 902 that was previously granularly represented by the interior region 1306(*q*) can now be considered as being coarsely represented by the region node 1404(*q*). As above, prior to such replacement or substitution, the interior region 1306(*q*) can have been coupled to one or more others of the plurality of interior regions 1306 (or the region nodes that replaced them) or one or more others of the plurality of border regions 1304, by one or more of the plurality of edges 1108. Accordingly, after such replacement or substitution, the region node 1404(*q*) can be coupled to those one or more others of the plurality of interior regions 1306 (or the region nodes that replaced them) or to those one or more others of the plurality of border regions 1304, by those one or more of the plurality of edges 1108.

Note that the region node 1404(1) to the region node 1404(*q*) can collectively be considered as forming the plurality of region nodes 1404.

In any case, the PRAG 1402 can comprise the plurality of border regions 1304, the plurality of edges 1108, and the plurality of region nodes 1404. Thus, some nodes of the PRAG 1402 can be considered as representing individual pixels of the tile 902 (e.g., whatever nodes make up the plurality of border regions 1304), and other nodes of the PRAG 1402 can instead be considered as representing larger, multi-pixel swaths or regions of the tile 902 (e.g., the plurality of region nodes 1404). Accordingly, the term "pixel-region adjacency graph" can be considered as appropriate. Note that the PRAG 1402 can be considered as a novel graph data structure that did not previously exist before the present inventors devised it.

Figure 15:
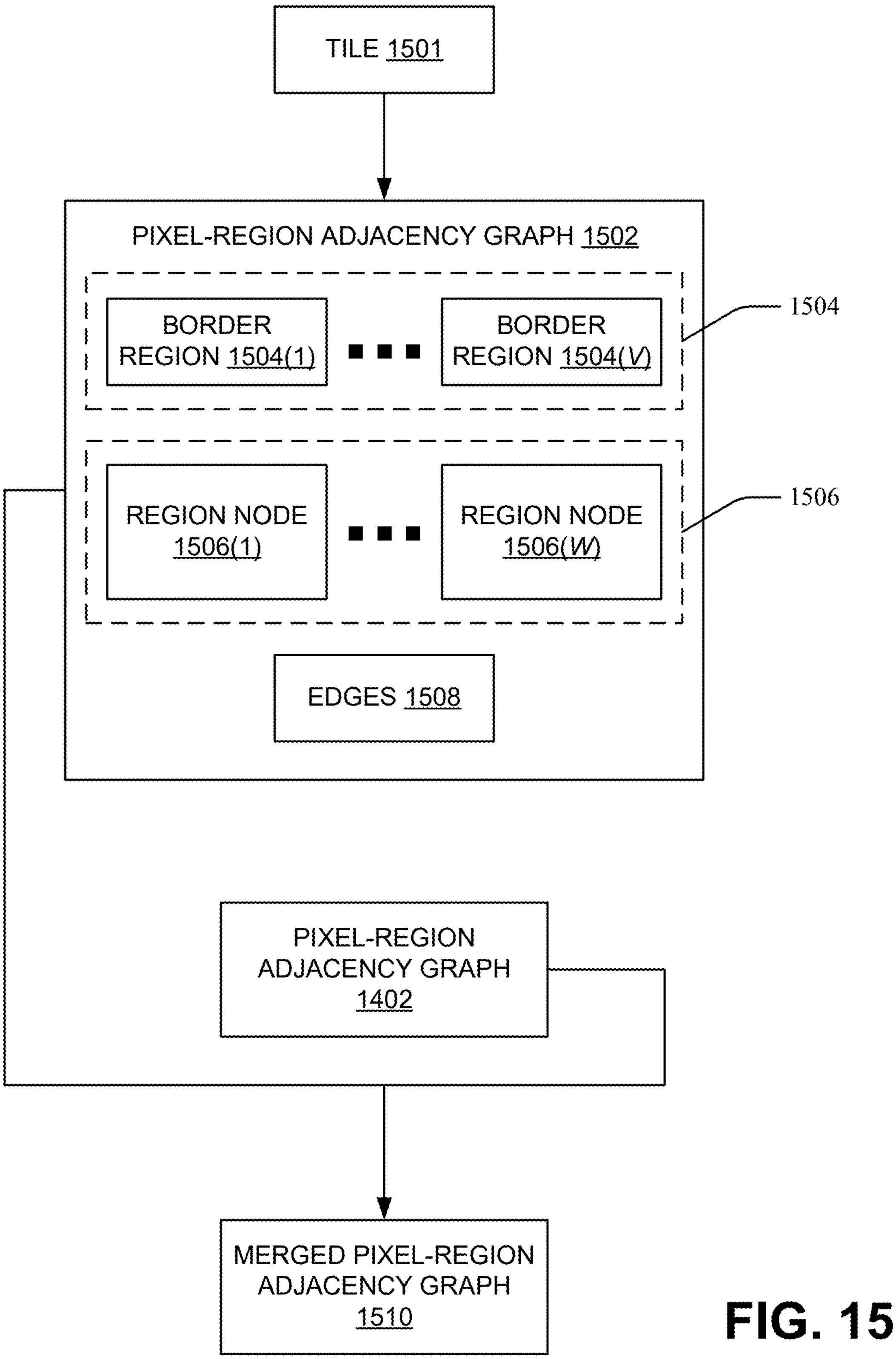
Figure 16:
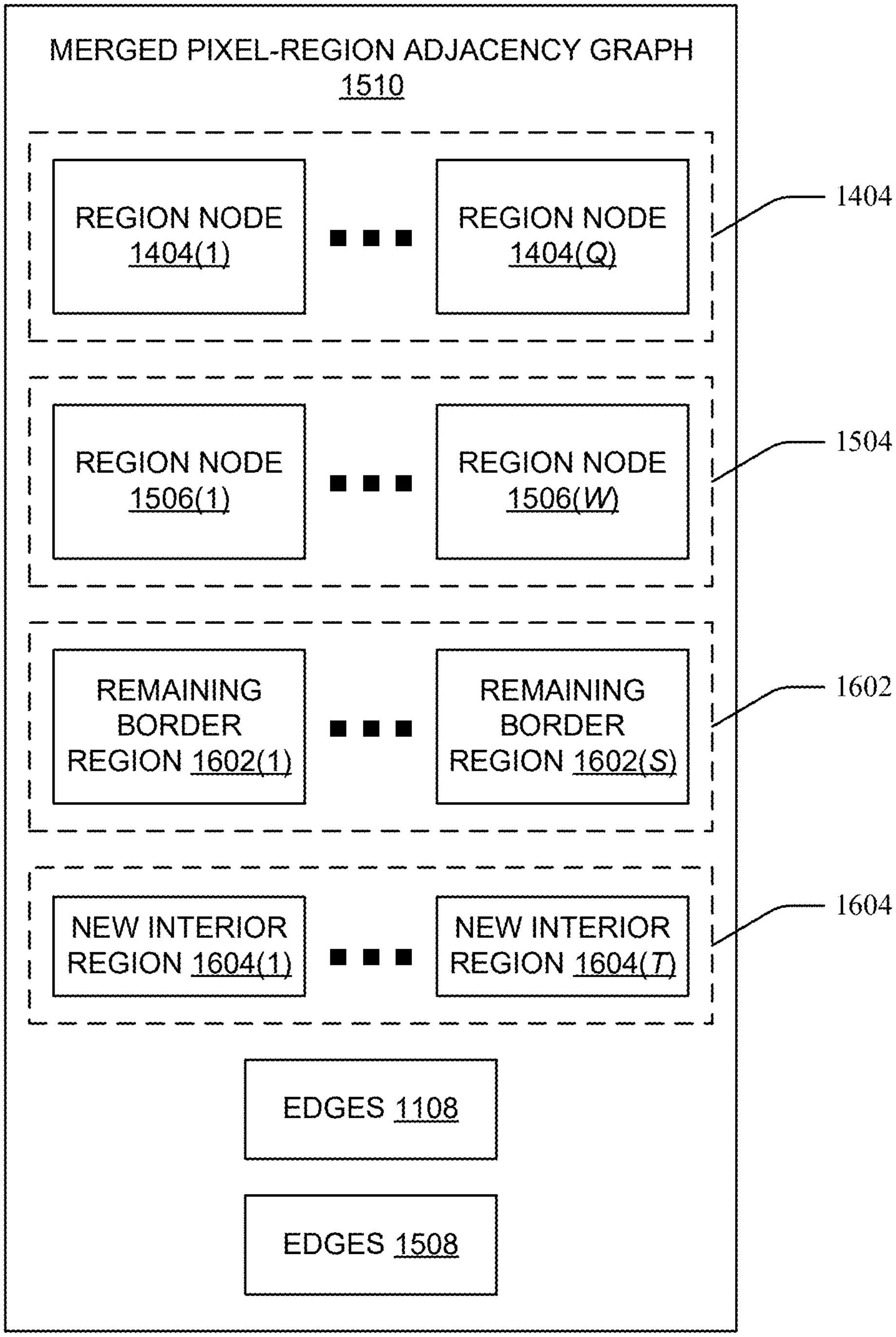

Next, consider FIGS. 15-16. In various embodiments, the graph component 316 can generate the PRAG 1402 for the tile 902, as described above. In various aspects, there can be a tile 1501 (e.g., another of the plurality of tiles 402) that is adjacent to or otherwise abutting the tile 902. In various instances, the graph component 316 can generate a PRAG 1502 for the tile 1501, just as described above. In various cases, the PRAG 1502 can comprise a plurality of border regions 1504, a plurality of region nodes 1506, and a plurality of edges 1508. In various aspects, the plurality of border regions 1504 can comprise v regions, for any suitable positive integer v: a border region 1504(1) to a border region 1504($v$). In various instances, the plurality of region nodes 1506 can comprise w nodes, for any suitable positive integer w: a region node 1506(1) to a region node 1506($w$). In various cases, the plurality of edges 1508 can be whatever edges were deleted and then reinserted by the graph component 316 during construction of the PRAG 1502.

In various aspects, because the tile 902 and the tile 1501 are adjacent or abutting to each other within the image 304, the graph component 316 can merge or combine the PRAG 1402 with the PRAG 1502. In various instances, such merging or combining can yield a merged pixel-region adjacency graph 1510 (hereafter "merged PRAG 1510"). In various cases, the graph component 316 can facilitate such merging or combining, by inserting minimum-weight edges between corresponding border regions of the PRAG 1402 and of the PRAG 1502.

More specifically, because the tile 902 and the tile 1501 are adjacent to each other, one particular border of the tile 902 can be considered as adjacent or abutting with one particular border of the tile 1501. As a non-limiting example, suppose that the tile 902 is immediately leftward of the tile 1501. In such case, the right border of the tile 902 can be adjacent to or abutting the left border of the tile 1501. As another non-limiting example, suppose that the tile 902 is immediately below the tile 1501. In such case, the top border of the tile 902 can be adjacent to or abutting the bottom border of the tile 1501. As yet another non-limiting example, suppose that the tile 902 is immediately above the tile 1501. In such case, the bottom border of the tile 902 can be adjacent to or abutting the top border of the tile 1501. As still another non-limiting example, suppose that the tile 902 is immediately rightward of the tile 1501. In such case, the left border of the tile 902 can be adjacent to or abutting the right border of the tile 1501.

In any case, the graph component 316 can identify or otherwise know which specific border of the tile 902 is adjacent to or abutting which specific border of the tile 1501. For ease of explanation, these can be respectively referred to as border A and border B. That is, border A of the tile 902 can be adjacent to or abutting border B of the tile 1501. In various instances, the graph component 316 can identify or otherwise know which of the plurality of border regions 1304 contain any node that represents a pixel that is located on border A of the tile 902. For ease of explanation, such regions can be referred to as one or more first identified border regions, and whatever nodes in those one or more first identified border regions that represent pixels that are located on border A can be referred to as first identified nodes (e.g., if the tile 902 is rectilinear and leftward of the tile 1501, then whichever nodes of the PRAG 1402 that represent the right-most column of pixels of the tile 902 can be considered as the first identified nodes). Likewise, in various cases, the graph component 316 can identify or otherwise know which of the plurality of border regions 1504 contain any node that represents a pixel that is located on border B of the tile 1501. For ease of explanation, such regions can be referred to as one or more second identified border regions, and whatever nodes in those one or more second identified border trees that represent pixels that are located on border B can be referred to as second identified nodes (e.g., if the tile 1501 is rectilinear and rightward of the tile 902, then whichever nodes of the PRAG 1502 that represent the left-most column of pixels of the tile 1501 can be considered as the second identified nodes).

Now, the first identified nodes and the second identified nodes can be considered as respectively corresponding to each other. Indeed, in situations where the tile 902 and the tile 1501 are disjoint or not overlapping, each of the first identified nodes can be considered as being adjacent or next to a respective one of the second identified nodes. On the other hand, in situations where the tile 902 and the tile 1501 are overlapping (e.g., share one column or row of pixels), each of the first identified nodes can be considered as being a duplicate or copy of a respective one of the second identified nodes. In any case, the first identified nodes can respectively correspond to the second identified nodes.

In various aspects, the graph component 316 can insert minimum-weight edges (e.g., edges having weights of 0, or edges whose weights are otherwise less than any suitable threshold value) between corresponding pairs of the first identified nodes and the second identified nodes. For example, for each given one of the first identified nodes, that given first identified node can correspond to a respective one of the second identified nodes, and an edge of minimum weight (e.g., of weight 0 or any other suitable weight) can be inserted between that given first identified node and that respective second identified node. Such minimum-weight edge insertion can be considered as joining, merging, or combining the one or more first identified border regions of the PRAG 1402 with the one or more second identified border regions of the PRAG 1502. After such minimum-weight edge insertion, the one or more first identified border regions of the PRAG 1402 and the one or more second identified border regions of the PRAG 1502 can be considered as now forming one or more new regions, and such one or more new regions can be deemed, flagged, or otherwise designated as being interior regions. In various cases, such newly-formed interior regions can be referred to as one or more new interior regions 1604. In various aspects, the one or more new interior regions 1604 can comprise t regions, for any suitable positive integer $t \leq \max(p, v)$: a new interior region 1604(1) to a new interior region 1604($t$). In various instances, whichever ones of the plurality of border regions 1304 and of the plurality of border regions 1504 remain after such minimum-weight edge insertion can be collectively considered as forming one or more remaining border regions 1602. In various cases, the one or more remaining border regions 1602 can comprise s regions, for any suitable positive integer $s < p+v$: a remaining border region 1602(1) to a remaining border region 1602($s$). Indeed, the one or more remaining border regions 1602 can be considered as being: the union of the plurality of border regions 1304 and the plurality of border regions 1504; less whichever of the plurality of border regions 1304 and the plurality of border regions 1504 were merged via minimum-weight edge insertion to create the one or more new interior regions 1604.

Note that minimum-weight edge insertion can, in some instances, cause the one or more new interior regions 1604 to initially have cycles or cyclic paths. In various aspects, such cycles or cyclic paths can be removed or eliminated by rerunning Boruvka's algorithm (or any other suitable MST-finding algorithm).

In any case, the creation of the one or more new interior regions 1604 can be considered as leaving untouched the region nodes and the deleted-then-reinserted edges of the PRAG 1402 and of the PRAG 1502. Accordingly, as shown, creating the merged PRAG 1510 as described herein can cause the merged PRAG 1510 to comprise: the plurality of region nodes 1404; the plurality of region nodes 1506; the plurality of edges 1108; the plurality of edges 1508; the one or more remaining border regions 1602; and the one or more new interior regions 1604. In various aspects, the graph component 316 can replace or substitute each of the one or more new interior regions 1604 with a respective region node, as described above. As a non-limiting example, the graph component 316 can replace the new interior region 1604(1) with a first new region node, where the first new region node can be selected randomly or non-randomly from the new interior region 1604(1). As another non-limiting example, the graph component 316 can replace the new interior region 1604(*t*) with a t-th new region node, where the t-th new region node can be selected randomly or non-randomly from the new interior region 1604(*t*).

Note that the merged PRAG 1510 can be considered as comprising fewer border regions than the total number of individual border regions across the PRAG 1402 and the PRAG 1502 (e.g., $s<p+v$). In other words, merging or combining PRAGs as described herein can be considered as incrementally or iteratively converting border regions into interior regions and thus into region nodes.

FIGS. 15-16 illustrate how two adjacent PRAGs (e.g., 1402 and 1502) can be merged together to create a new PRAG. It should be appreciated that any suitable number of adjacent PRAGs (or new PRAGs) can be merged in this fashion.

Figure 17:
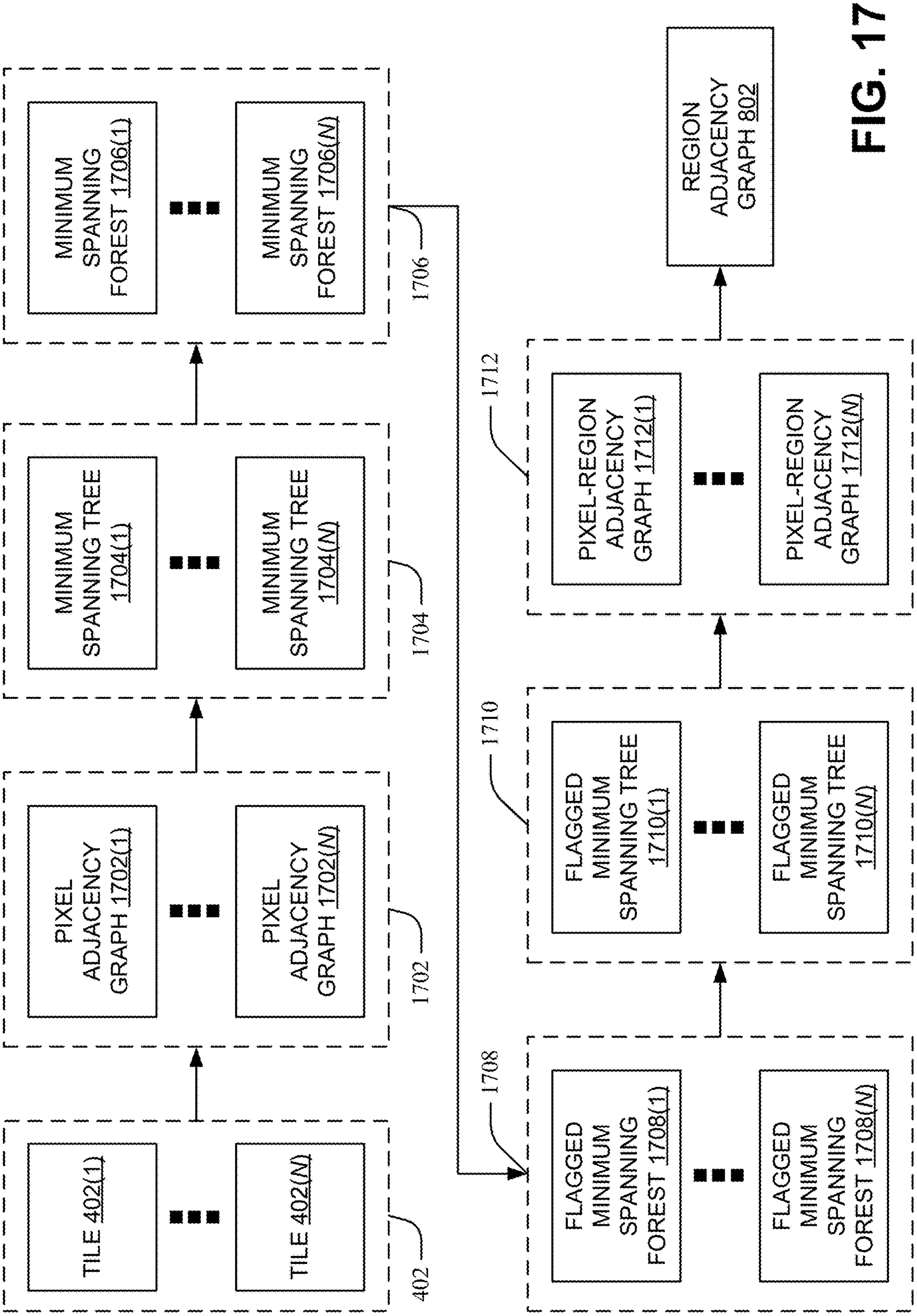

Now, consider FIG. 17. In various embodiments, the graph component 316 can generate (just as described with respect to FIG. 9) a respective PAG for each of the plurality of tiles 402. This can yield a plurality of PAGs 1702, where the plurality of PAGs 1702 can comprise n PAGs: a PAG 1702(1) generated based on the tile 402(1), to a PAG 1702(*n*) generated based on the tile 402(*n*).

In various aspects, the graph component 316 can generate (just as described with respect to FIG. 10) a respective MST for each of the plurality of PAGs 1702. This can yield a plurality of MSTs 1704, where the plurality of MSTs 1704 can comprise n MSTs: an MST 1704(1) generated based on the PAG 1702(1), to an MST 1704(*n*) generated based on the PAG 1702(*n*).

In various instances, the graph component 316 can generate (just as described with respect to FIG. 11) a respective MSF for each of the plurality of MSTs 1704. This can yield a plurality of MSFs 1706, where the plurality of MSFs 1706 can comprise n MSFs: an MSF 1706(1) generated based on the MST 1704(1), to an MSF 1706(*n*) generated based on the MST 1704(*n*).

In various cases, the graph component 316 can generate (just as described with respect to FIG. 12) a respective flagged MSF for each of the plurality of MSFs 1706. This can yield a plurality of flagged MSFs 1708, where the plurality of flagged MSFs 1708 can comprise n flagged MSFs: a flagged MSF 1708(1) generated based on the MSF 1706(1), to a flagged MSF 1708(*n*) generated based on the MSF 1706(*n*).

In various aspects, the graph component 316 can generate (just as described with respect to FIG. 13) a respective flagged MST for each of the plurality of flagged MSFs 1708. This can yield a plurality of flagged MSTs 1710, where the plurality of flagged MSTs 1710 can comprise n flagged MSTs: a flagged MST 1710(1) generated based on the flagged MSF 1708(1), to a flagged MST 1710(*n*) generated based on the flagged MSF 1708(*n*).

In various instances, the graph component 316 can generate (just as described with respect to FIG. 14) a respective PRAG for each of the plurality of flagged MSTs 1710. This can yield a plurality of PRAGs 1712, where the plurality of PRAGs 1712 can comprise n PRAGs: a PRAG 1712(1) generated based on the flagged MST 1710(1), to a PRAG 1712(*n*) generated based on the flagged MST 1710(*n*).

In various cases, the graph component 316 can merge or combine (as described with respect to FIGS. 15-16) all of the plurality of PRAGs 1712 together. As mentioned above, each iteration of such merging or combining can be considered as incrementally converting the border regions across the plurality of PRAGs 1712 into region nodes. Accordingly, once all of the plurality of PRAGs 1712 are merged or combined, the final, resultant graph structure can be considered as comprising no border regions at all. Instead, that final, resultant graph structure can comprise only region nodes that are coupled together by whatever edges were deleted and then reinserted during PRAG construction. Thus, that final, resultant graph structure can be considered as the RAG 802.

FIGS. 18-26 illustrate non-limiting examples regarding various aspects described herein.

Figure 18:
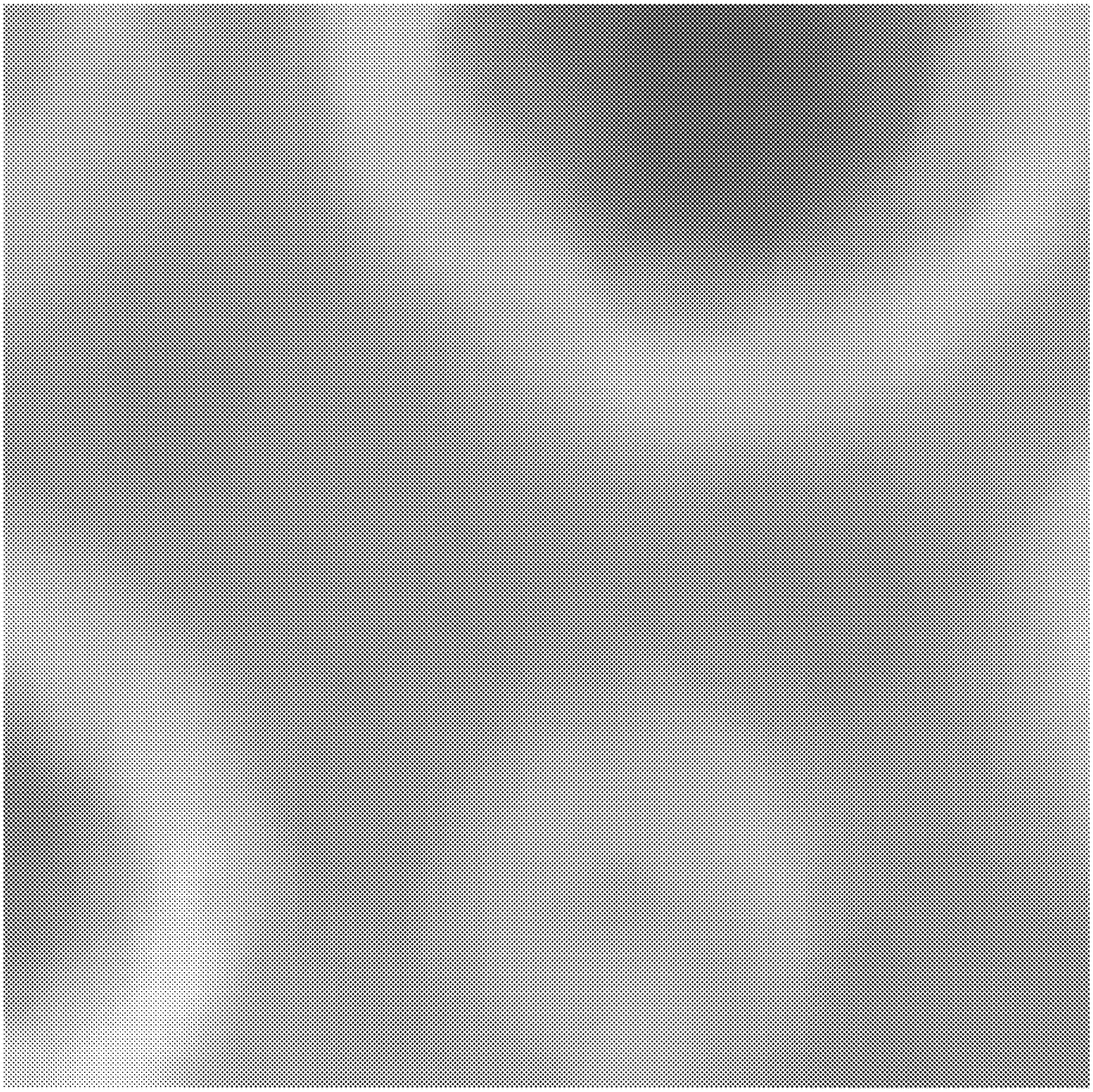

FIG. 18 illustrates a tile 1800. In particular, the tile 1800 is a square-shaped tile from a real-world image that was captured by a real-world scientific instrument. Specifically, the tile 1800 was positioned or located in an upper-left corner of that real-world image. Accordingly, there are no tiles that were positioned or located above the tile 1800, and there were no tiles that were positioned or located leftward of the tile 1800. However, there were tiles located or positioned rightward of or beneath the tile 1800. Thus, the tile 1800 can be considered as having only two borders: a right border; and a bottom border.

Figure 19:
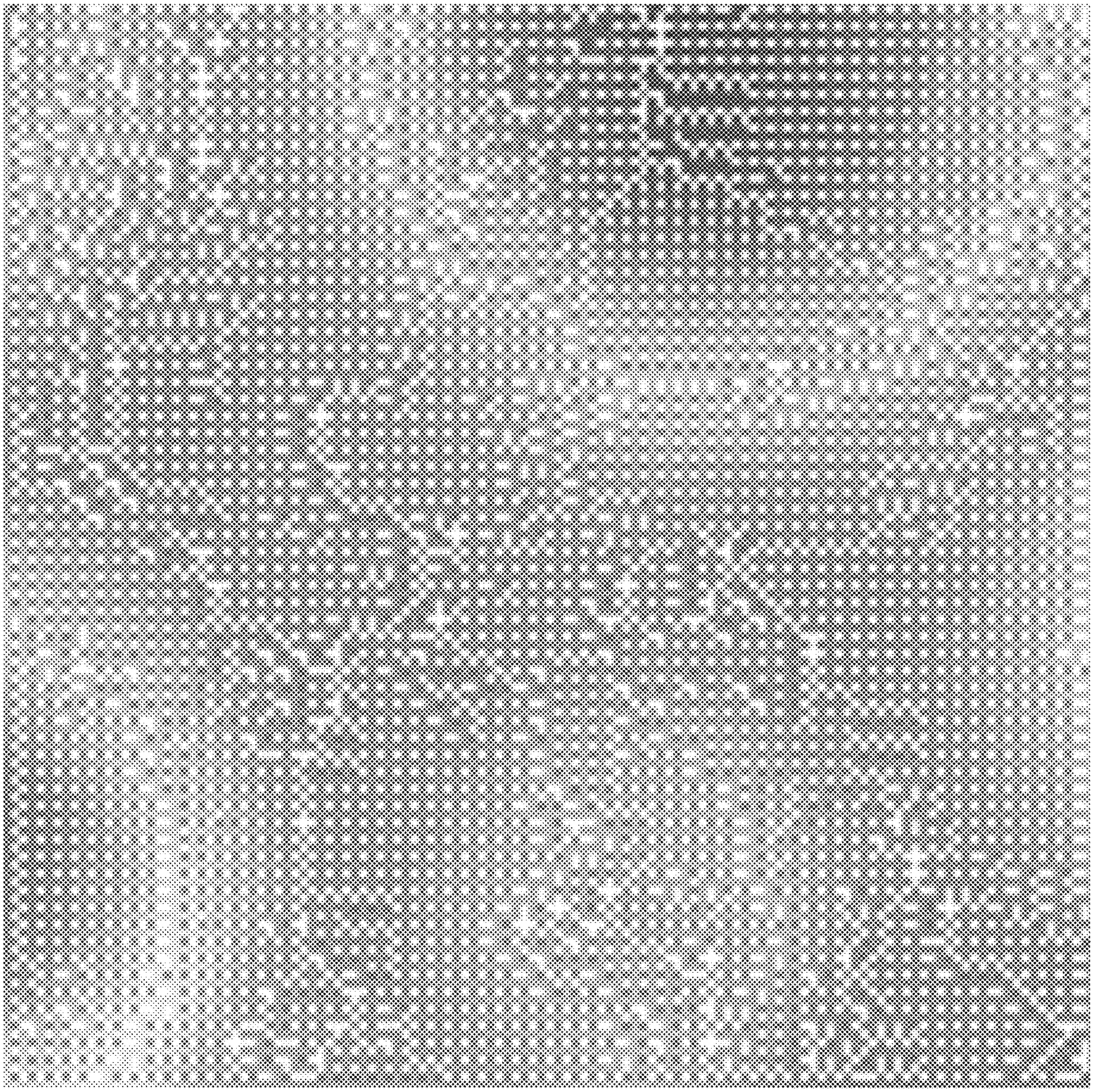

FIG. 19 illustrates an MST 1900 that was computed for the tile 1800. Specifically, dark dots in the FIG. 19 represent nodes of the MST 1900, and white lines represent edges of the MST 1900. To help show how the MST 1900 carries spatial significance, FIG. 19 depicts the MST 1900 as being superimposed or overlayed on the tile 1800.

Figure 20:
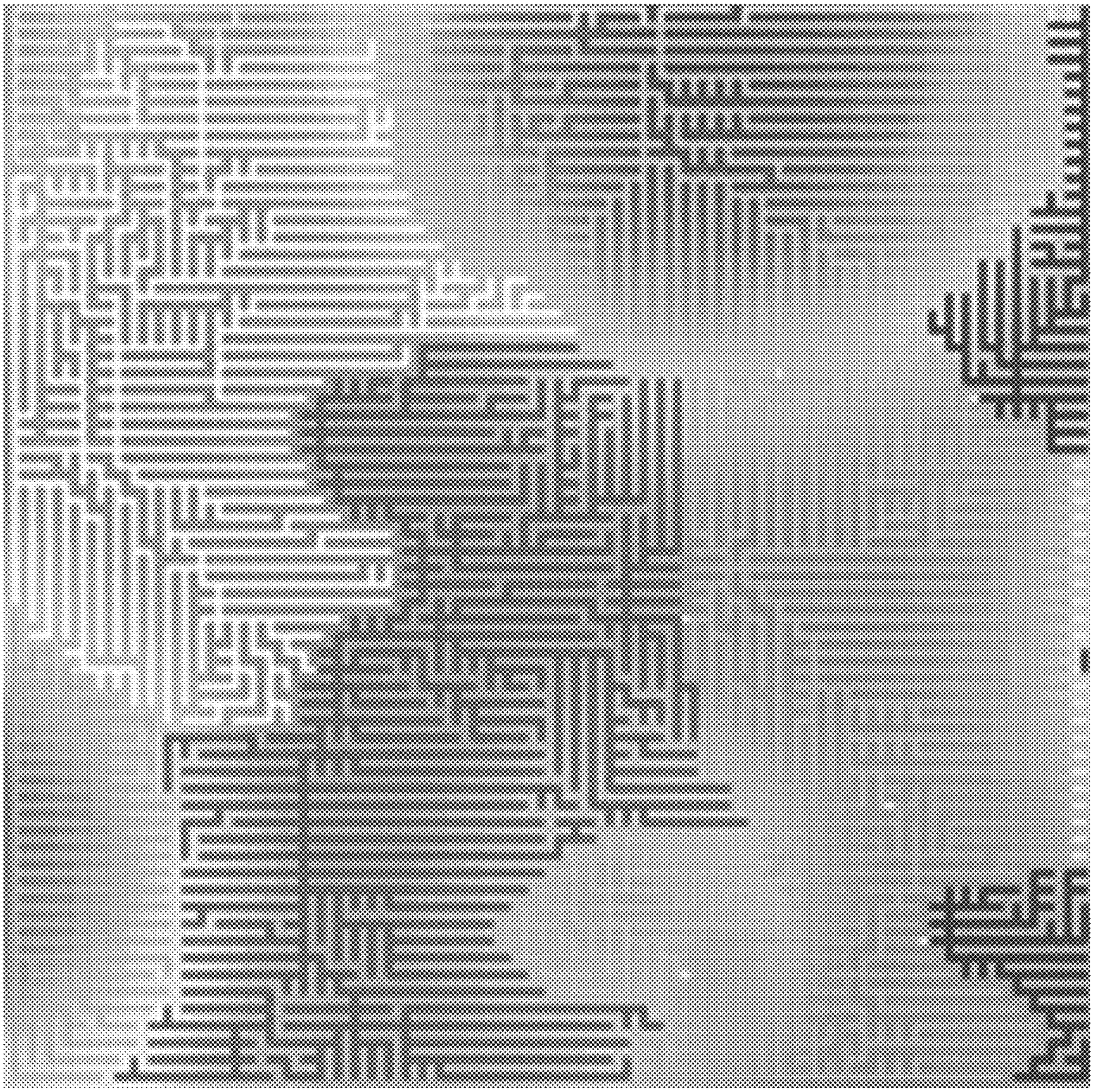

FIG. 20 illustrates a flagged MST 2000 that was computed from the MST 1900. Different shades in FIG. 20 indicate edges or nodes that belong to different regions (e.g., to different border regions, or to different interior regions). Again, to help show spatial significance, FIG. 20 depicts the flagged MST 2000 as being superimposed or overlayed on the tile 1800.

Figure 21:
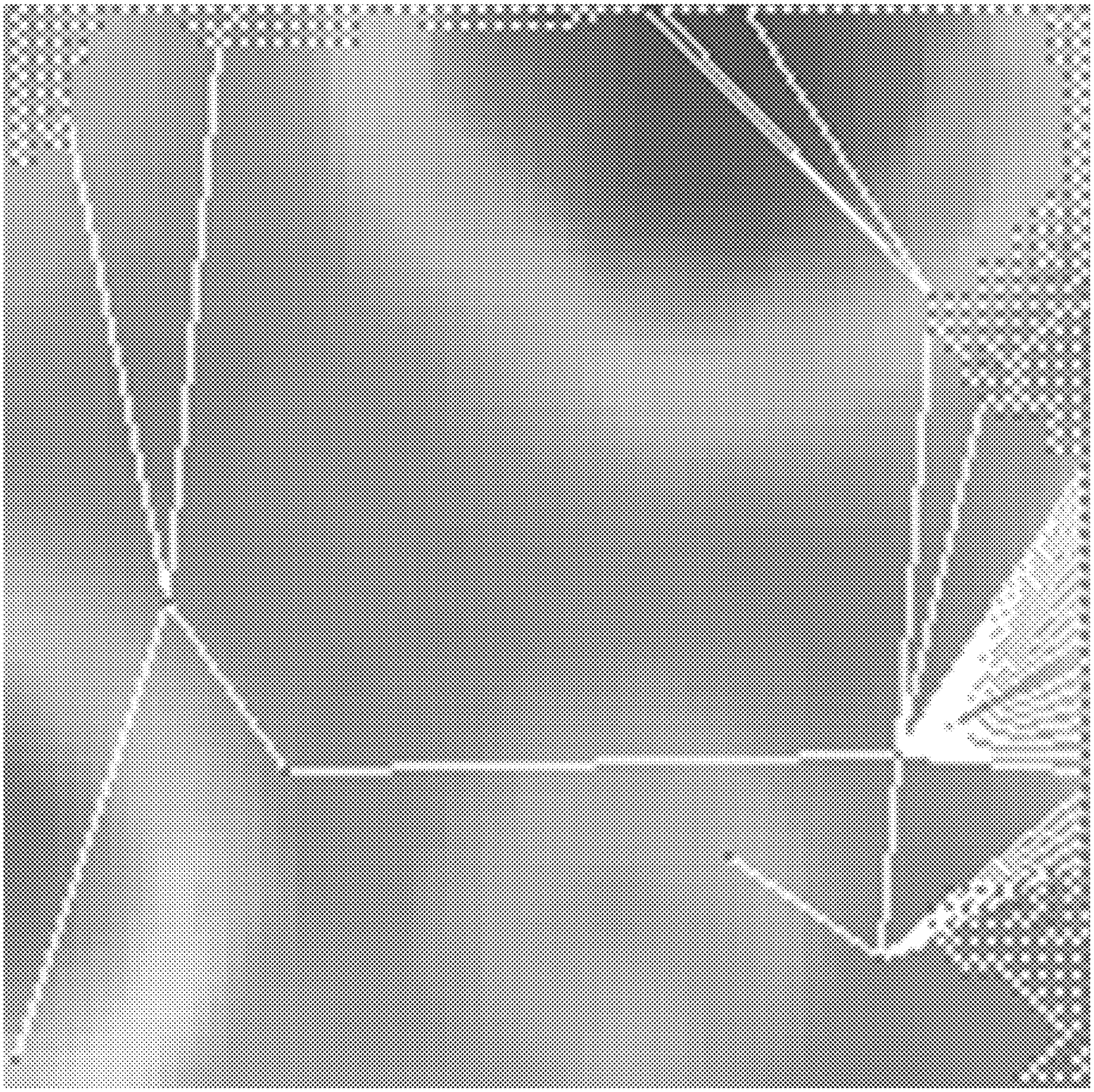

FIG. 21 illustrates a PRAG 2100 that was computed from the flagged MST 2000. Again, to help show spatial significance, FIG. 21 depicts the PRAG 2100 as being superimposed or overlayed on the tile 1800. As shown, the PRAG 2100 includes high concentrations of nodes along the bottom border and along the right border of the tile 1800. Such high-concentration areas of nodes can be considered as belonging to border regions of the flagged MST 2000. As also shown, the PRAG 2100 includes very sparse, low concentrations of nodes in areas of the tile 1800 that are located outside of those border regions. Such sparse, low-concentration areas of nodes can be considered as the region nodes that the interior regions of the flagged MST 2000 were replaced with. In this non-limiting example, each interior region was replaced with a random node from that interior region. Note that the visibly-long edges in FIG. 21 can be considered as whatever edges were deleted and then reinserted during construction of the PRAG 2100. In other words, the visibly-long edges in FIG. 21 can be considered as being whatever edges previously connected respective interior regions of the flagged MST 2000 to other interior regions of the flagged MST 2000 or to border regions of the flagged MST 2000, and such edges can now be considered as connecting respective region nodes of the PRAG 2100 to other region nodes or to border regions.

Figure 22:
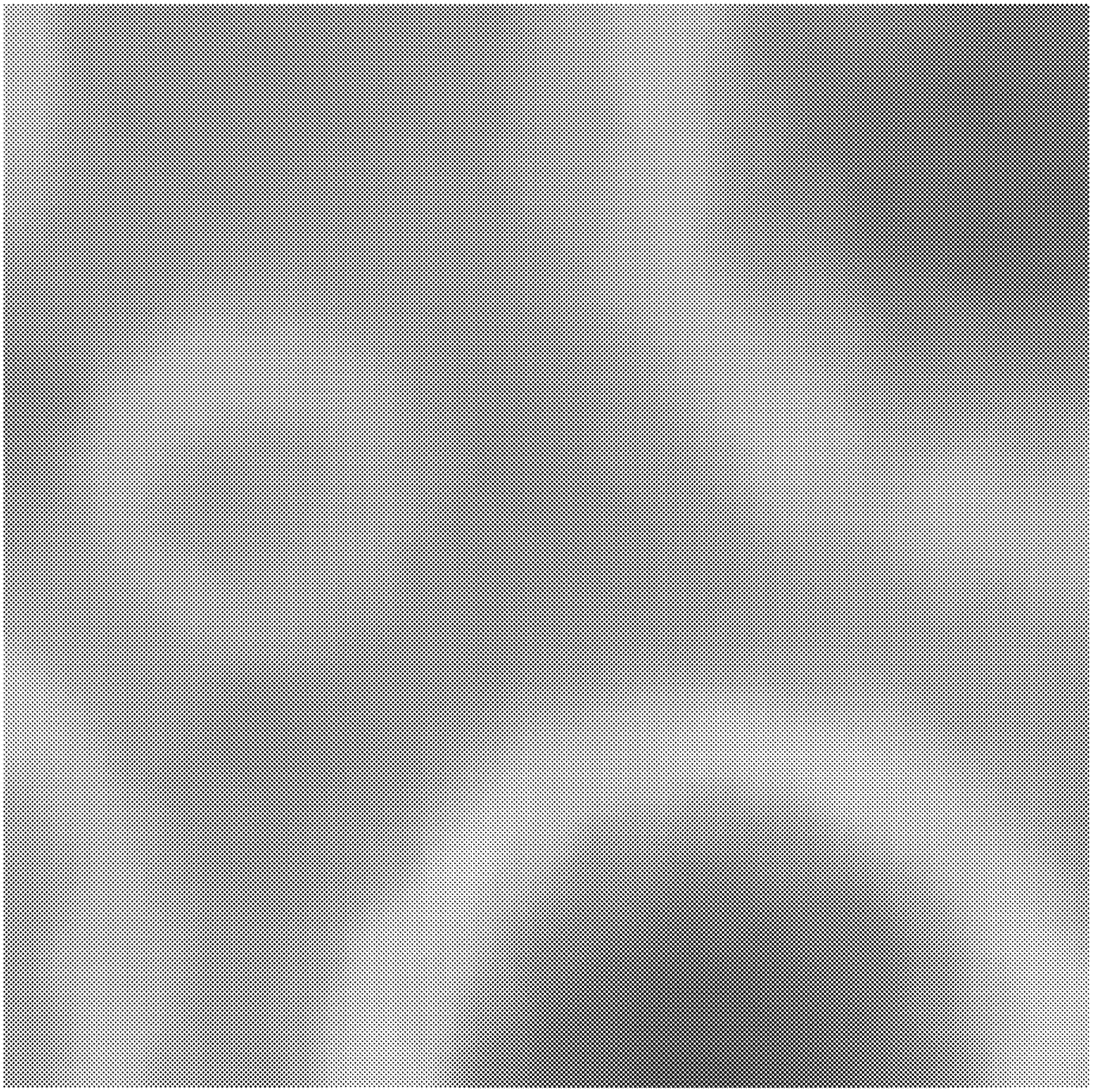

Now, FIG. 22 depicts a tile 2200 that was adjacent to or abutting the tile 1800. In particular, the tile 2200 was immediately rightward of the tile 1800 in the real-world image from which the tile 1800 was extracted. Other tiles were rightward of the tile 2200 or below the tile 2200, but no tile was above the tile 2200. Accordingly, the tile 2200 can be considered as having three borders: a left border; a right border; and a bottom border.

Figure 23:
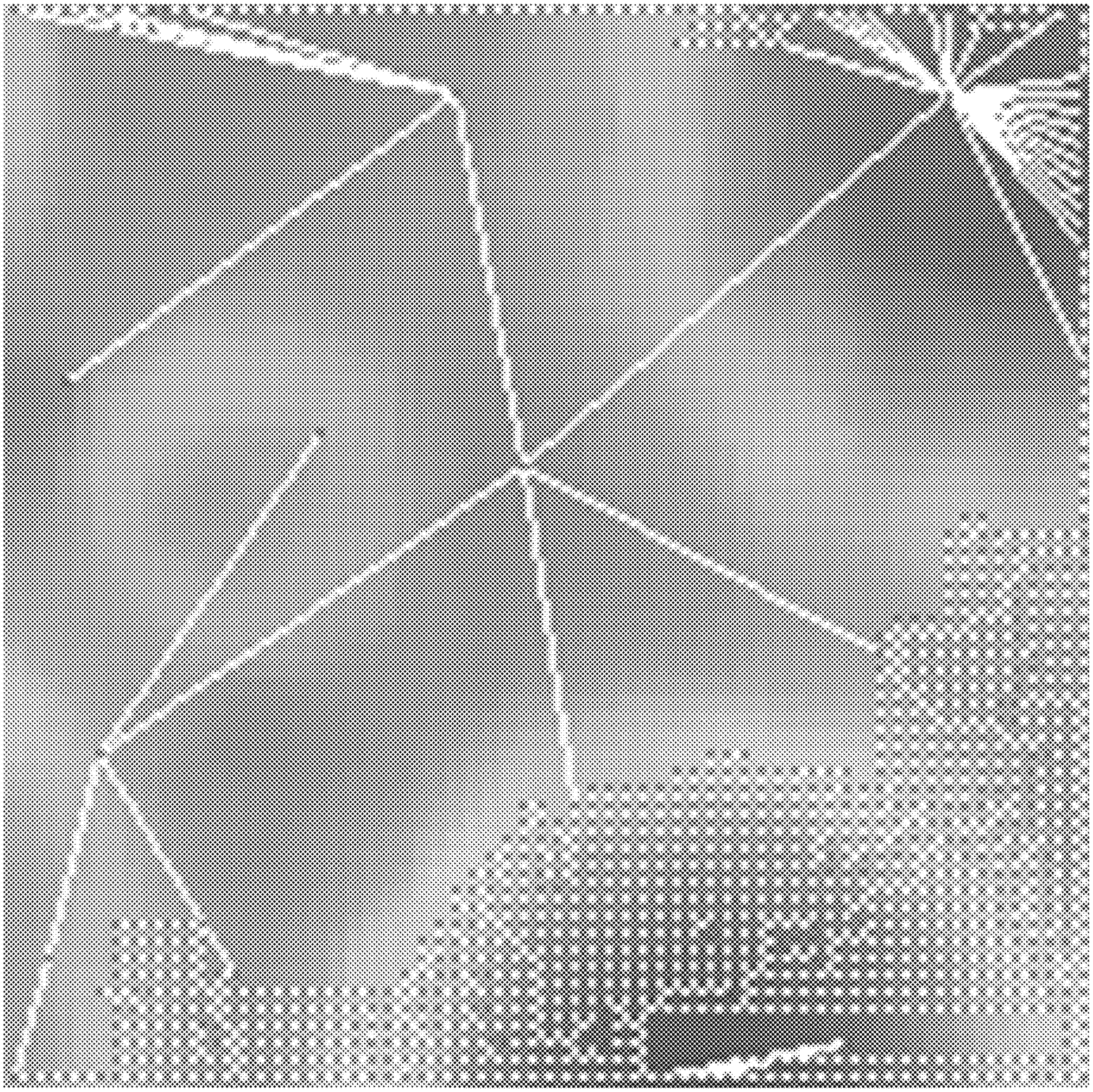

FIG. 23 illustrates a PRAG 2300 that was computed for the tile 2200. Just like above, to help show spatial significance, FIG. 23 depicts the PRAG 2300 as being superimposed or overlayed on the tile 2200. As shown, the PRAG 2300 includes high concentrations of nodes along the left border, along the bottom border, and along the right border of the tile 2200. Such high-concentration areas of nodes can be considered as belonging to border regions of the tile 2200. As also shown, the PRAG 2300 includes very sparse, low concentrations of nodes in areas of the tile 2200 that are located outside of those border regions. Such sparse, low-concentration areas of nodes can be considered as the region nodes that the interior regions of the tile 2200 were replaced with. Just as above, note that the visibly-long edges in FIG. 23 can be considered as whatever edges were deleted and then reinserted during construction of the PRAG 2300.

Figure 24:
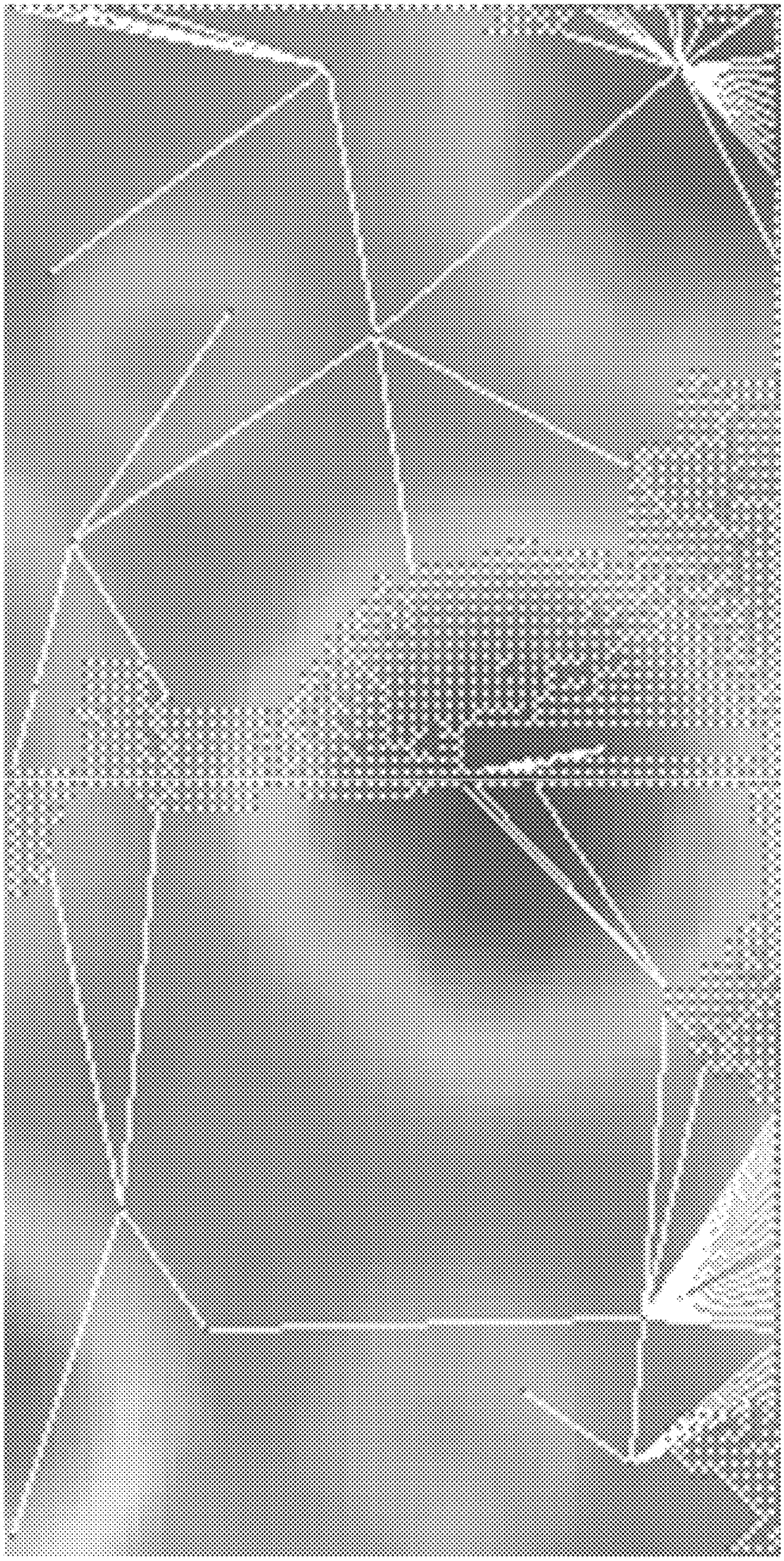

FIG. 24 illustrates how the PRAG 2100 and the PRAG 2300 can be combined into a merged PRAG 2400. Indeed, because the tile 1800 can be immediately leftward of the tile 2200, the right border of the tile 1800 can be considered as being adjacent to (or shared with) the left border of the tile 2200. So, one or more border regions of the PRAG 2100 that contain nodes that are located on the right border of the tile 1800 can be identified, one or more border regions of the PRAG 2300 that contain nodes that are located on the left border of the tile 2200 can be identified, and those identified border regions can be merged or combined via the insertion of minimum-weight edges. In some cases, those minimum-weight edges can be considered as stiches that sew the PRAG 2100 to the PRAG 2300. In any case, whatever border regions of the PRAG 2100 and of the PRAG 2300 that are merged together can be considered as collectively forming one or more new interior regions (e.g., as mentioned above, if minimum-weight edge insertion creates cyclic paths, those cyclic paths can be eliminated via Boruvka's algorithm). Although not shown in FIG. 24, those new interior regions can then be respectively replaced with new region nodes.

Figure 25:
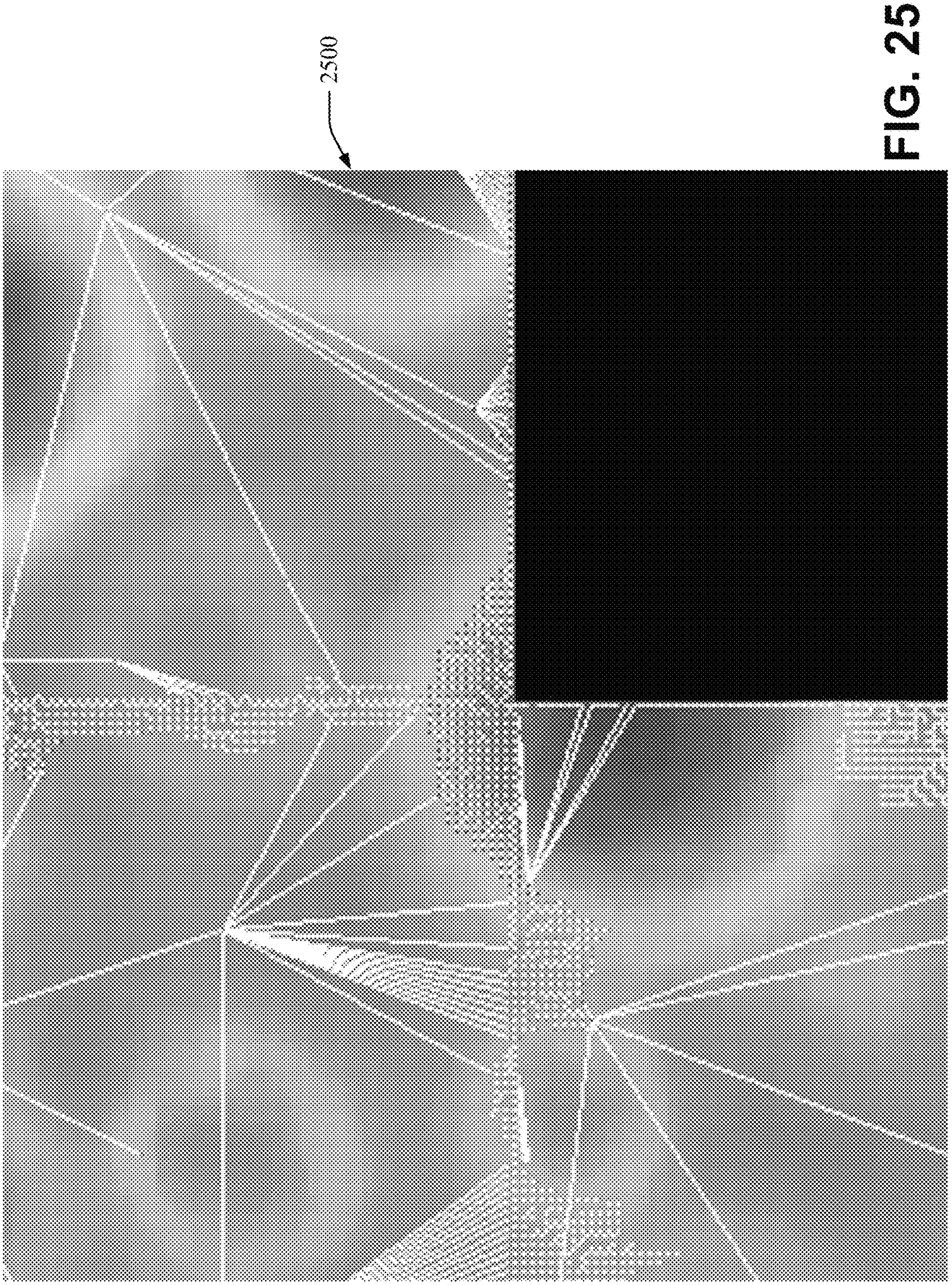

FIG. 25 illustrates a merged PRAG 2500 that was obtained by combining (e.g., via minimum-weight edge insertion) three PRAGs of three different tiles (e.g., a first tile in the upper-left of FIG. 25; a second tile that is rightward of that first tile; and a third tile that is below that first tile). FIG. 25 can be considered as showing a non-limiting example of more than two PRAGs being merged at once. In general, any suitable number of PRAGs can be merged at any given time (e.g., not limited just to merging two PRAGs at a time).

Figure 26:
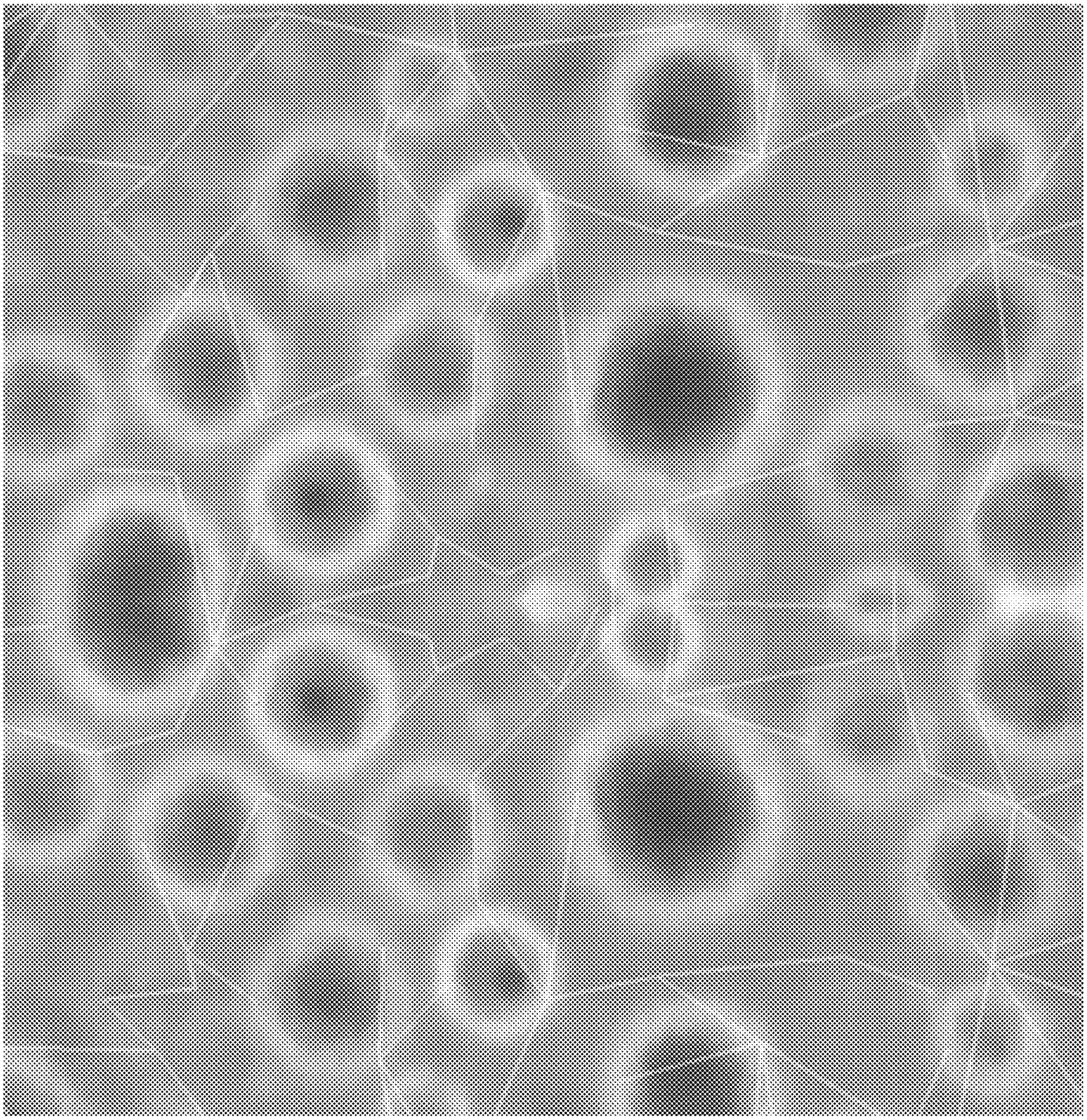

FIG. 26 illustrates a RAG 2600 that was created in tiled fashion as described herein for a real-world image captured by a real-world scientific instrument. As above, the white lines in FIG. 26 can be considered as representing edges. In particular, the white lines in FIG. 26 can be considered as representing edges between respective region nodes of the RAG 2600. Accordingly, the RAG 2600 can be considered as a coarser, much less memory-intensive representation of that real-world image.

In any case, the graph component 316 can generate the RAG 802 for the image 304, based on the plurality of tiles 402. As described herein, the graph component 316 can accomplish such generation by leveraging the plurality of PRAGs 1712.

Figure 27:
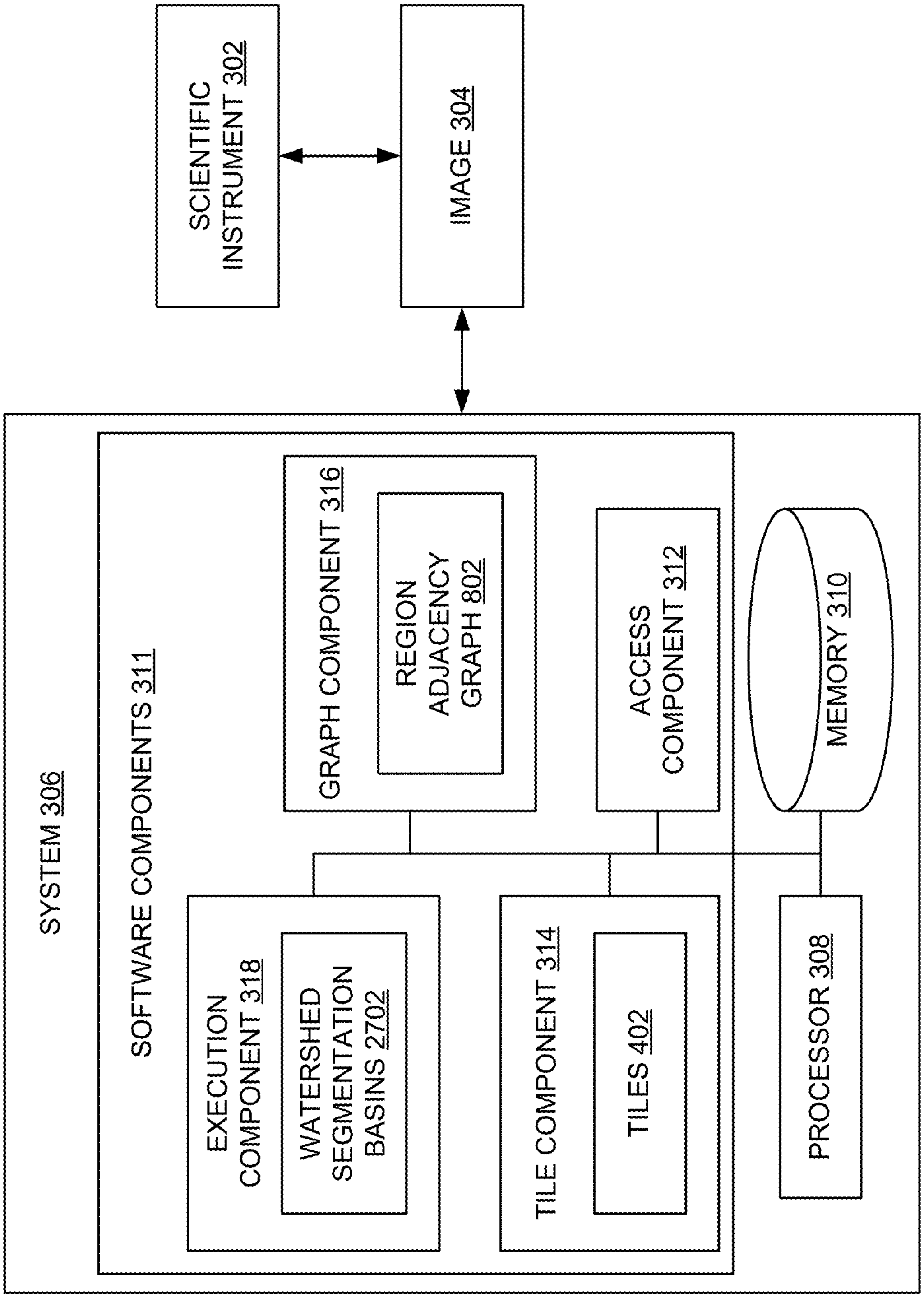
FIG. 27 illustrates a block diagram of an example, non-limiting system including one or more marker-based watershed segmentation basins that facilitates tiled region adjacency graph computation via pixel-region adjacency graphs in accordance with one or more embodiments described herein.

FIG. 27 illustrates a block diagram of an example, non-limiting system including one or more marker-based watershed segmentation basins that can facilitate tiled region adjacency graph computation via pixel-region adjacency graphs in accordance with one or more embodiments described herein.

In various embodiments, the execution component 318 can electronically perform marker-based watershed segmentation on the RAG 802. In various aspects, such application or performance of marker-based watershed segmentation can yield one or more watershed segmentation basins 2702 (also referred to as one or more marker-based watershed segmentation basins 2702). In various instances, the one or more watershed segmentation basins 2702 can be any suitable electronic data having any suitable format, size, or dimensionality that can illustrate, depict, represent, or otherwise indicate the locations of respective marker-based watershed separation lines or boundaries for the RAG 802 and thus for the image 304. Note that it could have been infeasible to perform such marker-based watershed segmentation on the image 304 in its entirety, due to the possibly gargantuan size of the image 304 and the limited processing capacity of computerized workstations for the scientific instrument 302. Also note that it would not have been reliable to perform such marker-based watershed segmentation individually or locally on the plurality of tiles 402, due to the phenomenon of marker-based watershed leaks that arise from lobal-global discrepancies. Despite these challenges, the system 306 can nevertheless reliably or accurately generate the one or more watershed segmentation basins 2702, due to the herein-described implementation of the plurality of PRAGs 1712. Indeed, existing techniques do not know how to generate a RAG for an image in a tiled context. But the present inventors devised a technique for creating such a RAG, and such technique can involve leveraging a novel graph structure which the present inventors refer to as the PRAG.

In various embodiments, the execution component 318 can electronically transmit the one or more watershed segmentation basins 2702 to any suitable computing device. In various other embodiments, the execution component 318 can electronically render the one or more watershed segmentation basins 2702 on any suitable electronic display, such as a computer screen or computer monitor. Accordingly, any user or technician that is associated with the scientific instrument 302 can inspect or view the one or more watershed segmentation basins 2702.

It should be appreciated that the execution component 318 can, in various embodiments, perform any other suitable type of analysis on the RAG 802. In other words, the execution component 318 is not limited just to performing marker-based watershed segmentation. Indeed, it is possible that there are other types of analyses or algorithms that cannot be properly or reliably performed in a tile-wise fashion but that can be properly or reliably performed on a RAG. Any of such analyses or algorithms can be conducted or applied by the execution component 318 on the RAG 802.

Various embodiments described herein can involve the following process flow: tile to PAG, PAG to MST, MST to MSF, MSF to flagged MSF, flagged MSF to flagged MST, and flagged MST to PRAG. It should be appreciated that this process flow is a mere non-limiting example for ease of explanation and illustration. Indeed, such process flow is helpful in elaborating and articulating various of the concepts conveyed herein, but it should be appreciated that various portions or steps in such process flow can be combined together or even omitted in various embodiments to improve computational efficiency. As a non-limiting example, it can be possible for a PAG to be directly converted into an MSF for any given set of root nodes (e.g., so as to skip the intermediate structure of MST). As another non-limiting example, it can be possible for a PAG to be converted directly into a flagged MST (e.g., so as to skip the intermediate structures of MST, MSF, and flagged MSF). No matter what specific intermediate structures might be obtained or omitted in any given implementation of various embodiments described herein, such embodiments can ultimately involve computing a PRAG for a respective tile of an image, where that PRAG can contain border regions of that respective tile, and where that PRAG can contain region nodes instead of interior regions of that respective tile.

FIGS. 28-30 illustrate example, non-limiting algorithms that can facilitate tiled region adjacency graph computation via pixel-region adjacency graphs in accordance with one or more embodiments described herein. In particular, FIGS. 28-30 illustrate an Algorithm 1, an Algorithm 2, an Algorithm 3, an Algorithm 4, and an Algorithm 5 which the present inventors utilized to reduce to practice various embodiments described herein. The following discussion pertains to various aspects of such algorithms, as well as to various mathematical notations that can be useful in reading such algorithms. Note that the below mathematical notation might utilize some variables (e.g., i, j, n, k) that have already been utilized above, and also note that the below mathematical notation might even utilize some variables more than once in different contexts. It is to be understood that, unless specified or otherwise clear, mathematical notation is local and not global. Accordingly, a single variable (e.g., k) might be used in multiple different locations or contexts to mean multiple different things (e.g., number of roots in one context, a node or pixel in another context, a summation or integration index in yet another context). This default for local notation as opposed to global notation is to avoid situations in which variables run out.

A graph G can be a pair G=(V, E), where V and E can both be finite sets. The elements $v \in V$ can be called vertices or nodes of the graph G, and the elements $e \in E \subset \{\{i, j\}$, for i, $j \in V$, $i \neq j\}$ can be called edges of the graph G. An edge $e_{i,j}$ can be considered as connecting or coupling a node i to a node j. In such case, the node i and the node j can be considered as being adjacent or as otherwise being neighbors to each other. When given a graph G=(V, E), a graph G'=(V', E') can be called a subgraph of G, if and only if $V' \subset V$ and $E' \subset E$. An edge-weighted graph G can be a triplet G=(V, E, W), where (V, E) is a graph, and where W can be a mapping of the set of edges E into $\mathbb{R}^+$. For each edge $e_{i,j}$ of G, there can be a weight $w_{i,j}=W(e_{i,j})$. A path $\pi$ of the graph G=(V, E) from a node i to a node k can be a sequence of edges written as $\pi=(e_{i,j}, e_{j,l}, \ldots, e_{k-2,k-1}, e_{k-1,k})$. The set of all paths from node i to node k can be denoted as $\Pi(i, k)$. A connected component G'=(V', E') of the graph G=(V, E) can be a subgraph of G such that, for each pair of distinct nodes in G', there is a path in G' that connects that pair of distinct nodes. A graph G can be called connected if G is itself a connected component. A tree T can be a connected graph without cycles (e.g., without cyclic paths). A graph F that has no cycles and that is not connected can be called a forest. When given a connected graph G=(V, E), a spanning tree $T=(V, E_T)$ of G can be a connected graph without cycles such that $E_T \subset E$. A spanning forest $F=(V, E_F)$ of G can be a non-connected graph without cycles such that $E_F \subset E$. When given an edge weighted connected graph G=(V, E, W), the minimum spanning tree problem can involve finding a spanning tree $T^*=(V, E_{T^*})$ of G such that the sum of the edge weights of T* is minimum. When given an edge weighted connected graph G=(V, E, W), the minimum spanning forest problem can be involve finding, for any set of k distinct root nodes $t_1, \ldots, t_k$ in G, a spanning forest $F^*=(V, E_{F^*})$ of G, such that each distinct tree of F* contains exactly one (e.g., a respective one) of the k distinct root nodes, and such that the sum of the edge weights of F* is minimum. When given a graph G=(V, E, W), a minimum spanning tree $T^*=(V, E_{T^*})$ of G can be computed via any suitable algorithm (e.g., Boruvka's algorithm), and a minimum spanning forest $F^*=(V, E_{F^*})$ of G can be computed for any set of root nodes $t_1, \ldots, t_k$ in G by: determining, for each pair $(t_i, t_k)$ of those k distinct roots, whether there is a path in T* that couples that pair of root nodes, and, if so, deleting an edge of maximum weight along that path.

In various embodiments, the present inventors devised Algorithms 1-5 as shown in FIGS. 28-30, and the present inventors utilized such Algorithms to reduce to practice various embodiments described herein. In particular, Algorithm 3 depicts a version of Boruvka's algorithm that can compute an MST (e.g., one of 1704) from a given graph (e.g., one of 1702); Algorithm 4 depicts a modified, novel version of Boruvka's algorithm that can compute a flagged MST (e.g., one of 1710) from a given graph (e.g., one of 1702); Algorithm 5 depicts a novel algorithm that can compute a PRAG (e.g., one of 1712) from a given labeled graph (e.g., one of 1710); and Algorithms 1-2 depict ancillary procedures that are utilized or called by Algorithms 3, 4, or 5.

First, consider Algorithm 3. Algorithm 3 aims to compute the MST of a given graph. The input can include a graph with vertices V and edges E, and the output can be the resulting MST. Algorithm 3 can begin by initializing the number of trees to be the same as the number of edges in the graph. It can then enter a loop that continues until there is only one tree remaining. Within each iteration, Algorithm 3 can perform the following steps. It can determine the lowest-weight edge incident to each node by calling the function "setLowestEdge(V, E)" described in Algorithm 1 and can store the results in an array "lowestEdge". For each node v in V, Algorithm 3 can retrieve the lowest-weight edge incident to v from the "lowestEdge" array. If the retrieved edge is not equal to −1 (indicating that an edge was found), Algorithm 3 can proceed to process it. Specifically, Algorithm 3 can update the "lowestEdge" array by setting the value of the current vertex v to −1, indicating that the lowest-weight edge for this vertex has been processed. Algorithm 3 can then identify the canonical representatives (root nodes) of the source and target vertices of the current edge, denoted as a and b, respectively. If the canonical representatives a and b are different, Algorithm 3 can perform a union operation, which can merge the trees rooted at a and b into a single tree. The current edge can then be added to the MST, and the number of trees can be decremented by 1. Algorithm 3 can continue this process until there is only one tree remaining, indicating that the MST has been computed. The resulting MST can be stored. Overall, the Algorithm 3 (Boruvka's algorithm) can iteratively select the lowest-weight edges from each node, merge the corresponding trees, and construct the MST progressively.

Now, consider Algorithm 4. Algorithm 4 was devised by the present inventors so as to compute a flagged MST (e.g., one 1710) for any given graph (e.g., one of 1702). The input to Algorithm 4 can comprise a graph with vertices V and edges E, along with an array of markers label and a border flag border. The output of Algorithm 4 can be the resulting flagged MST. Algorithm 4 can begin by initializing the number of trees to be the same as the number of edges in the graph. Algorithm 4 can include an operation that updates the marker array label based on the border flag border, as shown in Algorithm 2. This operation can be specifically designed or intended to manage border nodes of the graph by treating them as labeled nodes. The number of expected trees can be set to the number of nodes in the graph. Algorithm 4 can then enter a loop that continues until the number of trees in the previous iteration is the same as in the current iteration. Within each iteration, Algorithm 4 can perform the following steps. It can determine the lowest-weight edge incident to each node by calling the function "setLowestEdge(V,E)" from Algorithm 1 and can store the results in the array "lowestEdge". For each node v in V, Algorithm 4 can retrieve the lowest-weight edge incident to v from the "lowestEdge" array. If the retrieved edge is not equal to −1 (indicating that an edge was found), Algorithm 4 can proceed to process it. Specifically, Algorithm 4 can identify the canonical representatives (root nodes) of the source and target vertices of the current edge, denoted as a and b respectively. If the canonical representatives a and b are different and either their labels are the same (same rooted tree or background) or the label of the current node vis 0 (rain falling process), Algorithm 4 can perform the union operation with label management. This operation can merge the trees rooted at a and b into a single tree while preserving the labels. The current edge can be added to the MST, and the number of trees can be decremented by 1. After computing the minimum spanning forest (MSF), Algorithm 4 can propagate the labels of the canonical representatives to their respective nodes. Finally, Algorithm 4 can add the remaining edges to construct the MST thus iterating until there is only one tree remaining. Within each iteration, Algorithm 4 can perform similar steps as before, with the difference being that the label condition can be removed. Overall, Algorithm 4 can compute a flagged MST by utilizing a modified version of Boruvka's algorithm that incorporates markers and border management.

Once flagged MSTs are obtained, they can be simplified into PRAGs, by aggregating nodes belonging to the same non-border regions/trees as each other into respective region nodes. A PRAG can thus be a graph that contains as many nodes as distinct regions, in addition to whatever nodes belong to border trees in the flagged MST. The set of edges can include whatever edges that connect two nodes belonging to distinct regions/trees, as well as whatever edges connect any two nodes belonging to border regions/trees. In order to keep the link between the nodes of the PRAG and the image domain (e.g., the pixels of whatever tile this PRAG represents), an array vertexMap can be built along with the PRAG. It can indicate for each node (e.g., for each vertex) of the input graph the index of the region/tree to which it belongs in the PRAG. This allows the pixel-wise labeling of the tile to be obtained from the labeling of the PRAG.

Algorithm 5 is a novel algorithm devised by the present inventors to achieve this simplification. As input, Algorithm 5 can take a graph and an array that associates a respective label to each of its nodes. The nodes belonging to a border region/tree can have the label "B". The edges of the graph can be considered sequentially by Algorithm 5. If a given node of that edge belongs to a border region/tree, then Algorithm 5 can add that given node to the PRAG. If that given node does not belong to a border region/tree, Algorithm 5 can determine whether the label associated with that given node has already been discovered using a map (e.g., lutLabel can be considered as a dummy array that is used to track whether or not the label of a specific region/tree is already represented in the PRAG). If the label associated with that given node is not already represented by a region node in the PRAG, Algorithm 5 can add the given node to the PRAG, that given node can now be considered as a region node in the PRAG. If the label associated with that given node is already represented by a region node in the PRAG, the given node can be associated with whatever region node in the PRAG is already associated with the label of the given node. Once the nodes of that edge are processed in this way, that edge itself can be added to the PRAG if and only if the two nodes of that edge are associated with different nodes in the PRAG (e.g., any edge whose two nodes are represented by the same region node in the PRAG can be omitted from the PRAG).

Once a PRAG is computed for each tile, all of such PRAGs can be merged together, thereby yielding a RAG that contains only region nodes and the edges coupling them. To do so efficiently, each pair of neighboring tiles can have an overlap of one pixel row or one pixel column, as appropriate. This can allow, at the cost of maintaining boundary lists containing the indices of the regions/trees shared between two tiles, to match two neighboring PRAGs in linear time. Rather than replacing the nodes of a PRAG by their duplicates, equivalent nodes can just be connected by an edge of zero weight.

Although the herein disclosure mainly describes various embodiments as implementing minimum spanning trees and minimum spanning forests, these are mere non-limiting examples for ease of explanation. It is to be appreciated that various embodiments described herein can be alternatively facilitated by instead using maximum spanning trees or maximum spanning forests.

Note that the terms "pixel adjacency graph" and "pixel-region adjacency graph" are utilized herein, regardless of whether the image 304 is made up of pixels or voxels. This is for ease of explanation. It is to be appreciated that a "pixel adjacency graph" can instead be referred to as a "voxel adjacency graph" as appropriate. Likewise, it is to be appreciated that a "pixel-region adjacency graph" can instead be referred to as a "voxel-region adjacency graph" as appropriate.

In various embodiments, the execution component 318 can electronically compute or calculate an amount of computer memory that is consumed by creation of the RAG 802. In particular, the present inventors reduced to practice one or more embodiments using C++.

In such reduction to practice, borders were stored as labels to reduce memory footprint. Six reserved values of labels were as follows: 0=intersection, 1=east border, 2=west border, 3=north border, 4=south border, and 5=background. This labeling scheme avoided having to store the borders in a separate array or table. Additionally, instead of storing a label for each edge, the edges can be sorted by labels. Indeed, some edges have different source and target labels and therefore can be assigned to label 0, meaning that such edges are an intersection between two different labels. By sorting the edges in this way, the count for each label can be stored rather than an extensive array explicitly identifying a respective label for each edge. For example, the following two values can be stored: labels[0]=123, and labels[1]=223. These can be interpreted to mean that the first 123 edges have the label 0, and the 100 next edges have the label 1. With this trick, the memory consumption associated with label tracking can be heavily compressed or reduced.

In the reduction to practice, the pipeline responsible for the creation and processing of the tiles was defined with two parameters, so as to have a fine control of the memory consumption: tileSize and tileBatching. This pipeline was multi-threaded, using a thread pool to task the tile processing. In particular, tileBatching represented the number of tiles to be processed in parallel and to then be merged. As an example, if there are 12 threads available, then tileBatching can be 11 by default, and the twelfth thread can merge the 11 PRAGs respectively created by the first 11 threads. So, if tileSize is set to 1024, 11 tiles of size 1024×1024 pixels can be processed in parallel, and, when all those tiles are processed, the merging thread can merge and simplify them. With such an implementation, the maximum theoretical size of the memory consumption can be defined as follows:

$$sizeof(ExtendedEdge)*tileSize^2*tileBatching+inputTileImage*tileBatching+inputSeedsImage*tileBatching$$

where ExtendedEdge can be defined as follows:

```
struct ExtendedEdge
{
//graph node index
   INDEX_TYPE                u; //source index of the edge
   INDEX_TYPE                v; //target index of the edge
//pixel position in the tile referential
   TILE_INDEX_TYPE           sv; //source pixel
   TILE_INDEX_TYPE           su; //target pixel
//labels
   LABEL_TYPE                sl; //source label
   LABEL_TYPE                tl; //target label
//tile indexes
   TILE_TYPE                 sti; //source tile index
   TILE_TYPE                 tti; //target tile index
//weight
   WEIGHT_TYPE               w;
}
```

where inputTileImage can be the size in memory of a tile, and where inputSeedImage can be the size in memory of whatever seed image is associated with a tile (e.g., of whatever larger image from which the tile is cut or extracted). Accordingly, depending on the input parameters, the maximum memory consumption can be customized or tailored, by tweaking the parameters (e.g., tileSize, tileBatching) according to the memory or processing capabilities of the user's computerized workstation. The present inventors found that, for an image of size 20000×20000 pixels, a tilling size of 1024×1024 pixels for a total of 12 threads minimized memory consumption.

Figure 32:
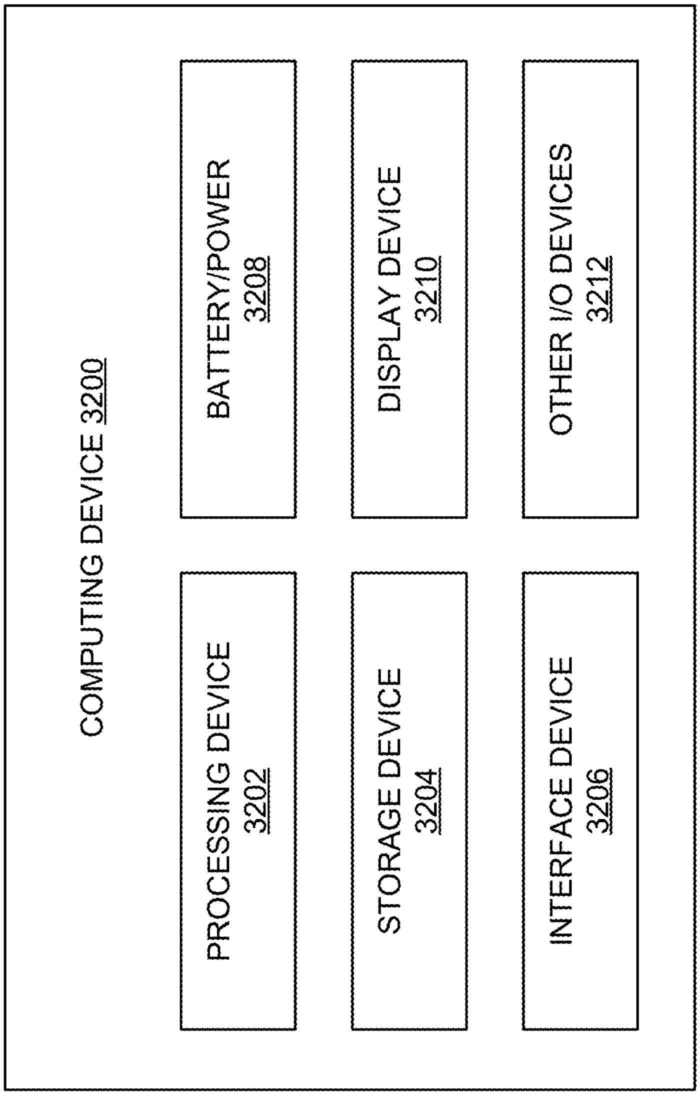
FIG. 32 illustrates an example, non-limiting block diagram of a computing device that can perform some or all of the methods or techniques disclosed herein, in accordance with various embodiments described herein.
Figure 33:
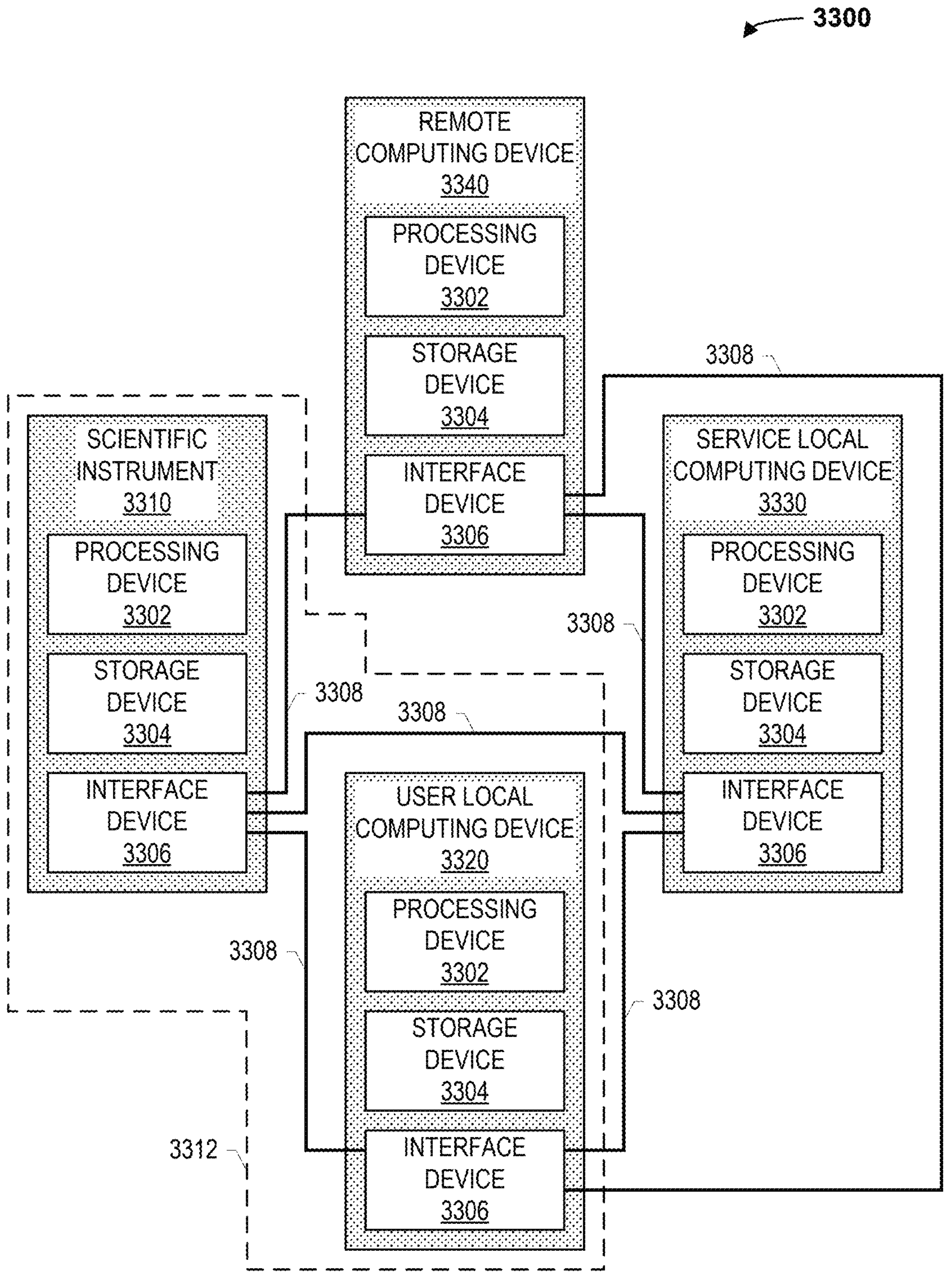
FIG. 33 illustrates an example, non-limiting block diagram of a scientific instrument support system in which some or all of the methods or techniques disclosed herein may be performed, in accordance with various embodiments described herein.

The scientific instrument systems, methods, or techniques disclosed herein may include interactions with a human user (e.g., via a user local computing device 3320 discussed herein with reference to FIG. 33). These interactions may include providing information to the user (e.g., information regarding the operation of a scientific instrument such as the scientific instrument 3310 of FIG. 33, information regarding a sample being analyzed or other test or measurement performed by a scientific instrument, information retrieved from a local or remote database, or other information) or providing an option for a user to input commands (e.g., to control the operation of a scientific instrument such as the scientific instrument 3310 of FIG. 33, or to control the analysis of data generated by a scientific instrument), queries (e.g., to a local or remote database), or other information. In some embodiments, these interactions may be performed through a graphical user interface (GUI) that includes a visual display on a display device (e.g., a display device 3210 discussed herein with reference to FIG. 32) that provides outputs to the user and/or prompts the user to provide inputs (e.g., via one or more input devices, such as a keyboard, mouse, trackpad, or touchscreen, included in other I/O devices 3212 discussed herein with reference to FIG. 32). The scientific instrument systems, methods, or techniques disclosed herein may include any suitable GUIs for interaction with a user.

Figure 31:
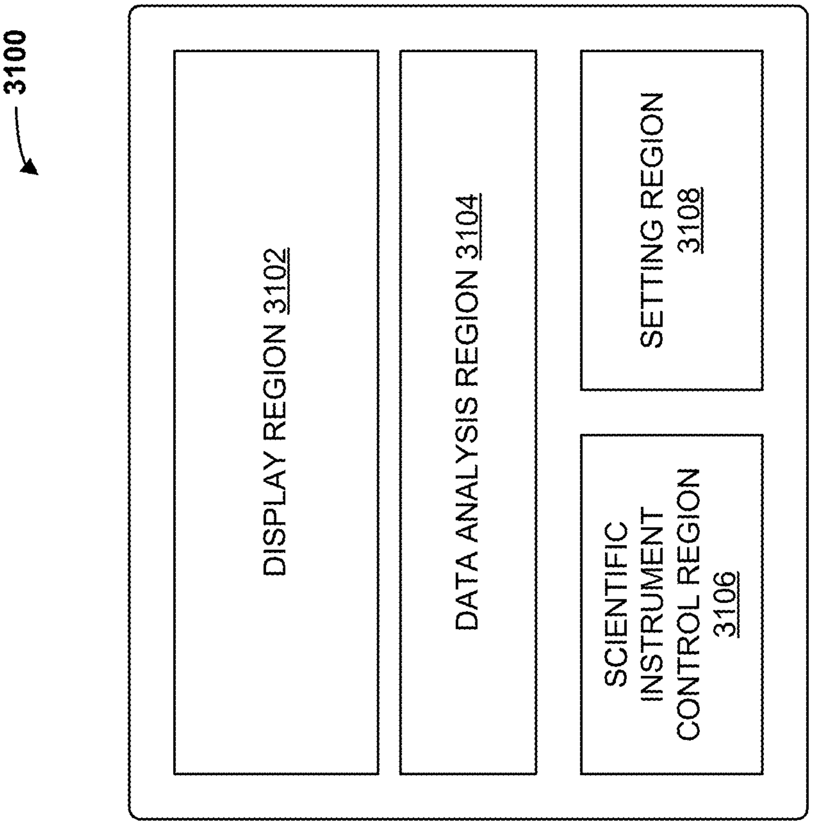
FIG. 31 illustrates an example, non-limiting block diagram of a graphical user interface that can be used in the performance of some or all of the methods or techniques disclosed herein, in accordance with various embodiments described herein.

FIG. 31 depicts an example graphical user interface 3100 (hereafter "GUI 3100") that can be used in the performance of some or all of the support methods or techniques disclosed herein, in accordance with various embodiments. In various aspects, the GUI 3100 can be provided on any suitable electronic display (e.g., a display device 3210 discussed herein with reference to FIG. 32) of a computing device (e.g., a computing device 3200 discussed herein with reference to FIG. 32) of a scientific instrument support system (e.g., a scientific instrument support system 3300 discussed herein with reference to FIG. 33), and a user or technician can interact with the GUI 3100 using any suitable input device (e.g., any of other I/O devices 3212 discussed herein with reference to FIG. 32) and input technique (e.g., movement of a cursor, motion capture, facial recognition, gesture detection, voice recognition, actuation of buttons).

The GUI 3100 can include a data display region 3102, a data analysis region 3104, a scientific instrument control region 3106, and a setting region 3108. The particular number and arrangement of regions depicted in FIG. 31 is merely illustrative, and any number and arrangement of regions, including any desired features, can be included in other embodiments of the GUI 3100.

The data display region 3102 can display data generated by a scientific instrument (e.g., a scientific instrument 3310 discussed herein with reference to FIG. 33).

The data analysis region 3104 can display any suitable data analysis results (e.g., the results of analyzing the data illustrated in the data display region 3102 or other data). In some embodiments, the data display region 3102 and the data analysis region 3104 can be combined in the GUI 3100 (e.g., to include both data output from a scientific instrument and some analysis of the data in a common graph or region).

The scientific instrument control region 3106 can include options that allow a user or technician to control a scientific instrument (e.g., the scientific instrument 3310 discussed herein with reference to FIG. 33). For example, the scientific instrument control region 3106 can include configurable parameters that govern operation of such scientific instrument (e.g., configurable parameters that govern voltages or electric currents of the scientific instrument, that govern interior temperatures of the scientific instrument, or that govern fluid flow rates of the scientific instrument).

The setting region 3108 can include options that allow a user or technician to control any features or functions of the GUI 3100 (or of other GUIs) or to perform common computing operations with respect to the data display region 3102 and the data analysis region 3104 (e.g., saving data on a storage device, such as the storage device 3204 discussed herein with reference to FIG. 32, sending data to another user, labeling data).

As noted above, the scientific instrument module 102 can be implemented by one or more computing devices. FIG. 32 is a block diagram of a computing device 3200 that can perform some or all of the scientific instrument methods or techniques disclosed herein, in accordance with various embodiments. In some embodiments, the scientific instrument module 102 can be implemented by a single instance of the computing device 3200 or by multiple instances of the computing device 3200. Further, as discussed below, the computing device 3200 (or multiple instances thereof) that implements the scientific instrument module 102 can be part of one or more of a scientific instrument 3310, a user local computing device 3320, a service local computing device 3330, or a remote computing device 3340 of FIG. 33.

The computing device 3200 is illustrated as having a number of components, but any one or more of these components can be omitted or duplicated, as suitable for the application and setting. In some embodiments, some or all of the components included in the computing device 3200 can be attached to one or more motherboards and enclosed in a housing (e.g., including plastic, metal, or other materials). In some embodiments, some these components can be fabricated onto a single system-on-a-chip (SoC) (e.g., an SoC may include one or more instances of a processing device 3202 and one or more instances of a storage device 3204). Additionally, in various embodiments, the computing device 3200 can omit one or more of the components illustrated in FIG. 32, but can include interface circuitry (not shown) for coupling to the one or more omitted components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 3200 can omit a display device 3210, but can include display device interface circuitry (e.g., a connector and driver circuitry) to which a display device 3210 can be coupled.

The computing device 3200 can include a processing device 3202 (e.g., one or more processing devices). As used herein, the term "processing device" can refer to any device or portion of a device that processes electronic data from registers or memory to transform that electronic data into other electronic data that may be stored in registers or memories. The processing device 3202 can include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device 3200 can include a storage device 3204 (e.g., one or more storage devices). The storage device 3204 can include one or more memory devices such as random access memory (RAM) (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 3204 can include memory that shares a die with a processing device 3202. In such an embodiment, the memory may be used as cache memory and may include embedded dynamic random access memory (eDRAM) or spin transfer torque magnetic random access memory (STT-MRAM), for example. In some embodiments, the storage device 3204 can include non-transitory computer readable media having instructions thereon that, when executed by one or more processing devices (e.g., the processing device 3202), cause the computing device 3200 to perform any appropriate ones of or portions of the methods disclosed herein.

The computing device 3200 can include an interface device 3206 (e.g., one or more instances of the interface device 3206). The interface device 3206 can include one or more communication chips, connectors, or other hardware and software to govern communications between the computing device 3200 and other computing devices. For example, the interface device 3206 can include circuitry for managing wireless communications for the transfer of data to and from the computing device 3200. The term "wireless" and its derivatives may be used to describe circuits, devices, systems, methods, techniques, or communications channels that may communicate data through the use of modulated electromagnetic radiation through a nonsolid medium. The term does not imply that the associated devices do not contain any wires, although in some embodiments they might not. Circuitry included in the interface device 3206 for managing wireless communications may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2")). In some embodiments, circuitry included in the interface device 3206 for managing wireless communications can operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 3206 for managing wireless communications can operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 3206 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 3206 may include one or more antennas (e.g., one or more antenna arrays) to receipt and/or transmission of wireless communications.

In some embodiments, the interface device 3206 can include circuitry for managing wired communications, such as electrical, optical, or any other suitable communication protocols. For example, the interface device 3206 can include circuitry to support communications in accordance with Ethernet technologies. In some embodiments, the interface device 3206 can support both wireless and wired communication, or can support multiple wired communication protocols or multiple wireless communication protocols. For example, a first set of circuitry of the interface device 3206 may be dedicated to shorter-range wireless communications such as Wi-Fi or Bluetooth, and a second set of circuitry of the interface device 3206 may be dedicated to longer-range wireless communications such as global positioning system (GPS), EDGE, GPRS, CDMA, WiMAX, LTE, EV-DO, or others. In some embodiments, a first set of circuitry of the interface device 3206 can be dedicated to wireless communications, and a second set of circuitry of the interface device 3206 can be dedicated to wired communications.

The computing device 3200 can include battery/power circuitry 3208. The battery/power circuitry 3208 can include one or more energy storage devices (e.g., batteries or capacitors) or circuitry for coupling components of the computing device 3200 to an energy source separate from the computing device 3200 (e.g., alternating current line power).

The computing device 3200 can include a display device 3210 (e.g., multiple display devices). The display device 3210 can include any visual indicators, such as a heads-up display, a computer monitor, a projector, a touchscreen display, a liquid crystal display (LCD), a light-emitting diode display, or a flat panel display.

The computing device 3200 can include other input/output (I/O) devices 3212. The other I/O devices 3212 can include one or more audio output devices (e.g., speakers, headsets, earbuds, alarms), one or more audio input devices (e.g., microphones or microphone arrays), location devices (e.g., GPS devices in communication with a satellite-based system to receive a location of the computing device 3200), audio codecs, video codecs, printers, sensors (e.g., thermocouples or other temperature sensors, humidity sensors, pressure sensors, vibration sensors, accelerometers, gyroscopes), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 3200 can have any suitable form factor for its application and setting, such as a handheld or mobile computing device (e.g., a cell phone, a smart phone, a mobile internet device, a tablet computer, a laptop computer, a netbook computer, an ultrabook computer, a personal digital assistant (PDA), an ultra mobile personal computer), a desktop computing device, or a server computing device or other networked computing component.

One or more computing devices implementing any of the scientific instrument modules, methods, or techniques disclosed herein may be part of a scientific instrument support system. FIG. 33 is a block diagram of an example scientific instrument support system 3300 in which some or all of the scientific instrument support methods disclosed herein may be performed, in accordance with various embodiments. The scientific instrument modules, methods, or techniques disclosed herein (e.g., the scientific instrument module 102, the computer-implemented method 200, the system 306) can be implemented by one or more of a scientific instrument 3310, a user local computing device 3320, a service local computing device 3330, or a remote computing device 3340 of the scientific instrument support system 3300.

Any of the scientific instrument 3310, the user local computing device 3320, the service local computing device 3330, or the remote computing device 3340 can include any of the embodiments of the computing device 3200, and any of the scientific instrument 3310, the user local computing device 3320, the service local computing device 3330, or the remote computing device 3340 can take the form of any appropriate ones of the embodiments of the computing device 3200.

The scientific instrument 3310, the user local computing device 3320, the service local computing device 3330, or the remote computing device 3340 may each include a processing device 3302, a storage device 3304, and an interface device 3306. The processing device 3302 may take any suitable form, including any form of the processing device 3202, and the processing devices 3302 included in different ones of the scientific instrument 3310, the user local computing device 3320, the service local computing device 3330, or the remote computing device 3340 may take the same form or different forms. The storage device 3304 may take any suitable form, including any form of the storage device 3204, and the storage devices 3304 included in different ones of the scientific instrument 3310, the user local computing device 3320, the service local computing device 3330, or the remote computing device 3340 may take the same form or different forms. The interface device 3306 may take any suitable form, including any form of the interface device 3206, and the interface devices 3306 included in different ones of the scientific instrument 3310, the user local computing device 3320, the service local computing device 3330, or the remote computing device 3340 may take the same form or different forms.

The scientific instrument 3310, the user local computing device 3320, the service local computing device 3330, and the remote computing device 3340 can be in communication with other elements of the scientific instrument support system 3300 via communication pathways 3308. The communication pathways 3308 may communicatively couple the interface devices 3306 of different ones of the elements of the scientific instrument support system 3300, as shown, and may be wired or wireless communication pathways (e.g., in accordance with any of the communication techniques discussed herein with reference to the interface device 3206). The particular scientific instrument support system 3300 depicted in FIG. 33 includes communication pathways between each pair of the scientific instrument 3310, the user local computing device 3320, the service local computing device 3330, and the remote computing device 3340, but this "fully connected" implementation is merely illustrative, and in various embodiments, various ones of the communication pathways 3308 may be absent. For example, in some embodiments, a service local computing device 3330 can lack a direct communication pathway 3308 between its interface device 3306 and the interface device 3306 of the scientific instrument 3310, but can instead communicate with the scientific instrument 3310 via the communication pathway 3308 between the service local computing device 3330 and the user local computing device 3320 and the communication pathway 3308 between the user local computing device 3320 and the scientific instrument 3310.

The scientific instrument 3310 may include any appropriate scientific instrument, such as the scientific instrument 302.

The user local computing device 3320 can be a computing device (e.g., in accordance with any of the embodiments of the computing device 3200) that is local to a user of the scientific instrument 3310. In some embodiments, the user local computing device 3320 may also be local to the scientific instrument 3310, but this need not be the case; for example, a user local computing device 3320 that is in a user's home or office may be remote from, but in communication with, the scientific instrument 3310 so that the user may use the user local computing device 3320 to control or access data from the scientific instrument 3310. In some embodiments, the user local computing device 3320 may be a laptop, smartphone, or tablet device. In some embodiments the user local computing device 3320 can be a portable computing device.

The service local computing device 3330 can be a computing device (e.g., in accordance with any of the embodiments of the computing device 3200) that is local to an entity that services the scientific instrument 3310. For example, the service local computing device 3330 may be local to a manufacturer of the scientific instrument 3310 or to a third-party service company. In some embodiments, the service local computing device 3330 can communicate with the scientific instrument 3310, the user local computing device 3320, or the remote computing device 3340 (e.g., via a direct communication pathway 3308 or via multiple "indirect" communication pathways 3308, as discussed above) to receive data regarding the operation of the scientific instrument 3310, the user local computing device 3320, or the remote computing device 3340 (e.g., the results of self-tests of the scientific instrument 3310, calibration coefficients used by the scientific instrument 3310, the measurements of sensors associated with the scientific instrument 3310). In some embodiments, the service local computing device 3330 may communicate with the scientific instrument 3310, the user local computing device 3320, or the remote computing device 3340 (e.g., via a direct communication pathway 3308 or via multiple "indirect" communication pathways 3308, as discussed above) to transmit data to the scientific instrument 3310, the user local computing device 3320, or the remote computing device 3340 (e.g., to update programmed instructions, such as firmware, in the scientific instrument 3310, to initiate the performance of test or calibration sequences in the scientific instrument 3310, to update programmed instructions, such as software, in the user local computing device 3320 or the remote computing device 3340). A user of the scientific instrument 3310 can utilize the scientific instrument 3310 or the user local computing device 3320 to communicate with the service local computing device 3330 to report a problem with the scientific instrument 3310 or the user local computing device 3320, to request a visit from a technician to improve the operation of the scientific instrument 3310, to order consumables or replacement parts associated with the scientific instrument 3310, or for other purposes.

The remote computing device 3340 can be a computing device (e.g., in accordance with any of the embodiments of the computing device 3200 discussed herein) that is remote from the scientific instrument 3310 or from the user local computing device 3320. In some embodiments, the remote computing device 3340 can be included in a datacenter or other large-scale server environment. In some embodiments, the remote computing device 3340 may include network-attached storage (e.g., as part of the storage device 3304). The remote computing device 3340 can store data generated by the scientific instrument 3310, perform analyses of the data generated by the scientific instrument 3310 (e.g., in accordance with programmed instructions), facilitate communication between the user local computing device 3320 and the scientific instrument 3310, or facilitate communication between the service local computing device 3330 and the scientific instrument 3310.

In some embodiments, one or more of the elements of the scientific instrument support system 3300 illustrated in FIG. 33 can be omitted. Further, in some embodiments, multiple ones of various ones of the elements of the scientific instrument support system 3300 of FIG. 33 may be present. For example, a scientific instrument support system 3300 can include multiple user local computing devices 3320 (e.g., different user local computing devices 3320 associated with different users or in different locations). In another example, a scientific instrument support system 3300 may include multiple scientific instruments 3310, all in communication with service local computing device 3330 and/or a remote computing device 3340; in such an embodiment, the service local computing device 3330 may monitor these multiple scientific instruments 3310, and the service local computing device 3330 may cause updates or other information may be "broadcast" to multiple scientific instruments 3310 at the same time. Different ones of the scientific instruments 3310 in a scientific instrument support system 3300 can be located close to one another (e.g., in the same room) or farther from one another (e.g., on different floors of a building, in different buildings, in different cities, etc.). In some embodiments, a scientific instrument 3310 can be connected to an Internet-of-Things (IoT) stack that allows for command and control of the scientific instrument 3310 through a web-based application, a virtual or augmented reality application, a mobile application, or a desktop application. Any of these applications can be accessed by a user operating the user local computing device 3320 in communication with the scientific instrument 3310 by the intervening remote computing device 3340. In some embodiments, a scientific instrument 3310 may be sold by the manufacturer along with one or more associated user local computing devices 3320 as part of a local scientific instrument computing unit 3312.

In some embodiments, different ones of the scientific instruments 3310 included in a scientific instrument support system 3300 may be different types of scientific instruments 3310; for example, one scientific instrument 3310 may be a mass spectrometer, while another scientific instrument 3310 may be a chromatograph or autosampler. In some such embodiments, the remote computing device 3340 or the user local computing device 3320 can combine data from different types of scientific instruments 3310 included in a scientific instrument support system 3300.

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by f(z)=confidence(class). Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

Figure 34:
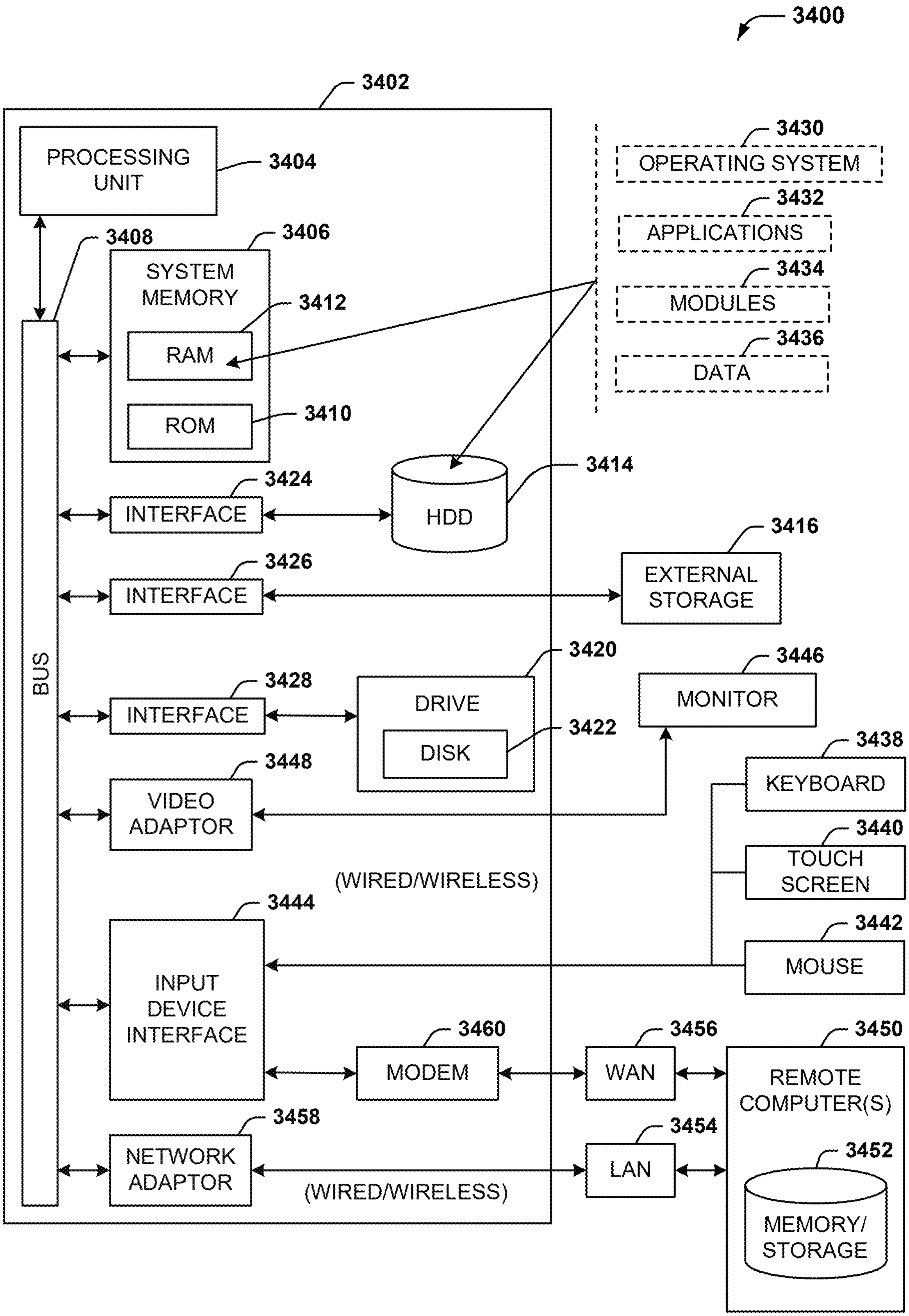
FIG. 34 illustrates a block diagram of an example, non-limiting operating environment in which one or more embodiments described herein can be facilitated.

In order to provide additional context for various embodiments described herein, FIG. 34 and the following discussion are intended to provide a brief, general description of a suitable computing environment 3400 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 34, the example environment 3400 for implementing various embodiments of the aspects described herein includes a computer 3402, the computer 3402 including a processing unit 3404, a system memory 3406 and a system bus 3408. The system bus 3408 couples system components including, but not limited to, the system memory 3406 to the processing unit 3404. The processing unit 3404 can be any of various commercially available processors. Dual microprocessors and other multi-processor architectures can also be employed as the processing unit 3404.

The system bus 3408 can be any of several types of bus structure that can further interconnect to a memory bus (with or without a memory controller), a peripheral bus, and a local bus using any of a variety of commercially available bus architectures. The system memory 3406 includes ROM

3410 and RAM 3412. A basic input/output system (BIOS) can be stored in a non-volatile memory such as ROM, erasable programmable read only memory (EPROM), EEPROM, which BIOS contains the basic routines that help to transfer information between elements within the computer 3402, such as during startup. The RAM 3412 can also include a high-speed RAM such as static RAM for caching data.

The computer 3402 further includes an internal hard disk drive (HDD) 3414 (e.g., EIDE, SATA), one or more external storage devices 3416 (e.g., a magnetic floppy disk drive (FDD) 3416, a memory stick or flash drive reader, a memory card reader, etc.) and a drive 3420, e.g., such as a solid state drive, an optical disk drive, which can read or write from a disk 3422, such as a CD-ROM disc, a DVD, a BD, etc. Alternatively, where a solid state drive is involved, disk 3422 would not be included, unless separate. While the internal HDD 3414 is illustrated as located within the computer 3402, the internal HDD 3414 can also be configured for external use in a suitable chassis (not shown). Additionally, while not shown in environment 3400, a solid state drive (SSD) could be used in addition to, or in place of, an HDD 3414. The HDD 3414, external storage device(s) 3416 and drive 3420 can be connected to the system bus 3408 by an HDD interface 3424, an external storage interface 3426 and a drive interface 3428, respectively. The interface 3424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 3402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 3412, including an operating system 3430, one or more application programs 3432, other program modules 3434 and program data 3436. All or portions of the operating system, applications, modules, or data can also be cached in the RAM 3412. The systems and methods described herein can be implemented utilizing various commercially available operating systems or combinations of operating systems.

Computer 3402 can optionally comprise emulation technologies. For example, a hypervisor (not shown) or other intermediary can emulate a hardware environment for operating system 3430, and the emulated hardware can optionally be different from the hardware illustrated in FIG. 34. In such an embodiment, operating system 3430 can comprise one virtual machine (VM) of multiple VMs hosted at computer 3402. Furthermore, operating system 3430 can provide runtime environments, such as the Java runtime environment or the .NET framework, for applications 3432. Runtime environments are consistent execution environments that allow applications 3432 to run on any operating system that includes the runtime environment. Similarly, operating system 3430 can support containers, and applications 3432 can be in the form of containers, which are lightweight, standalone, executable packages of software that include, e.g., code, runtime, system tools, system libraries and settings for an application.

Further, computer 3402 can be enable with a security module, such as a trusted processing module (TPM). For instance with a TPM, boot components hash next in time boot components, and wait for a match of results to secured values, before loading a next boot component. This process can take place at any layer in the code execution stack of computer 3402, e.g., applied at the application execution level or at the operating system (OS) kernel level, thereby enabling security at any level of code execution.

A user can enter commands and information into the computer 3402 through one or more wired/wireless input devices, e.g., a keyboard 3438, a touch screen 3440, and a pointing device, such as a mouse 3442. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 3404 through an input device interface 3444 that can be coupled to the system bus 3408, but can be connected by other interfaces, such as a parallel port, an IEEE 1394 serial port, a game port, a USB port, an IR interface, a BLUETOOTH® interface, etc.

A monitor 3446 or other type of display device can be also connected to the system bus 3408 via an interface, such as a video adapter 3448. In addition to the monitor 3446, a computer typically includes other peripheral output devices (not shown), such as speakers, printers, etc.

The computer 3402 can operate in a networked environment using logical connections via wired or wireless communications to one or more remote computers, such as a remote computer(s) 3450. The remote computer(s) 3450 can be a workstation, a server computer, a router, a personal computer, portable computer, microprocessor-based entertainment appliance, a peer device or other common network node, and typically includes many or all of the elements described relative to the computer 3402, although, for purposes of brevity, only a memory/storage device 3452 is illustrated. The logical connections depicted include wired/wireless connectivity to a local area network (LAN) 3454 or larger networks, e.g., a wide area network (WAN) 3456. Such LAN and WAN networking environments are commonplace in offices and companies, and facilitate enterprise-wide computer networks, such as intranets, all of which can connect to a global communications network, e.g., the Internet.

When used in a LAN networking environment, the computer 3402 can be connected to the local network 3454 through a wired or wireless communication network interface or adapter 3458. The adapter 3458 can facilitate wired or wireless communication to the LAN 3454, which can also include a wireless access point (AP) disposed thereon for communicating with the adapter 3458 in a wireless mode.

When used in a WAN networking environment, the computer 3402 can include a modem 3460 or can be connected to a communications server on the WAN 3456 via other means for establishing communications over the WAN 3456, such as by way of the Internet. The modem 3460, which can be internal or external and a wired or wireless device, can be connected to the system bus 3408 via the input device interface 3444. In a networked environment, program modules depicted relative to the computer 3402 or portions thereof, can be stored in the remote memory/storage device 3452. It will be appreciated that the network connections shown are example and other means of establishing a communications link between the computers can be used.

When used in either a LAN or WAN networking environment, the computer 3402 can access cloud storage systems or other network-based storage systems in addition to, or in place of, external storage devices 3416 as described above, such as but not limited to a network virtual machine providing one or more aspects of storage or processing of information. Generally, a connection between the computer 3402 and a cloud storage system can be established over a LAN 3454 or WAN 3456 e.g., by the adapter 3458 or modem 3460, respectively. Upon connecting the computer 3402 to an associated cloud storage system, the external storage interface 3426 can, with the aid of the adapter 3458 or modem 3460, manage storage provided by the cloud storage system as it would other types of external storage. For instance, the external storage interface 3426 can be configured to provide access to cloud storage sources as if those sources were physically connected to the computer 3402.

The computer 3402 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 35:
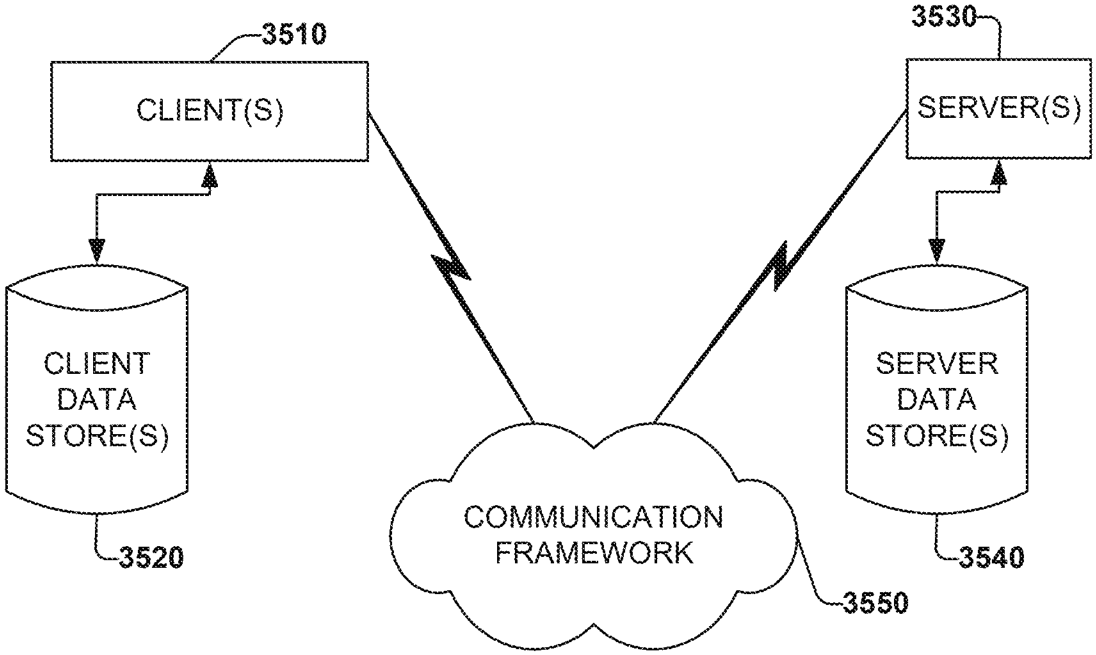
FIG. 35 illustrates an example networking environment operable to execute various implementations described herein.

FIG. 35 is a schematic block diagram of a sample computing environment 3500 with which the disclosed subject matter can interact. The sample computing environment 3500 includes one or more client(s) 3510. The client(s) 3510 can be hardware or software (e.g., threads, processes, computing devices). The sample computing environment 3500 also includes one or more server(s) 3530. The server(s) 3530 can also be hardware or software (e.g., threads, processes, computing devices). The servers 3530 can house threads to perform transformations by employing one or more embodiments as described herein, for example. One possible communication between a client 3510 and a server 3530 can be in the form of a data packet adapted to be transmitted between two or more computer processes. The sample computing environment 3500 includes a communication framework 3550 that can be employed to facilitate communications between the client(s) 3510 and the server(s) 3530. The client(s) 3510 are operably connected to one or more client data store(s) 3520 that can be employed to store information local to the client(s) 3510. Similarly, the server (s) 3530 are operably connected to one or more server data store(s) 3540 that can be employed to store information local to the servers 3530.

Various embodiments may be a system, a method, an apparatus or a computer program product at any possible technical detail level of integration. The computer program product can include a computer readable storage medium (or media) having computer readable program instructions thereon for causing a processor to carry out aspects of various embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform various aspects.

Various aspects are described herein with reference to flowchart illustrations or block diagrams of methods, apparatus (systems), and computer program products according to various embodiments. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that various aspects can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various non-limiting aspects are described in the following examples.

EXAMPLE 1: A system can comprise: a processor that executes computer-executable components stored in a non-transitory computer-readable memory, wherein the computer-executable components comprise: an access component that can access an image generated by a scientific instrument; and an execution component that can perform marker-based watershed segmentation on a region adjacency graph of the image, wherein the region adjacency graph can be constructed from a plurality of pixel-region adjacency graphs respectively corresponding to a plurality of tiles of the image.

EXAMPLE 2: The system of any preceding example can be implemented, wherein the computer-executable components further comprise: a tile component that can decompose the image into the plurality of tiles.

EXAMPLE 3: The system of any preceding example can be implemented, wherein the computer-executable components further comprise: a graph component that can generate a plurality of pixel adjacency graphs based on the plurality of tiles, wherein, for a first pixel adjacency graph that corresponds to a first tile, nodes of the first pixel adjacency graph can represent respective pixels or voxels of the first tile.

EXAMPLE 4: The system of any preceding example can be implemented, wherein the graph component can generate a plurality of minimum spanning forests based on the plurality of pixel adjacency graphs, wherein, for a first minimum spanning forest that corresponds to the first pixel adjacency graph, the first minimum spanning forest can comprise one or more border trees and one or more interior trees.

EXAMPLE 5: The system of any preceding example can be implemented, wherein the graph component can generate the plurality of minimum spanning forests via executing Boruvka's algorithm.

EXAMPLE 6: The system of any preceding example can be implemented, wherein the graph component can generate the plurality of pixel-region adjacency graphs based on the plurality of minimum spanning forests, wherein, for a first pixel-region adjacency graph that corresponds to the first minimum spanning forest, the first pixel-region adjacency graph can comprise one or more border regions respectively corresponding to the one or more border trees and a set of region-wise nodes into which the one or more interior trees are condensed.

EXAMPLE 7: The system of any preceding example can be implemented, wherein the graph component can merge the plurality of pixel-region adjacency graphs into the region adjacency graph, by coupling border regions of adjacent tiles, reflagging such border trees as new interior regions, and condensing such new interior regions into new region-wise nodes.

EXAMPLE 8: The system of any preceding example can be implemented, wherein the execution component can compute an amount of memory consumption involved in creation of the region adjacency graph.

In various embodiments, any combination or combinations of examples 1-8 can be implemented.

EXAMPLE 9: A computer-implemented method can comprise: accessing, by a device operatively coupled to a processor, an image generated by a scientific instrument; and performing, by the device, marker-based watershed segmentation on a region adjacency graph of the image, wherein the region adjacency graph can be constructed from a plurality of pixel-region adjacency graphs respectively corresponding to a plurality of tiles of the image.

EXAMPLE 10: The computer-implemented method of any preceding example can be implemented, further comprising: decomposing, by the device, the image into the plurality of tiles.

EXAMPLE 11: The computer-implemented method of any preceding example can be implemented, further comprising: generating, by the device, a plurality of pixel adjacency graphs based on the plurality of tiles, wherein, for a first pixel adjacency graph that corresponds to a first tile, nodes of the first pixel adjacency graph can represent respective pixels or voxels of the first tile.

EXAMPLE 12: The computer-implemented method of any preceding example can be implemented, further comprising: generating, by the device, a plurality of minimum spanning forests based on the plurality of pixel adjacency graphs, wherein, for a first minimum spanning forest that corresponds to the first pixel adjacency graph, the first minimum spanning forest can comprise one or more border trees and one or more interior trees.

EXAMPLE 13: The computer-implemented method of any preceding example can be implemented, wherein the device generates the plurality of minimum spanning forests via executing Boruvka's algorithm.

EXAMPLE 14: The computer-implemented method of any preceding example can be implemented, further comprising: generating, by the device, the plurality of pixel-region adjacency graphs based on the plurality of minimum spanning forests, wherein, for a first pixel-region adjacency graph that corresponds to the first minimum spanning forest, the first pixel-region adjacency graph can comprise one or more border regions respectively corresponding to the one or more border trees and a set of region-wise nodes into which the one or more interior trees are condensed.

EXAMPLE 15: The computer-implemented method of any preceding example can be implemented, further comprising: merging, by the device, the plurality of pixel-region adjacency graphs into the region adjacency graph, by coupling border regions of adjacent tiles, reflagging such border regions as new interior regions, and condensing such new interior regions into new region-wise nodes.

EXAMPLE 16: The computer-implemented method of any preceding example can be implemented, wherein the image can be an electron tomography image, an X-ray tomography image, or a confocal microscopy image.

In various embodiments, any combination or combinations of examples 9-16 can be implemented.

EXAMPLE 17: A computer program product for facilitating tiled region adjacency graph computation via pixel-region adjacency graphs can comprise a non-transitory computer-readable memory having program instructions embodied therewith. In various aspects, the program instructions can be executable by a processor to cause the processor to: access an image captured by a charged-particle microscope; and construct, in tile-wise fashion, a region adjacency graph for the image, based on a plurality of pixel-region adjacency graphs.

EXAMPLE 18: The computer program product of any preceding example can be implemented, wherein the program instructions can be further executable to cause the processor to: decompose the image into a plurality of tiles; generate a plurality of pixel adjacency graphs based on the plurality of tiles, wherein, for a first pixel adjacency graph that corresponds to a first tile, nodes of the first pixel adjacency graph represent respective pixels or voxels of the first tile; generate a plurality of minimum spanning forests based on the plurality of pixel adjacency graphs, wherein, for a first minimum spanning forest that corresponds to the first pixel adjacency graph, the first minimum spanning forest comprises one or more border trees and one or more interior trees; generate the plurality of pixel-region adjacency graphs based on the plurality of minimum spanning forests, wherein, for a first pixel-region adjacency graph that corresponds to the first minimum spanning forest, the first pixel-region adjacency graph comprises one or more border regions respectively corresponding to the one or more border trees and a set of region-wise nodes into which the one or more interior trees are condensed; and merge the plurality of pixel-region adjacency graphs into the region adjacency graph, by coupling border regions of adjacent tiles, reflagging such border regions as new interior regions, and condensing such new interior regions into new region-wise nodes.

EXAMPLE 19: The computer program product of any preceding example can be implemented, wherein the program instructions can be further executable to cause the processor to segment the image, based on the region adjacency graph.

EXAMPLE 20: The computer program product of any preceding example can be implemented, wherein the processor can segment the image via marker-based watershed segmentation.

In various embodiments, any combination or combinations of examples 17-20 can be implemented.

In various embodiments, any combination or combinations of examples 1-20 can be implemented.

What is claimed is:

1. A system, comprising:

a memory configured to store computer-executable components; and a processor that executes at least one of the computer-executable components that:

accesses an image generated by a scientific instrument; and performs marker-based watershed segmentation on a region adjacency graph of the image, wherein the region adjacency graph is constructed from a plurality of pixel-region adjacency graphs respectively corresponding to a plurality of tiles of the image, wherein each tile comprises a different group of pixels of the image, and wherein each pixel-region adjacency graph comprises, for a corresponding tile:

one or more border regions that respectively correspond to border trees of a minimum spanning forest generated for the corresponding tile, wherein each border tree has at last one node located on at least one border of the corresponding tile, and a set of region-wise nodes into which interior trees of the minimum spanning forest for the corresponding tile are condensed, wherein each interior tree does not have any nodes located on any borders of the corresponding tile.

2. The system of claim 1, wherein the at least one of the computer-executable components further:

decomposes the image into the plurality of tiles.

3. The system of claim 2, wherein the at least one of the computer-executable components further:

generates a plurality of pixel adjacency graphs based on the plurality of tiles, wherein, for a first pixel adjacency graph that corresponds to a first tile, nodes of the first pixel adjacency graph represent respective pixels or voxels of the first tile.

4. The system of claim 3, wherein the at least one of the computer-executable components further:

generates a plurality of minimum spanning forests based on the plurality of pixel adjacency graphs, wherein, for a first minimum spanning forest that corresponds to the first pixel adjacency graph, the first minimum spanning forest comprises:

one or more border trees that include at least one pixel located at a boundary of the corresponding tile of the image, and one or more interior trees that do not include any pixel located at the boundary of the corresponding tile.

5. The system of claim 4, wherein the at least one of the computer-executable components further:

generates the plurality of minimum spanning forests via executing Boruvka's algorithm.

6. The system of claim 4, wherein the at least one of the computer-executable components further:

generates the plurality of pixel-region adjacency graphs based on the plurality of minimum spanning forests, wherein, for a first pixel-region adjacency graph that corresponds to the first minimum spanning forest, the first pixel-region adjacency graph comprises one or more border regions respectively corresponding to the one or more border trees and retaining pixel-level adjacency for pixels of the border trees, and the set of region-wise nodes into which the one or more interior trees are condensed such that all pixels of each interior tree map to a corresponding single region-wise node and edges between pixels of different interior trees are represented as edges between corresponding region-wise nodes.

7. The system of claim 6, wherein the at least one of the computer-executable components further:

merges the plurality of pixel-region adjacency graphs into the region adjacency graph, by coupling border regions of adjacent tiles that are matched as representing a common region across a tile boundary, reflagging such border regions as new interior regions, and condensing such new interior regions into new region-wise nodes such that, after the merging and condensing, the region adjacency graph comprises only region-wise nodes and no border regions.

8. The system of claim 1, wherein the at least one of the computer-executable components further:

computes an amount of memory consumption involved in creation of the region adjacency graph.

9. A computer-implemented method, comprising:

accessing, by a device operatively coupled to a processor, an image generated by a scientific instrument; and performing, by the device, marker-based watershed segmentation on a region adjacency graph of the image, wherein the region adjacency graph is constructed from a plurality of pixel-region adjacency graphs respectively corresponding to a plurality of tiles of the image, wherein each tile comprises a different group of pixels of the image, and wherein each pixel-region adjacency graph comprises, for a corresponding tile:

one or more border regions that respectively correspond to border trees of a minimum spanning forest generated for the corresponding tile, wherein each border tree has at last one node located on at least one border of the corresponding tile, and a set of region-wise nodes into which interior trees of the minimum spanning forest for the corresponding tile are condensed, wherein each interior tree does not have any nodes located on any borders of the corresponding tile.

10. The computer-implemented method of claim 9, further comprising:

decomposing, by the device, the image into the plurality of tiles.

11. The computer-implemented method of claim 10, further comprising:

generating, by the device, a plurality of pixel adjacency graphs based on the plurality of tiles, wherein, for a first pixel adjacency graph that corresponds to a first tile, nodes of the first pixel adjacency graph represent respective pixels or voxels of the first tile.

12. The computer-implemented method of claim 11, further comprising:

generating, by the device, a plurality of minimum spanning forests based on the plurality of pixel adjacency graphs, wherein, for a first minimum spanning forest that corresponds to the first pixel adjacency graph, the first minimum spanning forest comprises:

one or more border trees that include at least one pixel located at a boundary of the corresponding tile of the image, and one or more interior trees that do not include any pixel located at the boundary of the corresponding tile.

13. The computer-implemented method of claim 12, wherein the device generates the plurality of minimum spanning forests via executing Boruvka's algorithm.

14. The computer-implemented method of claim 12, further comprising:

generating, by the device, the plurality of pixel-region adjacency graphs based on the plurality of minimum spanning forests, wherein, for a first pixel-region adjacency graph that corresponds to the first minimum spanning forest, the first pixel-region adjacency graph comprises one or more border regions respectively corresponding to the one or more border trees and retaining pixel-level adjacency for pixels of the border trees, and the set of region-wise nodes into which the one or more interior trees are condensed such that all pixels of each interior tree map to a corresponding single region-wise node and edges between pixels of different interior trees are represented as edges between corresponding region-wise nodes.

15. The computer-implemented method of claim 14, further comprising:

merging, by the device, the plurality of pixel-region adjacency graphs into the region adjacency graph, by coupling border regions of adjacent tiles that are matched as representing a common region across a tile boundary, reflagging such border regions as new interior regions, and condensing such new interior regions into new region-wise nodes such that, after the merging and condensing, the region adjacency graph comprises only region-wise nodes and no border regions.

16. The computer-implemented method of claim 9, wherein the image is an electron tomography image, an X-ray tomography image, or a confocal microscopy image.

17. A computer program product for facilitating tiled region adjacency graph computation via pixel-region adjacency graphs, the computer program product comprising a non-transitory computer-readable memory having program instructions embodied therewith, the program instructions executable by a processor to cause the processor to:

access an image captured by a charged-particle microscope; and construct, in tile-wise fashion, a region adjacency graph for the image, based on a plurality of pixel-region adjacency graphs, wherein each tile comprises a different group of pixels of the image, and wherein each pixel-region adjacency graph comprises, for a corresponding tile:

one or more border regions that respectively correspond to border trees of a minimum spanning forest generated for the corresponding tile, wherein each border tree has at last one node located on at least one border of the corresponding tile, and a set of region-wise nodes into which interior trees of the minimum spanning forest for the corresponding tile are condensed, wherein each interior tree does not have any nodes located on any borders of the corresponding tile.

18. The computer program product of claim 17, wherein the program instructions are further executable to cause the processor to:

decompose the image into a plurality of tiles;

generate a plurality of pixel adjacency graphs based on the plurality of tiles, wherein, for a first pixel adjacency graph that corresponds to a first tile, nodes of the first pixel adjacency graph represent respective pixels or voxels of the first tile;

generate a plurality of minimum spanning forests based on the plurality of pixel adjacency graphs, wherein, for a first minimum spanning forest that corresponds to the first pixel adjacency graph, the first minimum spanning forest comprises:

one or more border trees that include at least one pixel located at a boundary of the corresponding tile of the image, and one or more interior trees that do not include any pixel located at the boundary of the corresponding tile;

generate the plurality of pixel-region adjacency graphs based on the plurality of minimum spanning forests, wherein, for a first pixel-region adjacency graph that corresponds to the first minimum spanning forest, the first pixel-region adjacency graph comprises one or more border trees and retaining pixel-level adjacency for pixels of the border trees, and the set of region-wise nodes into which the one or more interior trees are condensed such that all pixels of each interior tree map to a corresponding single region-wise node and edges between pixels of different interior trees are represented as edges between corresponding region-wise nodes; and merge the plurality of pixel-region adjacency graphs into the region adjacency graph, by coupling border regions of adjacent tiles that are matched as representing a common region across a tile boundary, reflagging such border regions as new interior regions, and condensing such new interior regions into new region-wise nodes such that, after the merging and condensing, the region adjacency graph comprises only region-wise nodes and no border regions.

19. The computer program product of claim 18, wherein the program instructions are further executable to cause the processor to segment the image, based on the region adjacency graph.

20. The computer program product of claim 19, wherein the processor segments the image via marker-based watershed segmentation.

* * * * *